US012692734B2

(12) United States Patent
Bacon

(10) Patent No.: US 12,692,734 B2
(45) Date of Patent: Jul. 28, 2026

(54) SQUEEZE TRIGGER LATCH

(71) Applicant: BAUER PRODUCTS, INC., Grand Rapids, MI (US)

(72) Inventor: Bruce C. Bacon, Rockford, MI (US)

(73) Assignee: BAUER PRODUCTS, INC., Grand Rapids, MI (US)

( * ) Notice: Subject to any disclaimer, the term of this patent is extended or adjusted under 35 U.S.C. 154(b) by 192 days.

(21) Appl. No.: 18/369,416

(22) Filed: Sep. 18, 2023

(65) Prior Publication Data

US 2024/0003170 A1      Jan. 4, 2024

Related U.S. Application Data

(63) Continuation-in-part of application No. 18/200,029, filed on May 22, 2023, which is a continuation-in-part (Continued)

(51) Int. Cl.
| | |
|---|---|
| *E05B 85/22* | (2014.01) |
| *B60P 3/04* | (2006.01) |
| *E05B 55/00* | (2006.01) |
| *E05B 55/12* | (2006.01) |
| *E05B 77/30* | (2014.01) |

(Continued)

(52) U.S. Cl.
CPC ................ *E05B 85/22* (2013.01); *B60P 3/04* (2013.01); *E05B 55/005* (2013.01); *E05B 55/12* (2013.01); *E05B 77/30* (2013.01); *E05B 77/34* (2013.01); *E05B 83/44* (2013.01); *E05B 85/06* (2013.01);

(Continued)

(58) Field of Classification Search
CPC . E05C 1/004; E05C 1/006; E05C 1/08; E05C 1/085; E05C 1/12; E05C 1/14; E05B 7/00; E05B 79/12; E05B 79/16; Y10T 292/57; Y10T 292/0972; Y10T 292/0974;

(Continued)

(56) References Cited

U.S. PATENT DOCUMENTS

| | | | |
|---|---|---|---|
| 437,007 | A | 9/1890 | Sorensen |
| 1,964,066 | A | 6/1934 | Kuszmaul |

(Continued)

FOREIGN PATENT DOCUMENTS

| | | |
|---|---|---|
| EP | 1162332 | 12/2001 |
| EP | 2278102 | 1/2011 |

(Continued)

*Primary Examiner* — Kristina R Fulton
*Assistant Examiner* — Noah Horowitz
(74) *Attorney, Agent, or Firm* — PRICE HENEVELD LLP

(57) ABSTRACT

A latch assembly comprises an exterior housing, a door latch, a plunger, a resilient member, and an external lever pivotally mounted on an outer face of the exterior housing. The external lever comprises a first leg, a second leg disposed at an angle relative to the first leg, and a pivot mount disposed between the first leg and the second leg. The plunger is maintained in the latched position when the external lever is in a latched position by the resilient member, whereby an entry door cannot be unintentionally shifted from the closed position. The plunger is displaced from the latched position to the unlatched position when the external lever is rotated from the latched position to the unlatched position by the second leg bearing against the plunger, whereby the entry door is free to be shifted from the closed position to the open position.

17 Claims, 43 Drawing Sheets

Related U.S. Application Data of application No. 16/846,906, filed on Apr. 13, 2020, now Pat. No. 11,692,379, which is a continuation-in-part of application No. 15/951,892, filed on Apr. 12, 2018, now Pat. No. 11,377,885.

(51) Int. Cl.

| | | |
|---|---|---|
| *E05B 77/34* | (2014.01) | |
| *E05B 83/44* | (2014.01) | |
| *E05B 85/06* | (2014.01) | |
| *E05B 85/16* | (2014.01) | |

(52) U.S. Cl.
CPC ......... *E05B 85/16* (2013.01); *E05Y 2900/512* (2013.01); *E05Y 2900/531* (2013.01)

(58) Field of Classification Search
CPC ......... Y10T 292/0975; Y10T 292/0994; Y10T 292/0997; Y10T 292/1015; Y10T 292/102
See application file for complete search history.

(56) References Cited

U.S. PATENT DOCUMENTS

| | | | | |
|---|---|---|---|---|
| 2,034,655 | A * | 3/1936 | Hansen | E05C 1/14 |
| | | | | 70/370 |
| 2,074,979 | A * | 3/1937 | Brantingson | E05B 15/024 |
| | | | | 292/148 |
| 2,427,386 | A | 9/1947 | Arthur | |
| 2,433,278 | A * | 12/1947 | Jakeway | E05B 65/005 |
| | | | | 70/202 |
| 2,680,638 | A * | 6/1954 | Groeger | E05B 65/0053 |
| | | | | 292/DIG. 65 |
| 2,743,953 | A | 5/1956 | Marra et al. | |
| 4,508,377 | A * | 4/1985 | Takasaki | E05B 65/0053 |
| | | | | 292/DIG. 65 |
| 4,704,882 | A * | 11/1987 | Takasaki | E05C 1/14 |
| | | | | 70/215 |
| 4,732,417 | A | 3/1988 | Yang | |
| 5,425,560 | A | 6/1995 | Andersen et al. | |
| 5,983,682 | A | 11/1999 | Parikh | |

| | | | | |
|---|---|---|---|---|
| 6,131,966 | A | 10/2000 | Hensley et al. | |
| 6,309,008 | B1 | 10/2001 | Bacon | |
| D485,155 | S | 1/2004 | Bacon | |
| 6,685,240 | B2 | 2/2004 | Bacon | |
| 6,701,761 | B1 | 3/2004 | Chang et al. | |
| 8,186,191 | B2 | 5/2012 | Bacon | |
| 8,347,667 | B2 | 1/2013 | Bacon | |
| 8,393,187 | B2 | 3/2013 | Bacon | |
| 8,419,089 | B2 * | 4/2013 | Bacon | E05C 1/12 |
| | | | | 119/501 |
| 8,534,718 | B2 * | 9/2013 | Loret de Mola | E05C 1/12 |
| | | | | 292/191 |
| 8,621,901 | B2 | 1/2014 | Bacon | |
| 8,733,139 | B2 * | 5/2014 | Pickar | E05B 85/12 |
| | | | | 292/DIG. 31 |
| 8,960,733 | B1 | 2/2015 | Smith | |
| 9,085,919 | B2 | 7/2015 | Bacon | |
| 9,145,713 | B1 | 9/2015 | Norris | |
| 9,260,888 | B1 * | 2/2016 | Yun | E05C 1/10 |
| 9,464,467 | B1 | 10/2016 | Flannery et al. | |
| 9,940,767 | B2 | 4/2018 | Bacon | |
| 10,400,487 | B1 | 9/2019 | Flannery et al. | |
| 10,982,469 | B2 | 4/2021 | Frattini et al. | |
| 11,598,128 | B2 * | 3/2023 | Murata | E05B 81/16 |
| 2012/0274457 | A1 | 11/2012 | Burns et al. | |
| 2013/0097938 | A1 | 4/2013 | Madrid | |
| 2013/0098124 | A1 | 4/2013 | Williams | |
| 2013/0133384 | A1 | 5/2013 | Pickar | |
| 2015/0001859 | A1 * | 1/2015 | Minix | E05C 1/145 |
| | | | | 292/66 |
| 2015/0330108 | A1 | 11/2015 | Harrison | |
| 2015/0345188 | A1 | 12/2015 | Puscas et al. | |
| 2016/0017638 | A1 | 1/2016 | Vasudevan et al. | |
| 2016/0130845 | A1 | 5/2016 | Park | |
| 2017/0030107 | A1 | 2/2017 | Naka | |
| 2018/0016810 | A1 | 1/2018 | Bacon et al. | |
| 2019/0128030 | A1 | 5/2019 | Bacon | |

FOREIGN PATENT DOCUMENTS

| | | | | |
|---|---|---|---|---|
| WO | 2017129333 | | 8/2017 | |
| WO | WO-2017129333 A1 * | 8/2017 | | E05B 81/76 |

* cited by examiner

SQUEEZE TRIGGER LATCH

CROSS-REFERENCE TO RELATED APPLICATIONS AND CLAIM TO PRIORITY

This application is a continuation-in-part of and claims priority under 35 U.S.C. § 120 to commonly assigned, co-pending, and related U.S. patent application Ser. No. 18/200,029, filed May 22, 2023, which is a continuation-in-part of U.S. Pat. No. 11,692,379, issued Jul. 4, 2023, which is a continuation-in-part of and claims priority under 35 U.S.C. § 120 to commonly assigned and related U.S. Pat. No. 11,377,885, issued Jul. 5, 2022, the entire disclosures of which are incorporated herein by reference.

BACKGROUND OF THE INVENTION

The present invention relates to latch assemblies for movable closures and the like, and, in particular, to a latch assembly for a recreational vehicle that can be manually actuated by an external lever pivotally mounted on the outer face of the exterior housing.

Latch assemblies are generally well-known in the art, and may be flush mounted on an associated closure, such as a door, to facilitate selectively shifting the closure between an open unlocked position and a closed locked position. Paddle handle assemblies are used widely on entry doors as latch assemblies for recreational vehicles, motor homes, and the like, and in such applications require that the latch mechanism be accessible and operable from both the inside and the outside of the vehicle. Typically, such paddle handle assemblies include a deadbolt lock for added security.

Heretofore, while paddle handle assemblies have proven generally effective, they experience certain drawbacks. For example, it is sometimes difficult for a user to obtain a positive grip with certain paddle handle assemblies, particularly in the case of a left-handed person operating a paddle handle assembly mounted on the left side of the door exterior or a right-handed person operating a paddle handle assembly mounted on the right side of the door exterior, where the paddle handle is extending in the direction opposite that of the user's favored hand. Also, some prior art paddle handle assemblies experience a problem in maintaining the alignment between the deadbolt and the associated strike. Further, it is sometimes difficult to lock a paddle handle assembly from the exterior. In addition, many prior art paddle handle assemblies have a rather complicated construction, which is expensive to manufacture and difficult to repair. Hence, a latch assembly that overcomes these drawbacks would be advantageous.

SUMMARY OF THE INVENTION

One aspect of the present invention is a latch assembly adapted for mounting adjacent an associated closure of the type that can be shifted between an open position and a closed position. The latch assembly comprises an exterior housing having an inner face and an outer face, and a door latch disposed proximate a side edge of the exterior housing and adapted to engage a jamb section of a door opening, the door latch having a door open position and a door closed position. A plunger is operably connected with the door latch and is slidingly received within a plunger recess operably coupled with the inner face of the exterior housing, wherein the plunger has a latched position and an unlatched position within the plunger recess, and a resilient member is operably coupled with the plunger and urges the plunger to the latched position. An external lever is pivotally mounted on the outer face of the exterior housing for rotation between a latched position and an unlatched position, the external lever comprising a first leg, a second leg disposed at an angle relative to the first leg, and a pivot mount disposed between the first leg and the second leg, the second leg of the external lever being operably coupled with the plunger. The plunger is maintained in the latched position by the resilient member when the external lever is in the latched position, whereby the closure cannot be unintentionally shifted from the closed position, and wherein the plunger is displaced from the latched position to the unlatched position by the second leg of the external lever when the external lever is rotated from the latched position to the unlatched position, whereby the closure is free to be shifted from the closed position to the open position.

These and other advantages of the invention will be further understood and appreciated by those skilled in the art by reference to the following written specification, claims, and appended drawings.

DETAILED DESCRIPTION OF THE PREFERRED EMBODIMENTS

Figure 1:
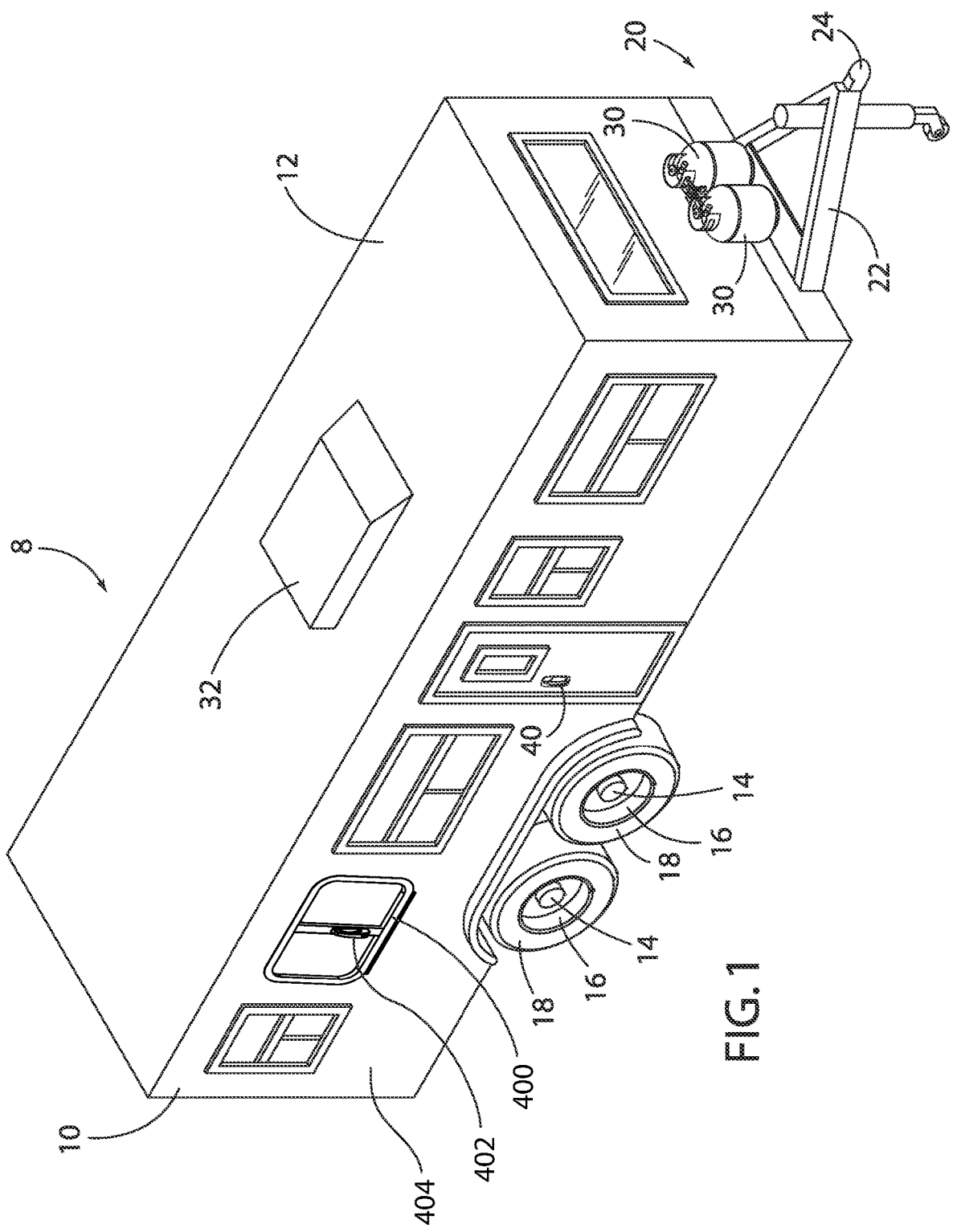
FIG. 1 is a front side perspective view of a recreational vehicle provided with a plurality of ceiling vents on a roof portion thereof.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise. Further, to provide clarity, like structures amongst the various embodiments disclosed herein are referred to by common reference numbers.

Referring to FIG. 1, reference numeral 8 generally designates a recreational vehicle travel trailer particularly adapted for being towed by a motor vehicle (not shown). However, other recreational vehicle 8 configurations may advantageously employ the benefits of the present disclosure, such as and including motor coaches and so-called fifth wheel travel trailers. In the embodiment contemplated herein, the recreational vehicle 8 generally comprises a body 10 that is primarily supported by a pair of axles 14, each comprising an axle assembly 16 and at least one pair of opposed road wheels 18, and a trailer tongue 22 by which the recreational vehicle 8 be attached to the tow vehicle. As is typical, the recreational vehicle 8 has a closure or entry door 20 for ingress and leakage and a plurality of windows 22 arranged on side walls 24 of the body 10. A roof portion 12 is provided to enclose the body 10. Propane tanks 30 mounted to the trailer tongue 22 may also be included. Also, optionally, an air conditioning unit 32 can be mounted on the roof portion 12.

The reference numeral 40 in the Figures generally designates a latch assembly 40 embodying a first embodiment of the present invention. Latch assembly 40 may be mounted on associated closure 20 and, more particularly, where the closure 20 is an entry door for a recreational vehicle 8, as shown, as well as on a motor home, trailer, shed, or the like, wherein the closure 20 can be pivotally shifted between open and closed positions along a substantially vertical hinge axis. For purposes of the present disclosure, the closure 20 will be referred to as the entry door 20. However, it is to be understood that the closure 20 can also include closures for other applications, and closures other than doors, such as hatches and the like.

Figure 2:
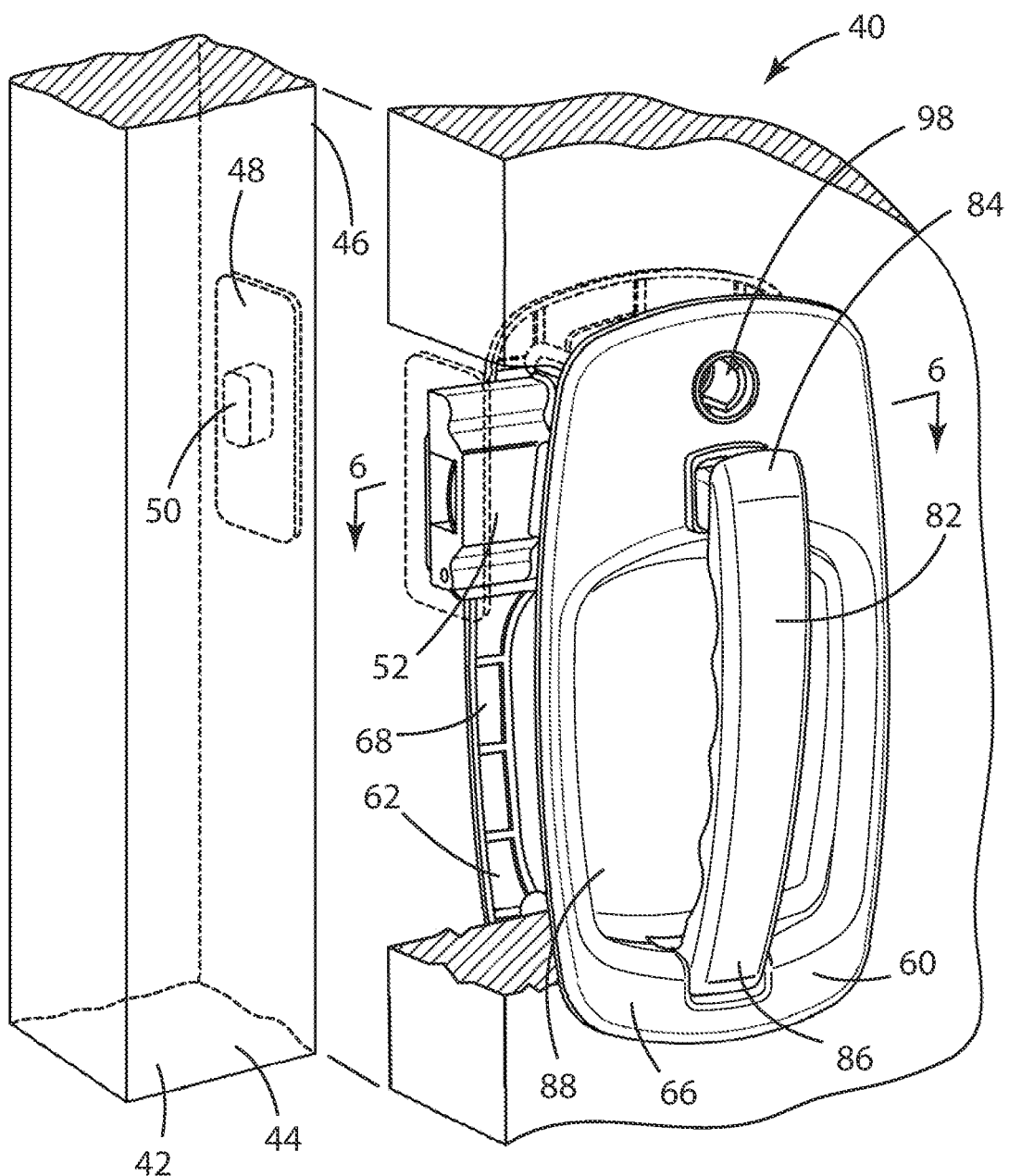
FIG. 2 is a perspective exterior view of a first embodiment of the latch assembly of the present disclosure, shown with the door latch in an unlatched position.
Figures 3, 4:
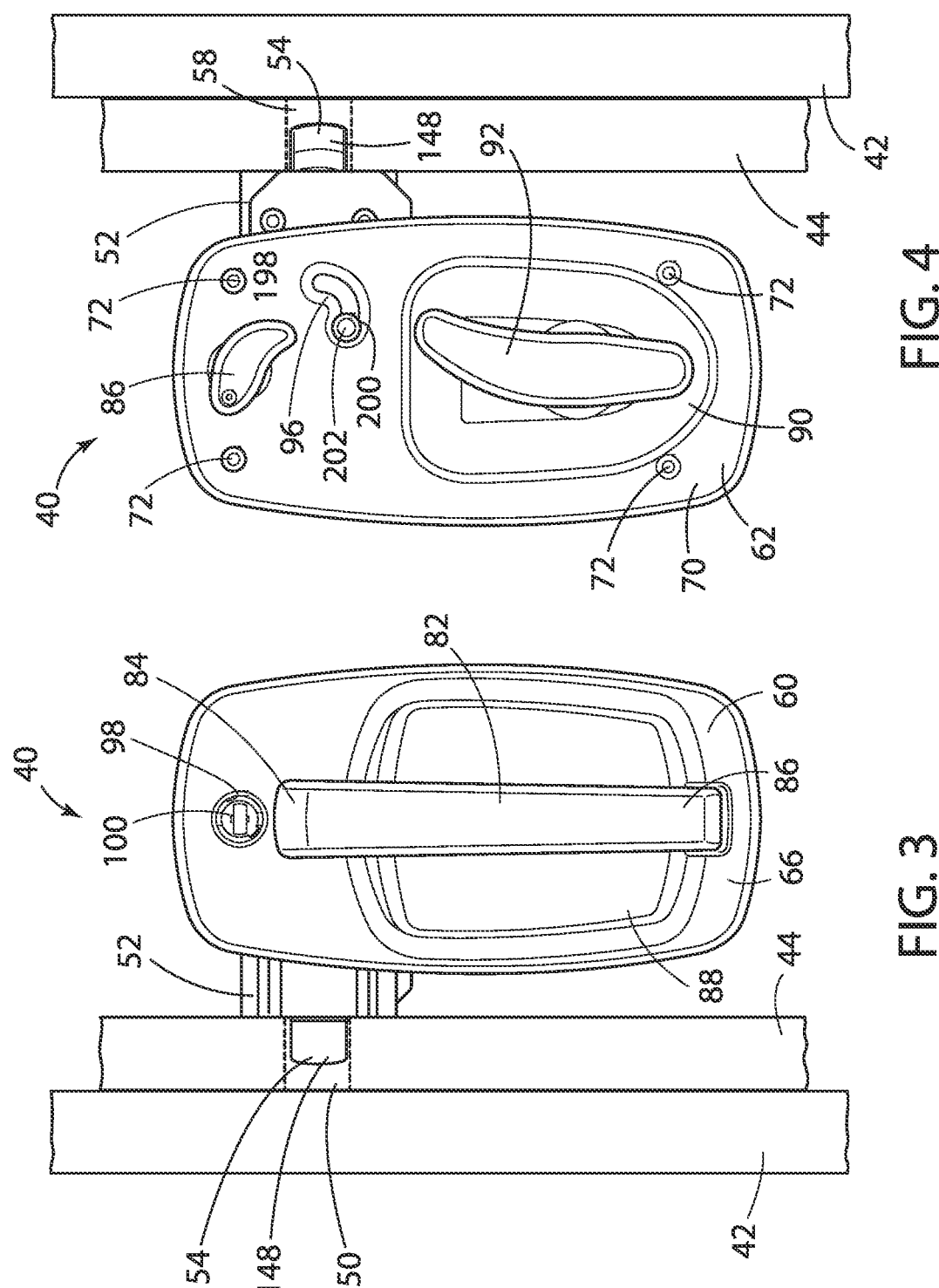
FIG. 3 is an exterior elevation view of the first embodiment of the latch assembly of the present disclosure shown in FIG. 2.
FIG. 4 is interior elevation view of the first embodiment of the latch assembly of the present disclosure shown in FIG. 2.

As shown in FIG. 2, closure or entry door 20 selectively engages a door frame 42 having a jamb section 44 that defines an associated door opening 46 and in which a door strike 48 is mounted. The door strike 48 includes a horizontally extending recess 50 extending into the jamb section 44 into which an associated portion of a door latch 52 (such as a spring bolt 54) and deadbolt 56 (if equipped, as shown in FIGS. 15-28) engages and disengages, respectively, to selectively retain the entry door 20 in the fully closed position, as described in greater detail hereinafter. Of course, door strike recess 50 can be a single recess or may be separate recesses where a separate deadbolt 56 is utilized.

As best illustrated in FIGS. 2-13, the latch assembly 40 generally comprises a two-part construction, including an exterior housing 60 and an interior housing 62. A left-hand version of the latch assembly 40 is shown in FIGS. 2-9, while the right-hand version is shown in FIGS. 10-13. Otherwise, both versions include the same components.

As shown in the FIGS. 2, 3, 5, and 10-12, the exterior housing 60 has an inner face 64 and an outer face 66. Similarly, the interior housing 62 has having an inner face 68 and an outer face 70, as shown in FIGS. 4, 8, 9, and 13. The interior housing 62 may be attached to the exterior housing 60 by fasteners 72 extending through a plurality of openings 74 extending through and disposed about the margin 76 of the interior housing 62 and attached to a plurality of bosses 78 disposed about the margin 80 of the exterior housing 60. Thus, the latch assembly 40, as installed, may be disposed on either side of the entry door 20 and received within a through-cavity (as best depicted in FIG. 2) in the entry door 20, where the latch assembly 40 may be accessed from both the exterior and interior of the recreational vehicle 8, as further described below.

An external lever handle 82 is mounted to the outer face 66 of the exterior housing 60 and has a first end 84 and a second end 86, wherein the first end 84 is operably coupled with the door latch 52 and the second end 86 is pivotally mounted on the outer face 66 of the exterior housing 60 for rotation of the external lever handle 82 between a retracted position and an extended position.

The illustrated exterior housing 60 includes a centrally disposed, bowl-shaped external lever recess 88 located directly behind the external lever handle 82, which provides finger access to facilitate actuation of the external lever handle 82 between the retracted and extended position. Similarly, the illustrated interior housing 62 includes a centrally disposed, bowl-shaped interior recess 90 directly behind an interior door release control 92, which provides finger access to facilitate rotation of the interior door release control 92 between a latched and unlatched position. It should be understood that for each of the embodiments described below, the interior door release control 92 may be used to pull the closure 20 closed. Further, the interior door release control 92 may be replaced with an interior door release control of a paddle type, but the lever style shown is considered easier to actuate. The inner face 68 of the interior housing 62 further may comprise an integrally formed hook 94 disposed proximate the margin 76 thereof adapted to engage and capture a screen door lever (not shown) of a recreational vehicle, as is known in the art.

The marginal upper portion 96 of the exterior housing 60 also includes a lock aperture 98 in which an external lock cylinder 100 is mounted. The door latch 52 is disposed proximate a side of the exterior housing 60 and interior housing 62 and is adapted to engage the jamb section 44 of the door opening 46, the door latch 52 having a door open position and a door closed position.

A plunger 102 is slidingly received within a plunger recess 104 disposed proximate the inner face 64 of the exterior housing 60 and operably connected with the latch assembly 40. The plunger recess 104 may be integrally formed on the inner face 64 of the exterior housing 60. The plunger 102 is adapted to slide and thereby shift between a latched position and an unlatched position within the plunger recess 104 and is provided with a longitudinal slot 106 within which a plunger cam surface 108 is disposed. An inside plate 110 may be mounted to the inner face 64 of the exterior housing 60, wherein the plunger 102 is disposed between the exterior housing 60 and the inside plate 110 and is restrained within the plunger recess 104.

A resilient member 112 is operably coupled with the plunger 102 and urges the plunger 102 to the latched position. The resilient member 112 may be a compression spring having a first end 114 received within a cylindrical cavity 116 disposed within a first end 118 of the plunger 102 and a second end 120 abutting a terminal wall 122 of the plunger recess 104 opposite the first end 118 of the plunger 102.

A handle cam 124 is operably coupled with the first end 84 of the external lever handle 82 and is received within the longitudinal slot 106 of the plunger 102. The handle cam 124 is provided with a cam surface 126 juxtaposed against and in sliding relation with the plunger cam surface 108. The longitudinal slot 106 may be wider than handle cam 124 in order to allow the handle cam 124 to move transverse to the longitudinal slot 106, as the external lever handle 82 is rotated from the retracted position to the extended position.

The plunger 102 is maintained in the latched position when the external lever handle is in the retracted position by the resilient member 112, whereby the entry door 20 cannot be unintentionally shifted from the closed position. The resilient member 112 that is operably coupled with the plunger 102 also simultaneously acts on the handle cam 124 by urging the plunger 102 to its latched position, thereby retracting the external lever handle 82 to its retracted position. To open the entry door 20, the plunger 102 may be displaced from the latched position to the unlatched position as the external lever handle 82 is displaced from the retracted position to the extended position, whereupon the cam surface 126 of the handle cam 124 bears against the plunger cam surface 108, causing the door latch 52 to shift to the door open position, whereby the entry door 20 is free to be shifted from the closed position to the open position.

The latch assembly 40 may be provided with the interior door release control 92 mounted proximate to the outer face 70 of the interior housing 62. The interior door release control 92 may be a rotatable lever operably coupled with an inside lever cam 128, where a square opening 130 in the inside lever cam 128 may be operably coupled with a rotating square shaft 132 of the interior door release control 92. An interior plunger arm 134 may be operably coupled with the plunger 102. The interior plunger arm 134 may be integrally formed with the plunger 102 and depends therefrom in a substantially perpendicular direction relative to the longitudinal slot 106, as shown in FIGS. 5 and 10-12. In operation, rotation of the interior door release control 92 from the unlatched to the latched position urges the inside lever cam 128 against the interior plunger arm 134 to displace the plunger 102 from the latched position and an unlatched position, thereby moving the latch assembly 40 to the door open position. During this operation, the longitudinal sliding plunger may be provided with sufficient relief to allow the plunger 102 to slide to the unlatched position without contacting the handle cam 124, as shown in, for example, FIGS. 5-7.

The outer face 66 of the exterior housing 60 further may also include a lower recess 136 within which the second end 86 of the external lever handle 82 is received. This lower recess 136 may be continuous with the bowl-shaped external lever recess 88. A hinge pin 138 may be inserted within openings 140 provided in the lower recess and an opening 142 in the second end 86 of the external lever handle 82, whereby the hinge pin 138 extends across the lower recess

136 and through the opening 142 in the second end 86 of the external lever handle 82 to pivotally mount the second end 86 of the external lever handle 82 to the outer face 66 of the exterior housing 60 for rotation of the external lever handle 82 between the retracted position and an extended position. Optionally, as handle hinge spring 144 may be disposed about the hinge pin 138 and adapted to urge the external lever handle 82 to the retracted position. If so provided, the handle hinge spring 144 may be a torsion spring.

The lock aperture 98 may be provided through the exterior housing 60 through which the external lock cylinder 100 extends from the outer face 66. The external lock cylinder 100 has a locked condition and an unlocked condition, as further discussed below.

In operation, the entry door 20 can be shifted from the closed to the open position from the exterior of the recreational vehicle 8 in the following manner. With the latch assembly 40 in the unlocked position, the external lever handle 82 may be rotated outwardly from the retracted position to the extended position. Rotation of the external lever handle 82 from the retracted position to the extended position displaces the handle cam 124 outwardly, which, in turn, shifts the plunger 102 laterally inwardly. The lateral inward shifting of the plunger 102 causes the door latch 52 to shift to the unlatched position. The door latch 52 thereby disengages from the door strike recess 50 and permits the user to shift the entry door 20 from the closed position to the open position.

Entry door 20 can be similarly shifted from the closed position to the open position from the interior of the entry door 20 in the following manner. With the external lock cylinder 100 in the unlocked position, the interior door release control 92 may be actuated, which may be by rotation of a rotatable lever which displaces the interior plunger arm 134 laterally and moves the plunger 102 inwardly, which causes the door latch 52 to shift to the unlatched position. The door latch 52 thereby disengages from the door strike recess 50 and permits the user to shift the entry door 20 from the closed position to the open position.

In order to return the entry door 20 to the closed and latched position from either the exterior or interior of the entry door 20, the user simply swings the entry door 20 to the closed position, which causes the door latch 52 (here, a spring bolt 54) to strike the door strike 48 and engage the door strike recess 50. When the entry door 20 is in the fully closed and latched position, the same can be positively locked in place by rotation of the external lock cylinder 100. More specifically, a matching key is inserted into the key slot in the external lock cylinder 100, and the same are then rotated from the unlocked position to the locked position, as further discussed below.

According to a first embodiment of the latch assembly 40 disclosed herein, the door latch 52 includes a spring bolt 54 integrated with the plunger 102. That is, the plunger recess 104 and longitudinal slot 106 are perpendicular with the jamb section 44 and the spring bolt 54 integrated with the plunger 102 slides in a direction perpendicular with the jamb section 44 of the door opening 46.

The spring bolt 54 has an outer end 148 that extends exterior of the exterior housing 60 for engagement with the associated door strike 48 having a door strike recess 50 and an inner end 150 thereof which extends interior of the exterior housing 60 and is integral with the plunger 102. The outer end 148 of the spring bolt 54 may have a first inclined surface 152 that faces the door strike recess 50 on the door strike 48 when the entry door 20 is in the open position and a second inclined surface 154 that engages the door strike recess 50 when the entry door 20 is in the closed position, the second inclined surface 154 extending outwardly toward the exterior of the housing.

Thus, in accordance with the first embodiment of the latch assembly 40 disclosed herein, in order to return the entry door 20 to the closed and latched position from either the exterior or interior of the closure 20, the user simply shifts the entry door 20 to the closed position, which causes the first inclined surface 152 on the spring bolt 54 to strike the door strike 48 and thereby push the spring bolt 54 into the interior of the latch assembly 40. When the spring bolt 54 comes into registry with the door strike recess 50, the spring bolt 54 is urged back to the latched position by virtue of the spring biasing force exerted by the resilient member 112, thereby preventing the entry door 20 from being inadvertently shifted from the closed position to the open position.

The second inclined surface 154 at the outer end 148 of the spring bolt 54 also may have a slightly inclined surface relative its longitudinal length that replaces the normally flat surface opposite the first inclined surface 152. It has been found that such a second inclined surface 154, which extends outwardly toward the marginal edge of the latch assembly 40 at about 4° relative the longitudinal length of the spring bolt, provides a greater resistance to inadvertent opening of the entry door 20 and more reliable engagement with the door strike recess 50, particularly when the latch assembly 40 is applied to a recreational vehicle 8 or other mobile application subject to significant vibrations during transit.

In addition, according to the first embodiment of the latch assembly 40, the handle cam 124 has a distal end 156 proximate the cam surface 126 and the first end 84 of the external lever handle 82 is operably coupled to the handle cam 124 by a threaded fastener 158 extending through an orifice 160 in the handle cam 124 and threadingly received within a threaded opening 162 in the first end 84 of the external lever handle 82. The orifice 160 in the handle cam 124 may be provided with a shoulder 164 upon which a head 166 of the threaded fastener 158 is disposed.

As a further feature of the first embodiment of the latch assembly disclosed herein, a lock bolt rack 168 may be operably coupled with a cam gear 170 and slidably retained within a rack slot 172 transverse to the plunger recess 104 within which plunger 102 is slidably received. A deadbolt clutch 174 may be operably and rotatably coupled with the external lock cylinder 100, while the cam gear 170 may be operably and rotatably coupled with the deadbolt clutch 174.

Figure 5:
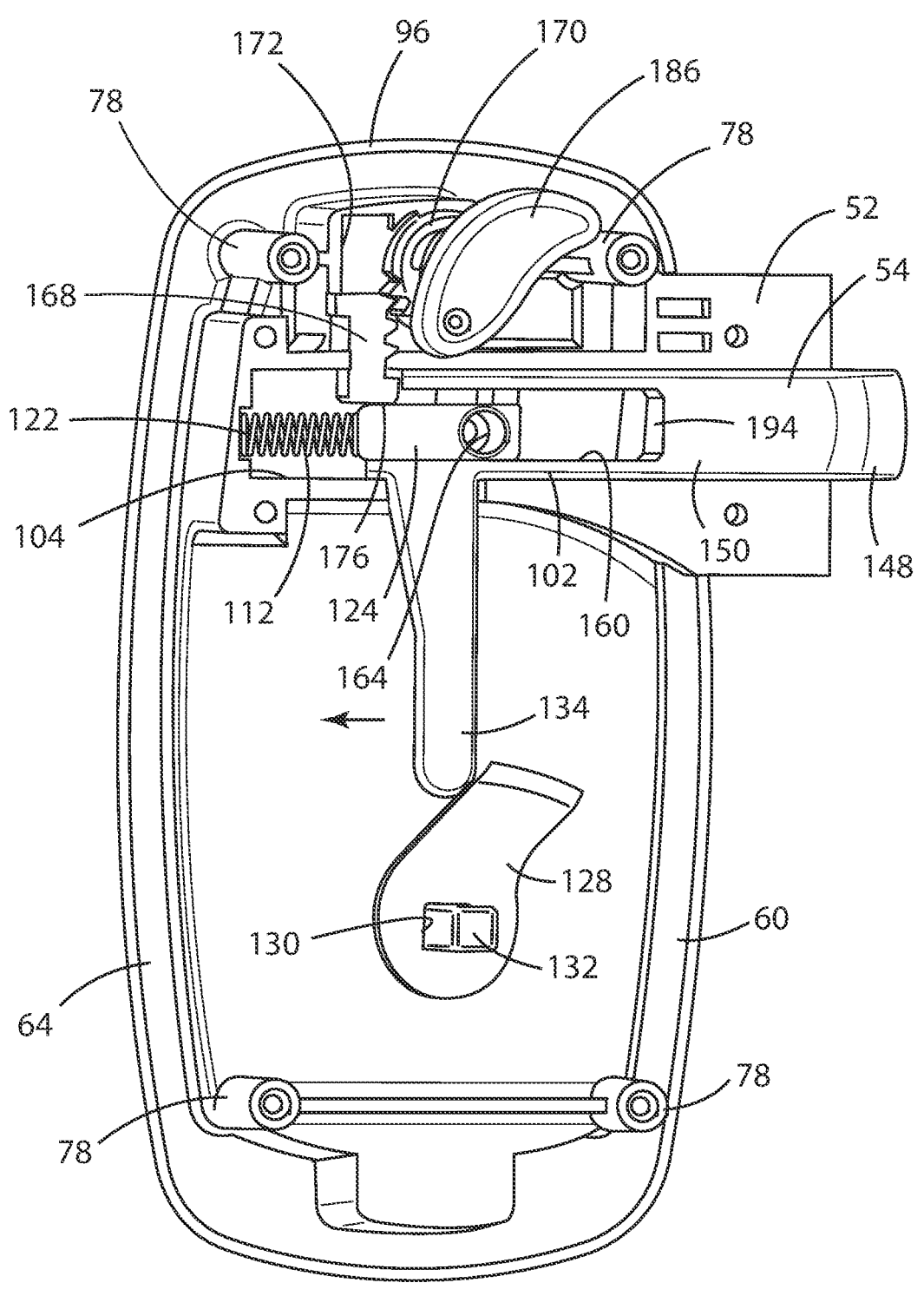
FIG. 5 is a perspective interior view of the of the inner face of the exterior housing of the first embodiment of the latch assembly of the present disclosure shown in FIG. 2.
Figures 6, 7:
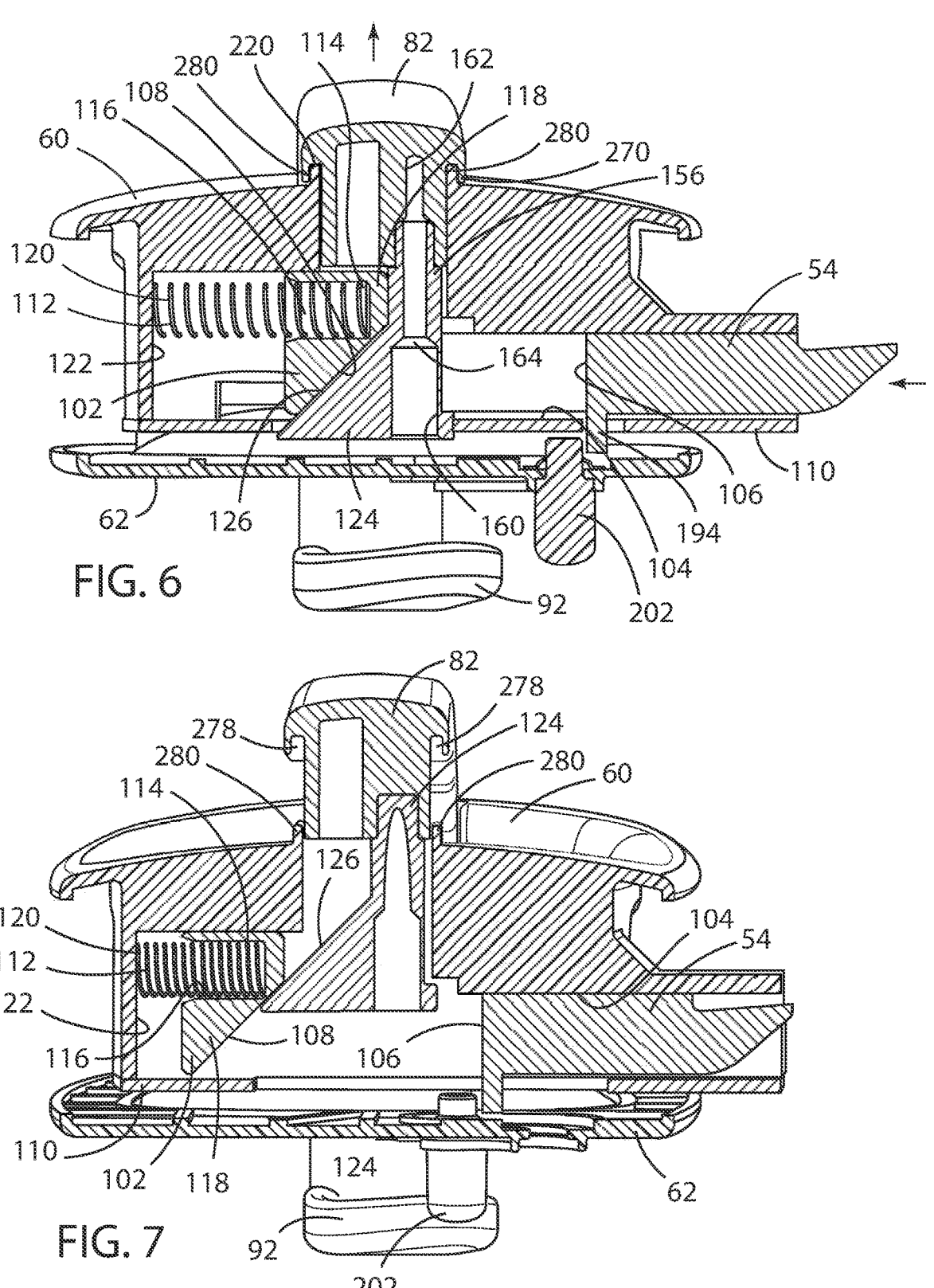
FIG. 6 is a cross-sectional view of the first embodiment of the latch assembly of the present disclosure shown in FIG. 2, with the door latch in the latched position, taken along the line 6-6 in FIG. 2.
FIG. 7 is a cross-sectional view of the first embodiment of the latch assembly of the present disclosure shown in FIG. 2, with the door latch in the unlatched position, taken along the line 6-6 in FIG. 2.
Figure 8:
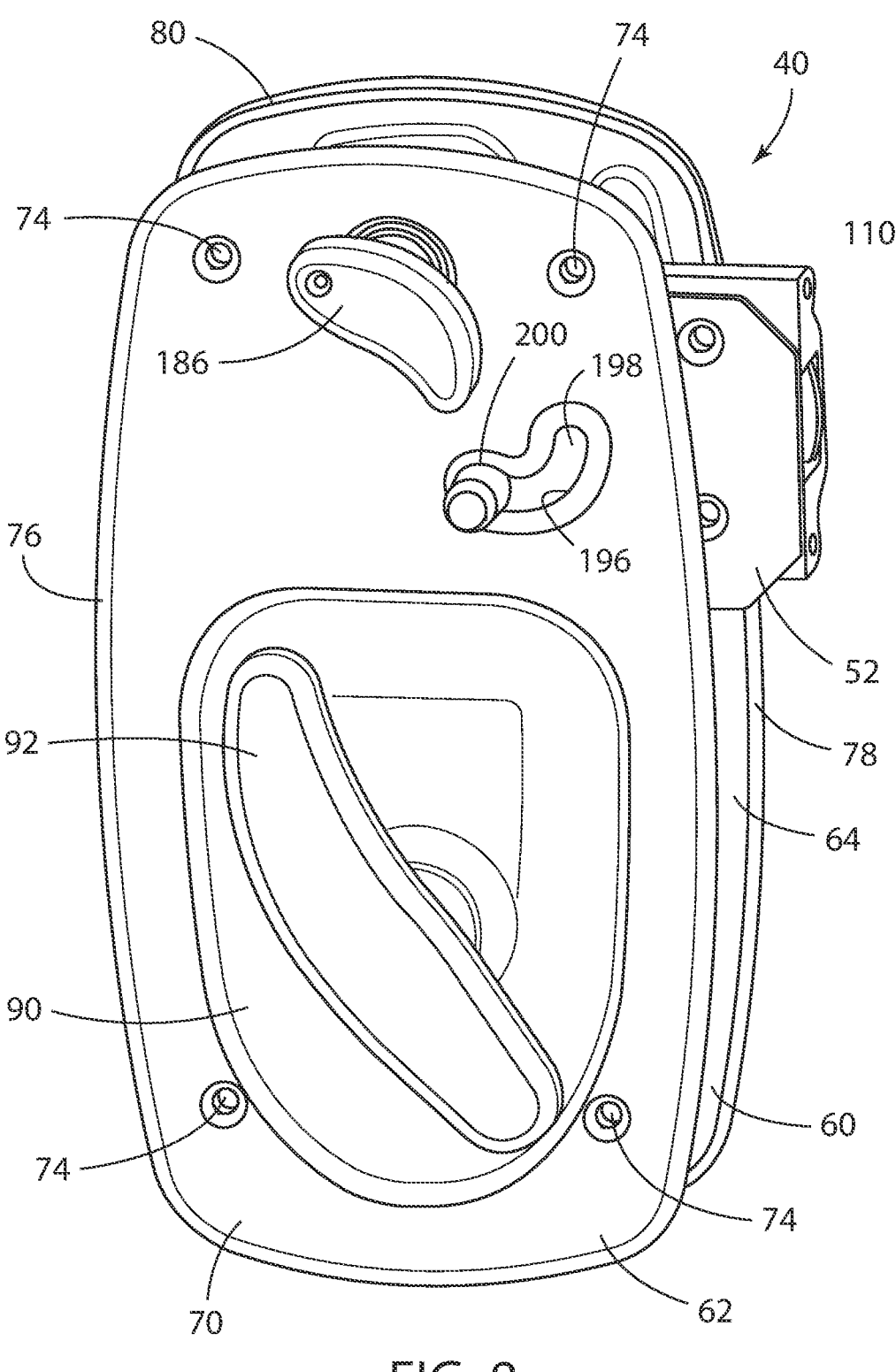
FIG. 8 is perspective interior view of a first embodiment of the latch assembly of the present disclosure, shown with the door latch in the unlatched position.
Figure 9:
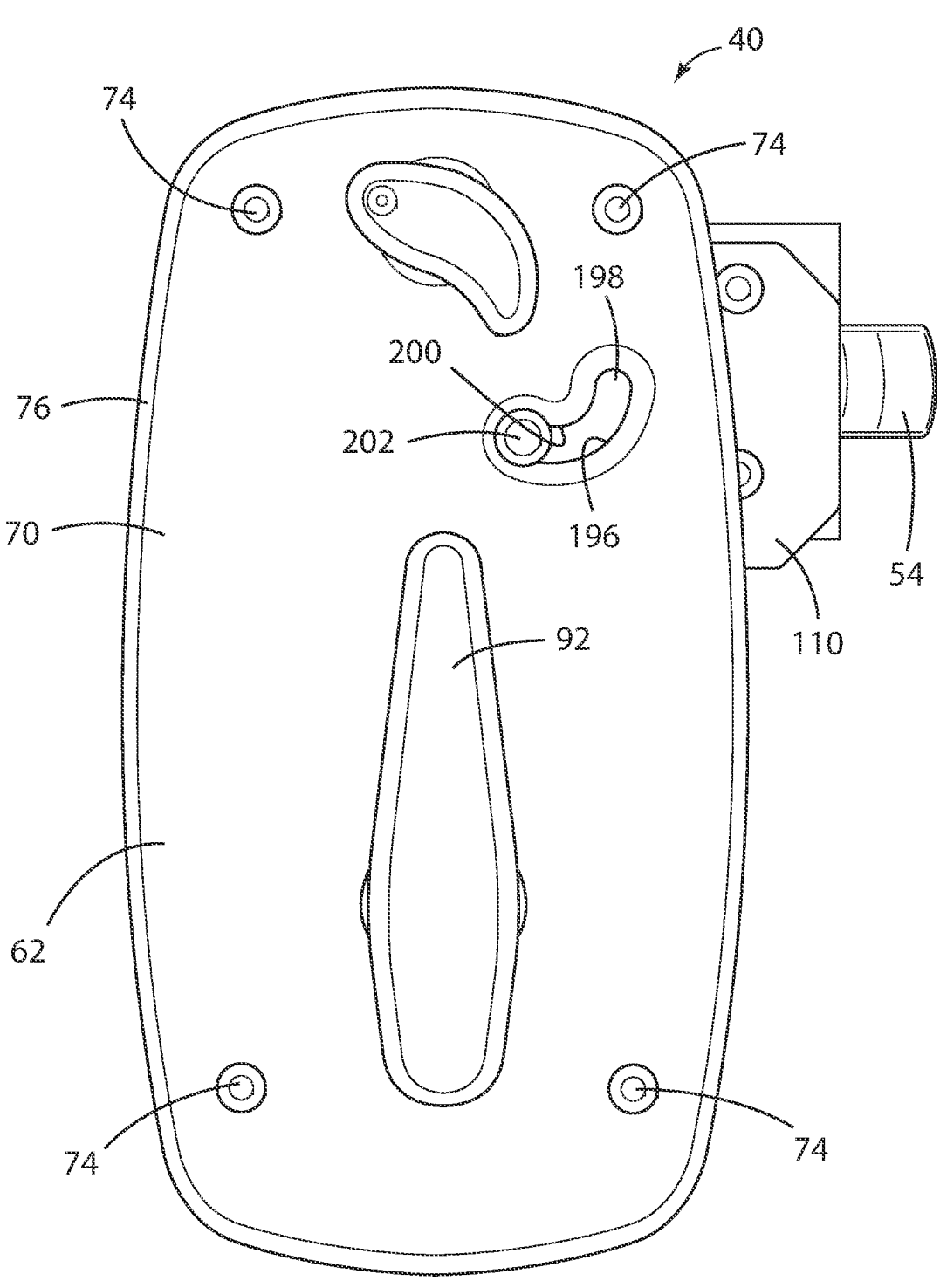
FIG. 9 is an interior elevation view of a first embodiment of the latch assembly of the present disclosure, shown with the door latch in the latched position.
Figure 11:
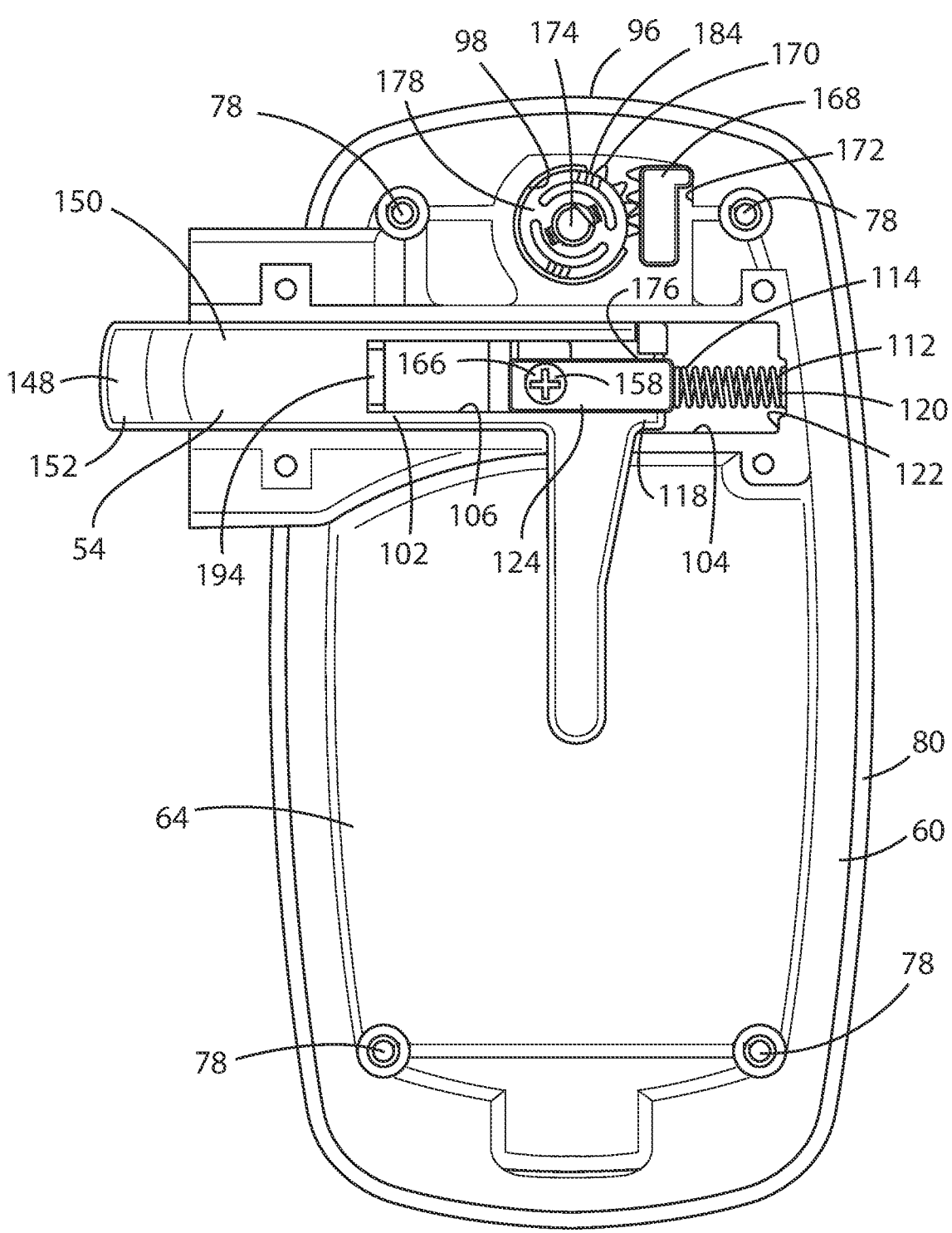
FIG. 11 is an interior elevation view of the of the inner face of the exterior housing of the first embodiment of the latch assembly of the present disclosure shown in FIG. 2, with the lock bolt rack in the unlocked position.
Figure 12:
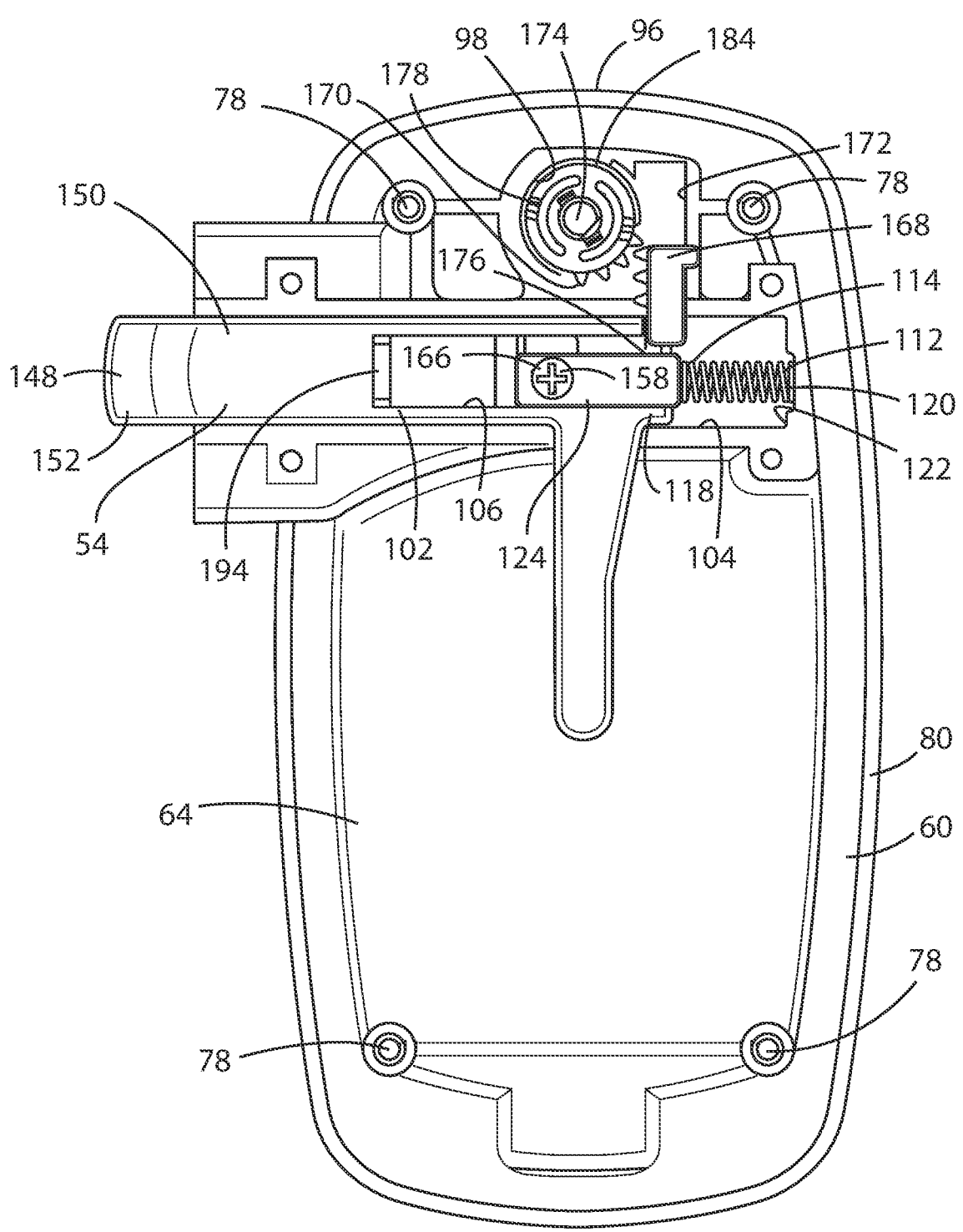
FIG. 12 is an interior elevation view of the of the inner face of the exterior housing of the first embodiment of the latch assembly of the present disclosure shown in FIG. 2, with the lock bolt rack in the locked position.
Figure 13:
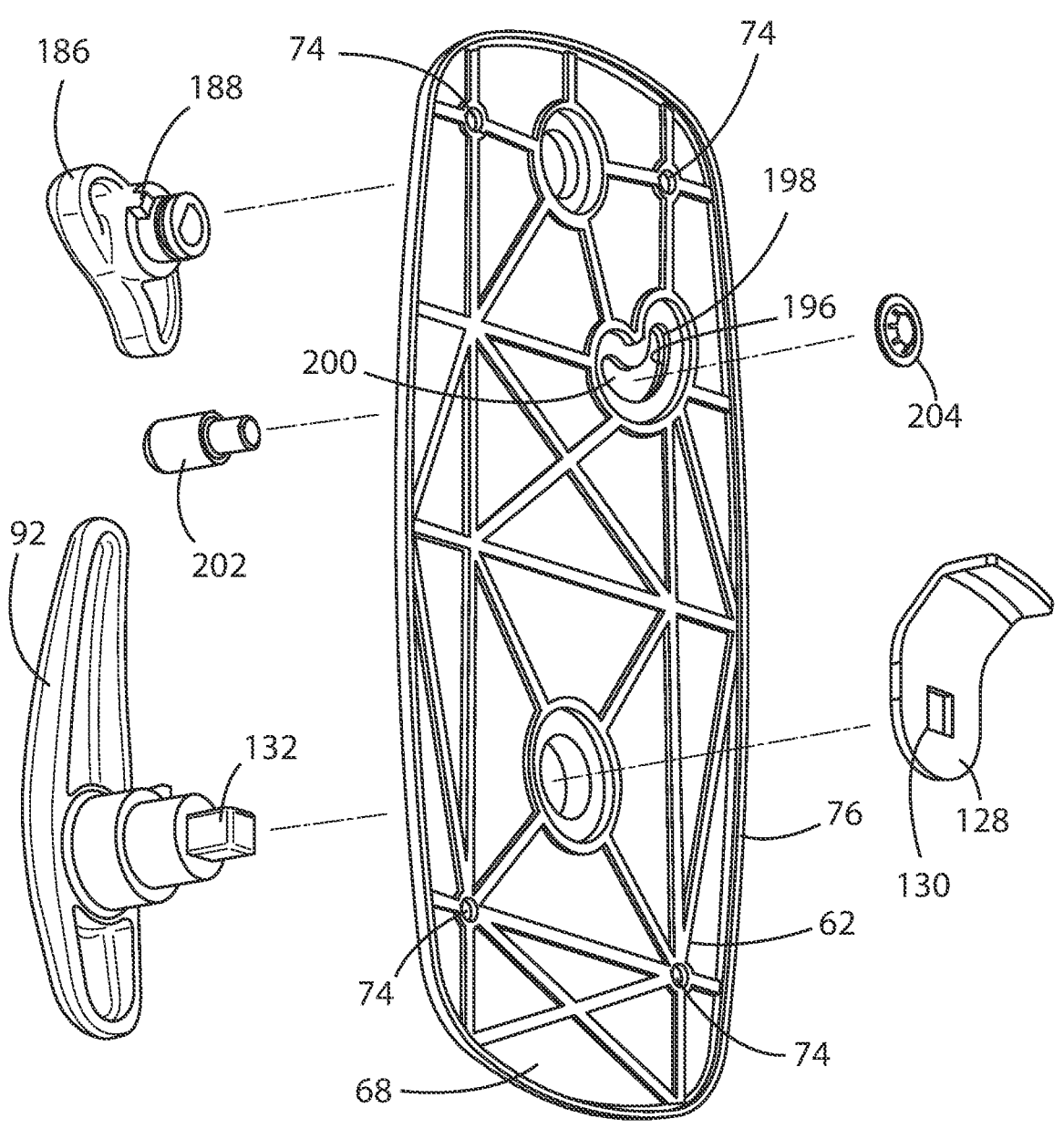
FIG. 13 is an exploded perspective view of the interior housing assembly of the first embodiment of the latch assembly of the present disclosure shown in FIG. 2.
Figure 14:
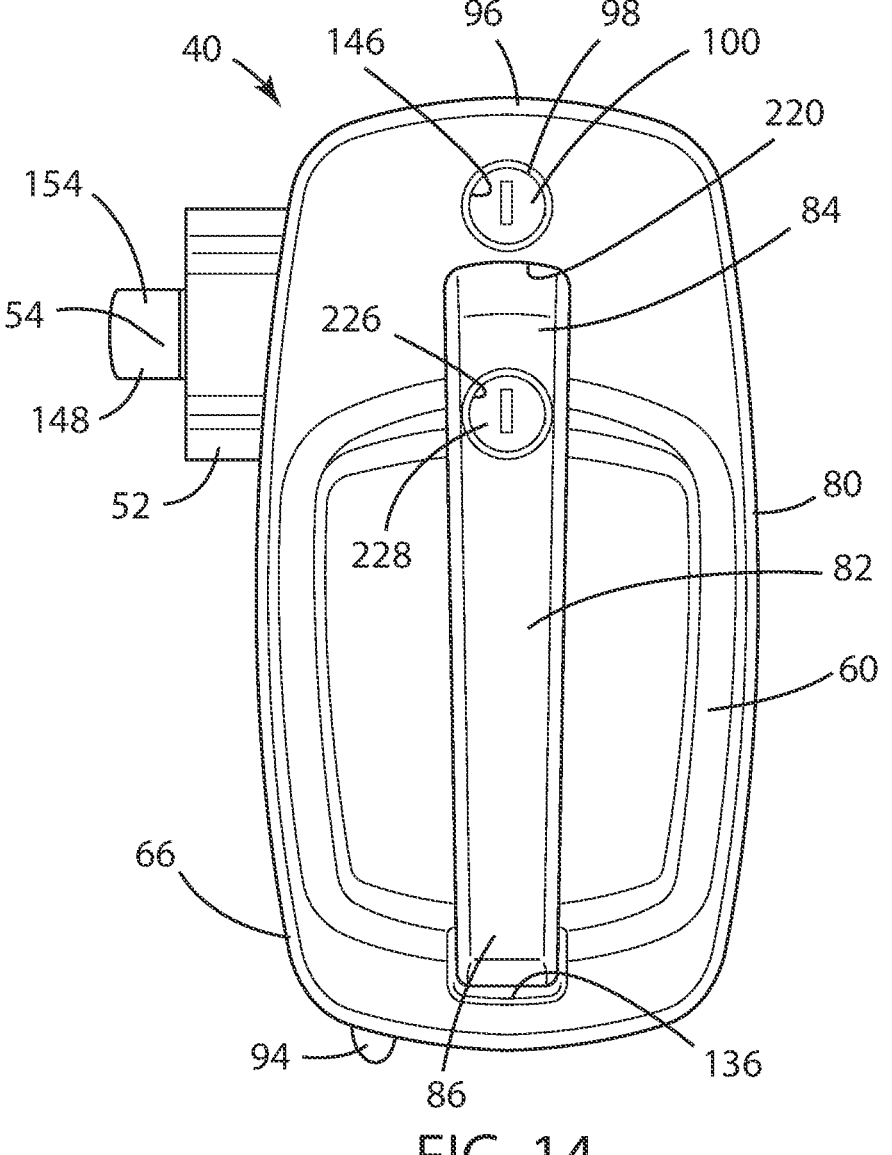
FIG. 14 is an exterior elevation view of a second embodiment of the latch assembly of the present disclosure, shown with the door latch in the latched position.
Figure 15:
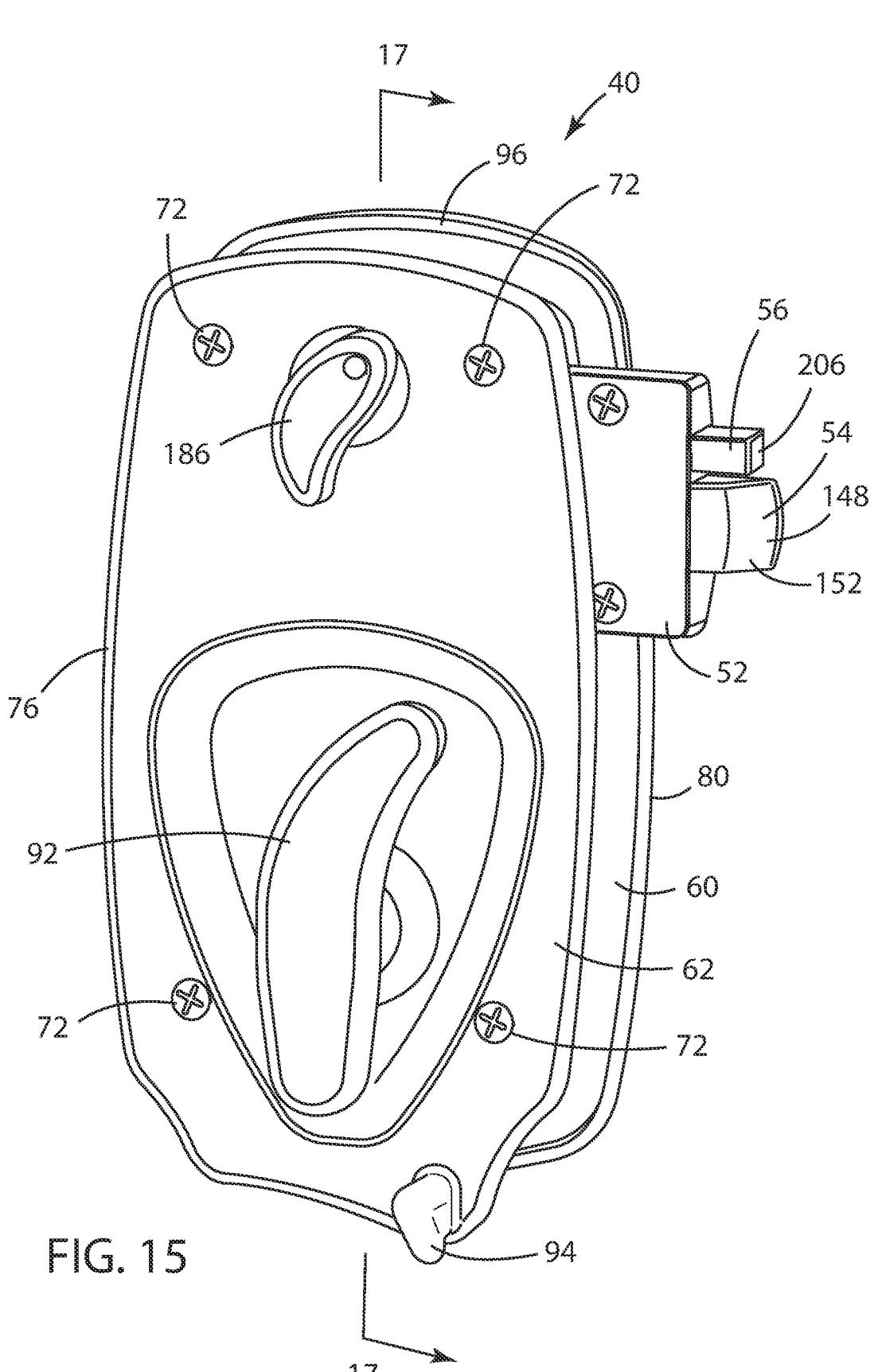
FIG. 15 is perspective interior view of the second embodiment of the latch assembly of the present disclosure, shown with the door latch and deadbolt in the latched position.
Figure 16:
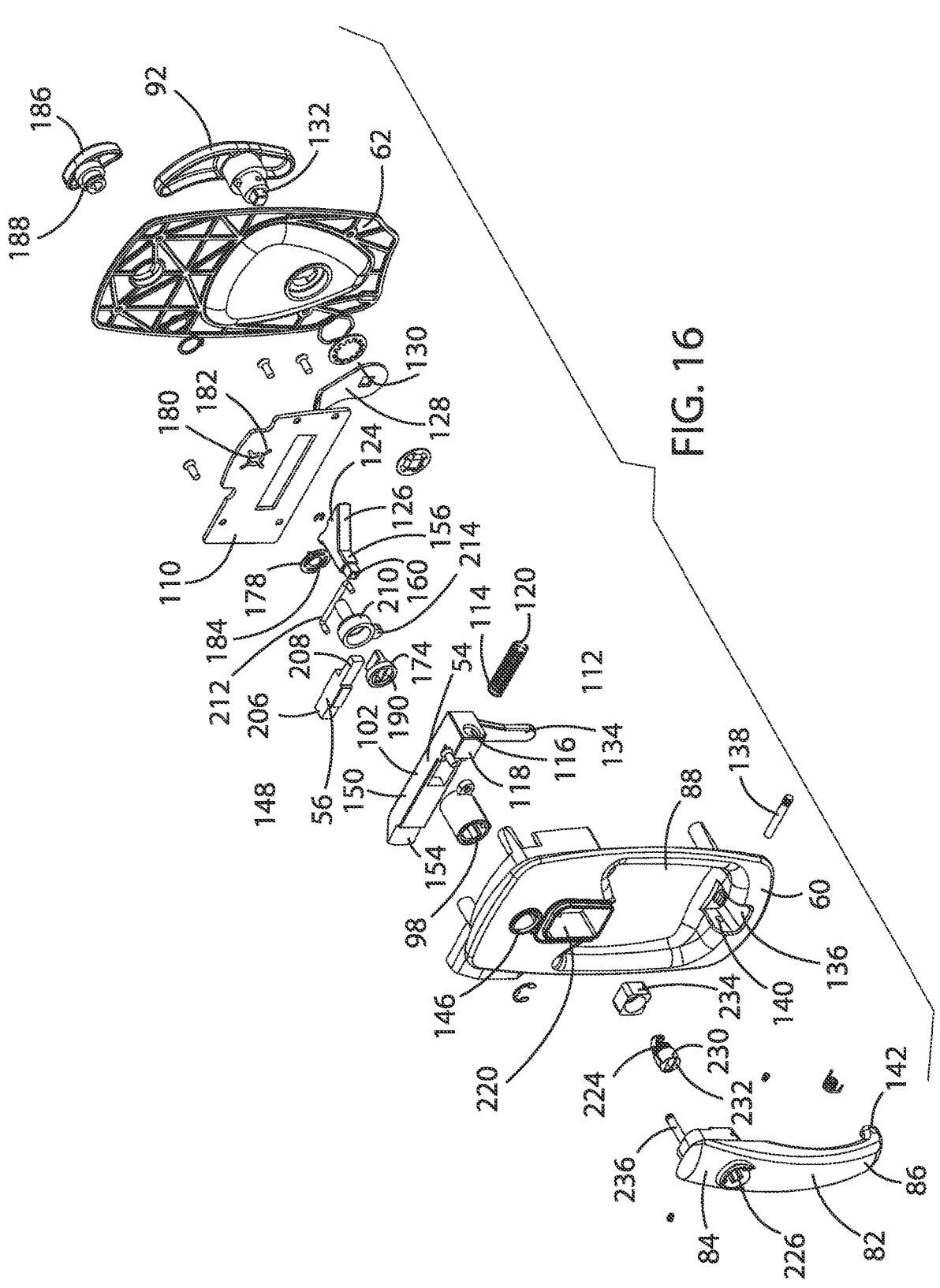
FIG. 16 is an exploded perspective interior view of the second embodiment of the latch assembly of the present disclosure shown in FIG. 15.
Figure 17:
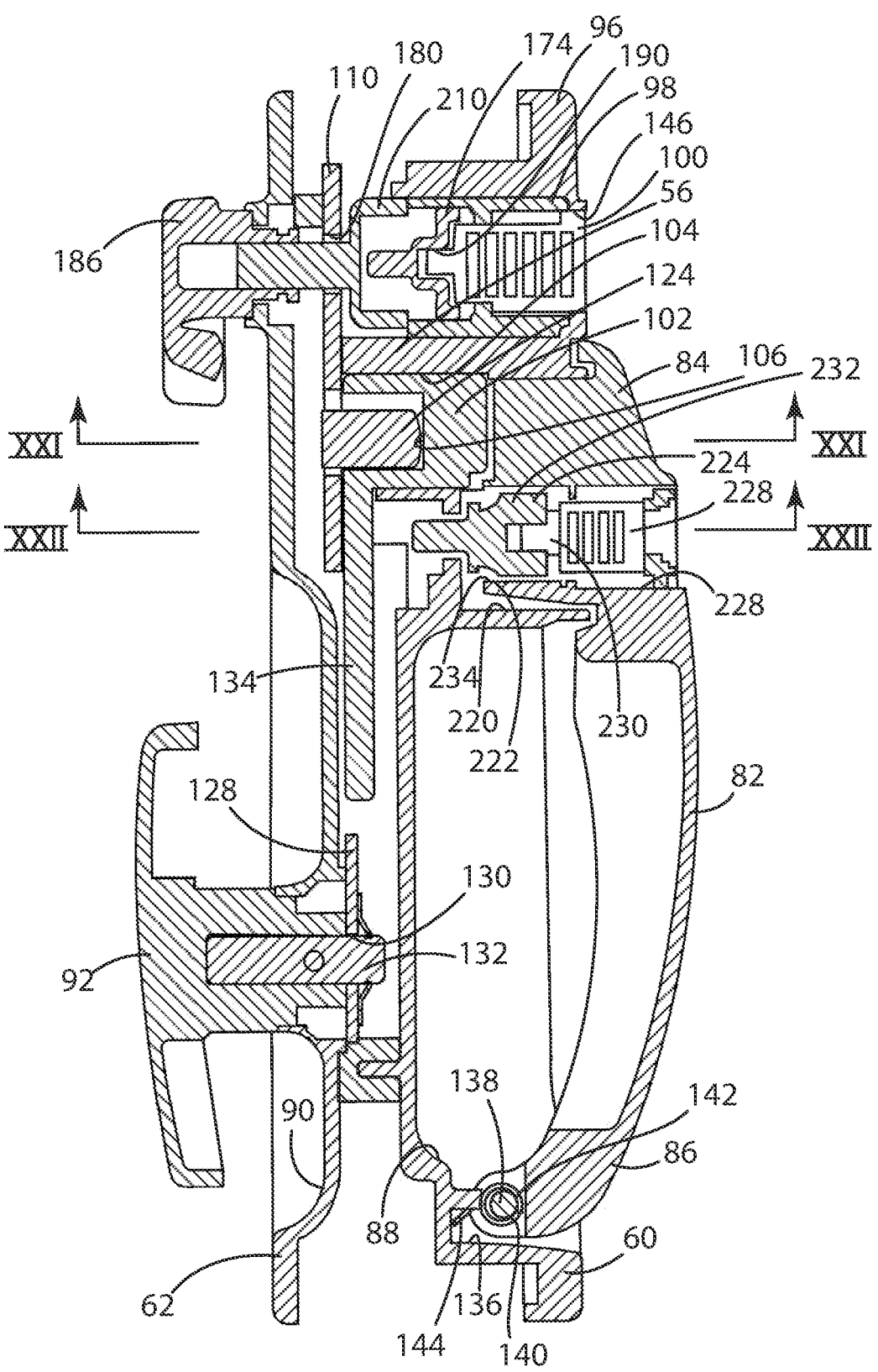
FIG. 17 is a cross-sectional view of the second embodiment of the latch assembly of the present disclosure shown in FIG. 15, taken along the line 17-17 in FIG. 15.
Figure 18:
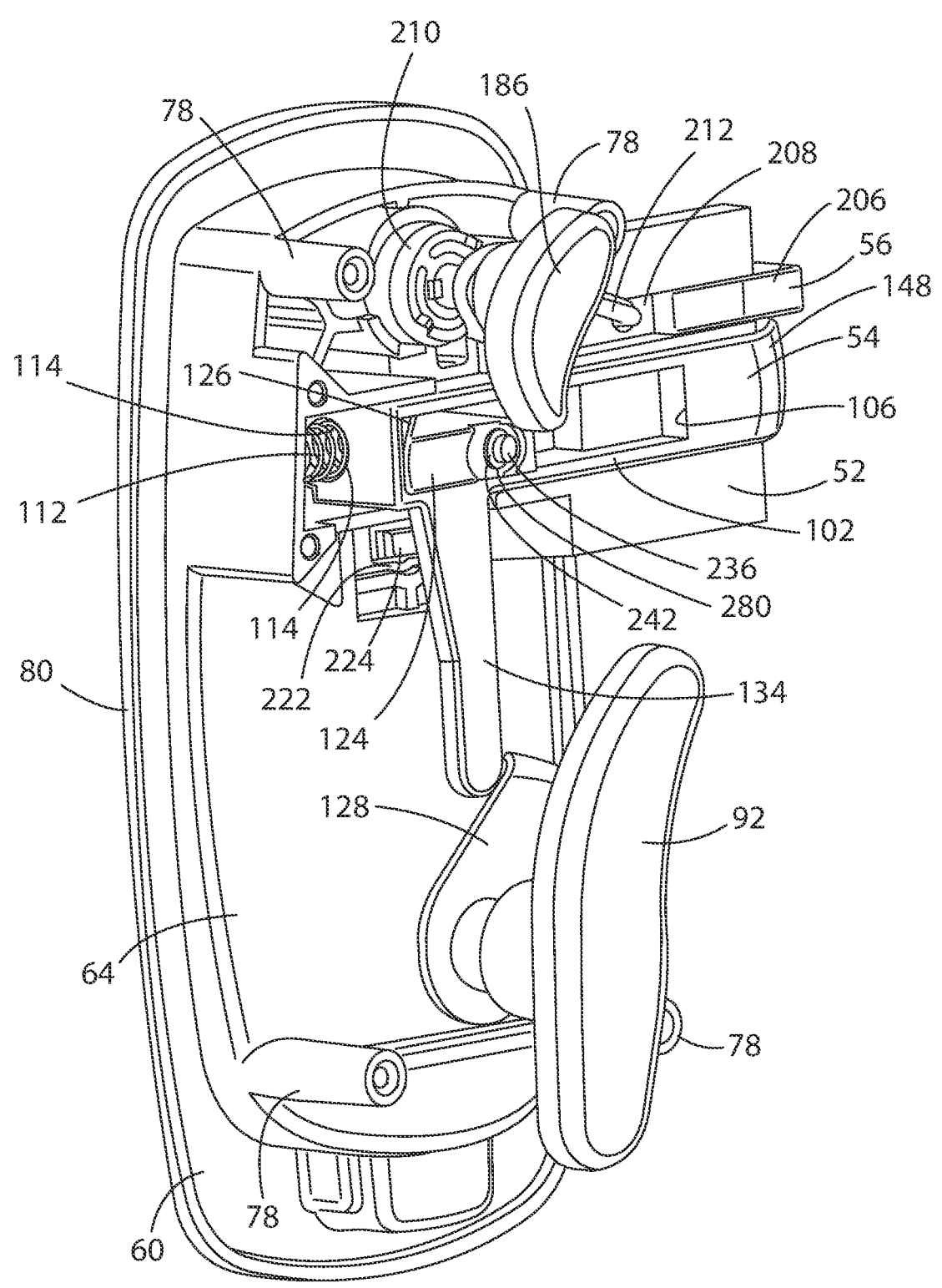
FIG. 18 is a perspective view of the inner face of the exterior housing of the second embodiment of the latch assembly of the present disclosure shown in FIG. 15, with the spring bolt and deadbolt in the latched position.
Figure 19:
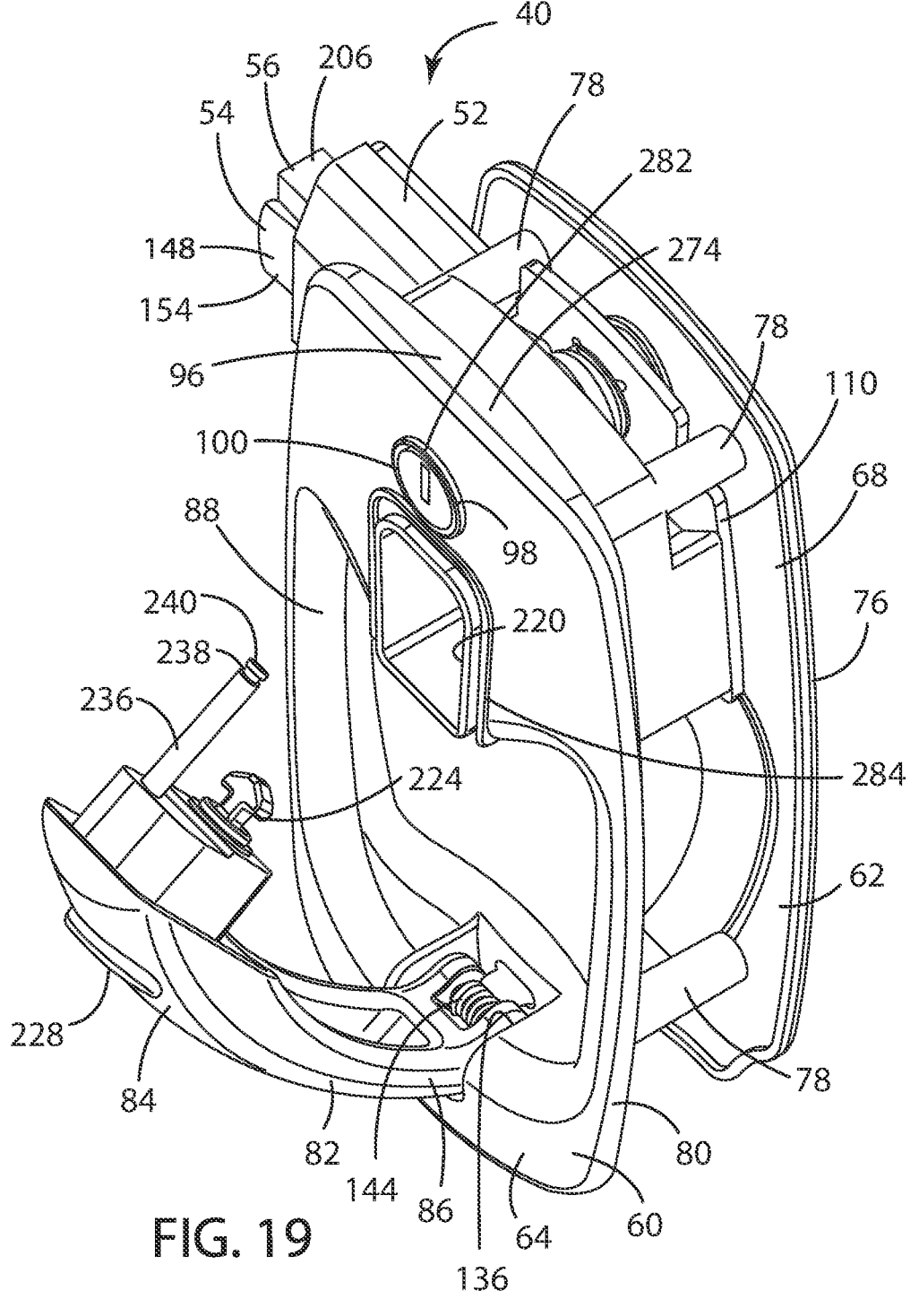
FIG. 19 is a perspective exterior view of the of the second embodiment of the latch assembly of the present disclosure shown in FIG. 15, with the external lever handle disengaged from the latch assembly at a first end thereof.
Figure 20:
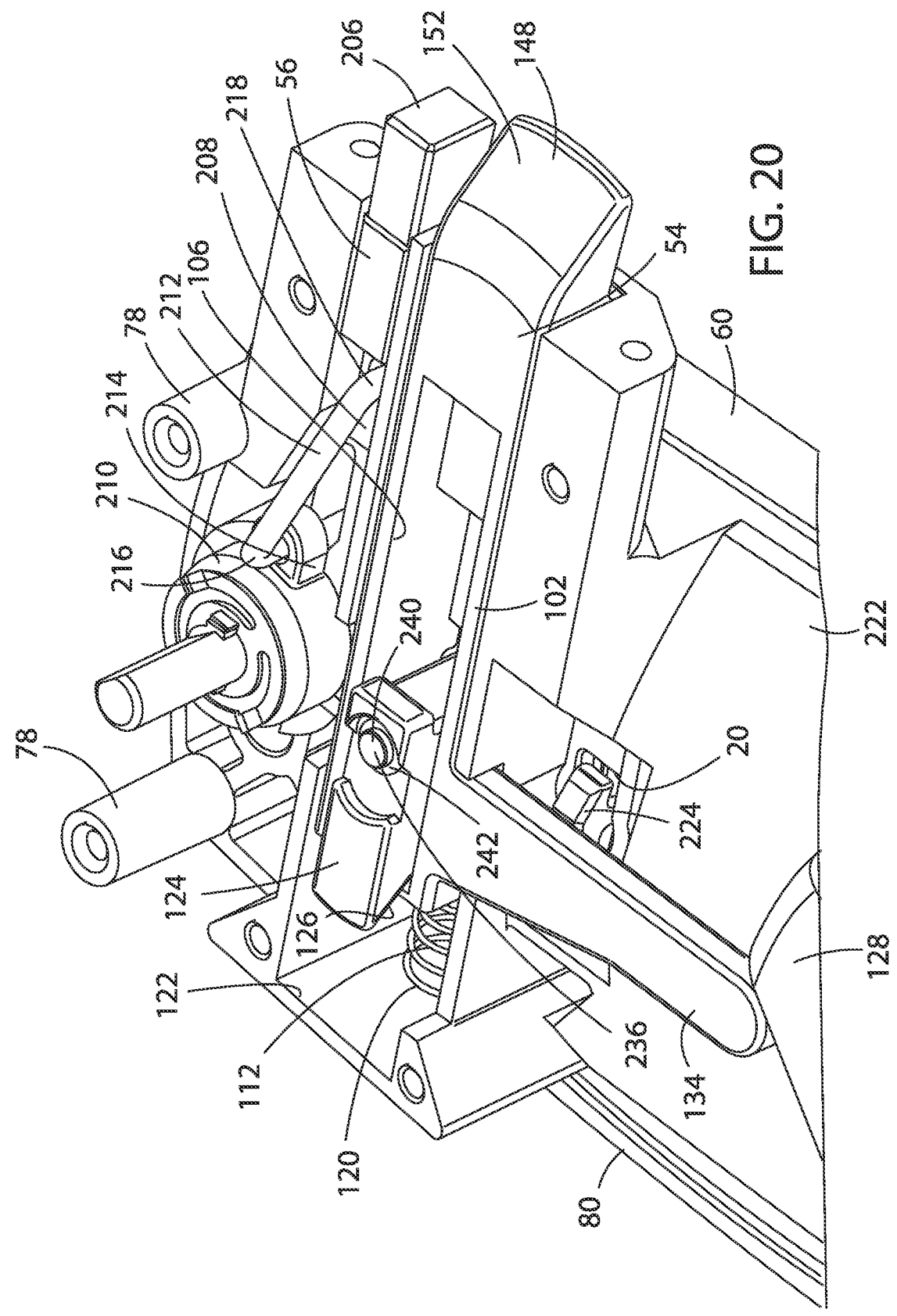
FIG. 20 is a perspective view of a portion of the inner face of the exterior housing of the second embodiment of the latch assembly of the present disclosure shown in FIG. 15, with the spring bolt and deadbolt in the latched position.
Figure 21:
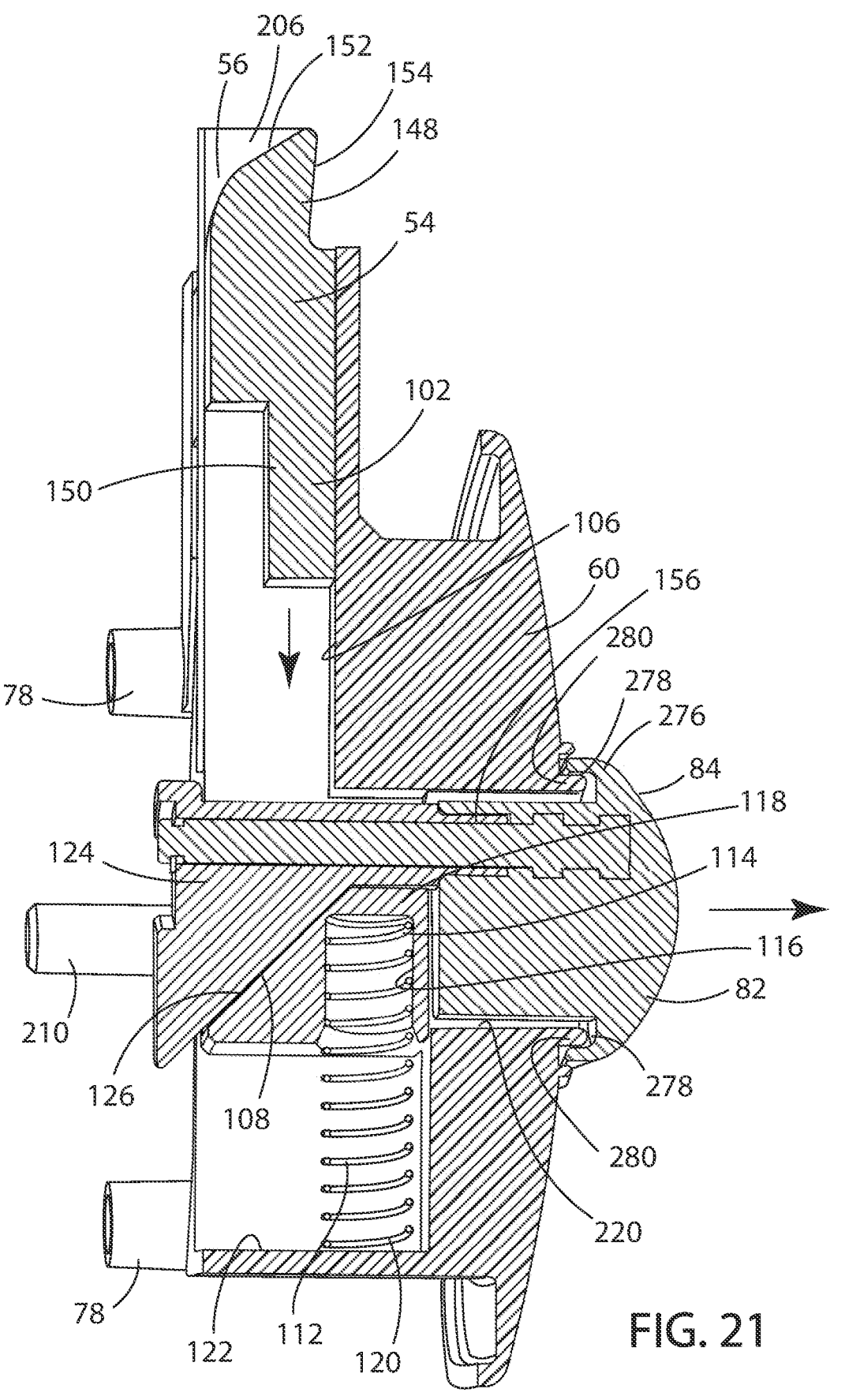
FIG. 21 is a cross-sectional view of the second embodiment of the latch assembly of the present disclosure shown in FIG. 15, taken along the line 21-21 in FIG. 17.
Figure 22:
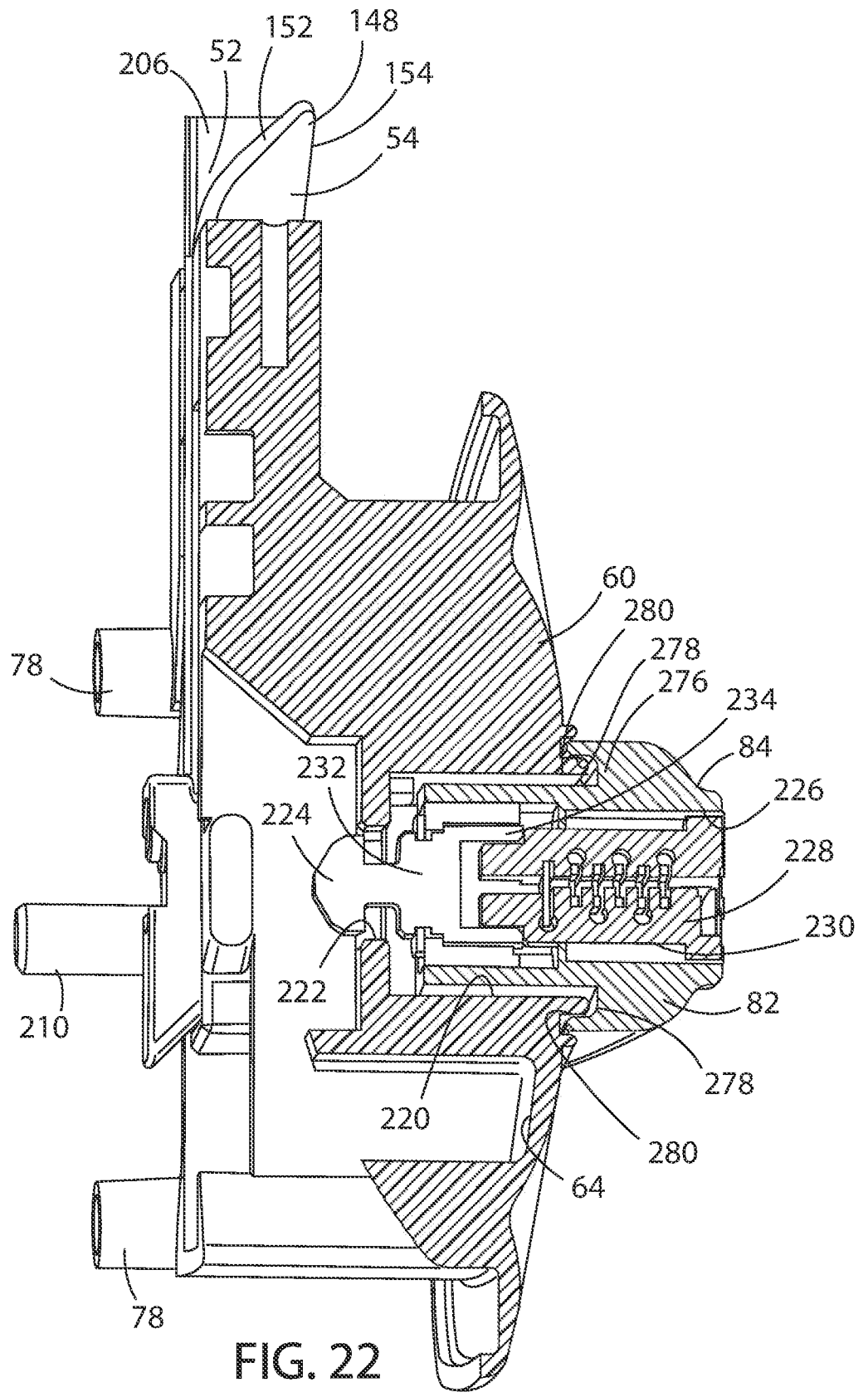
FIG. 22 is a cross-sectional view of the second embodiment of the latch assembly of the present disclosure shown in FIG. 15, taken along the line 22-22 in FIG. 17.
Figure 23:
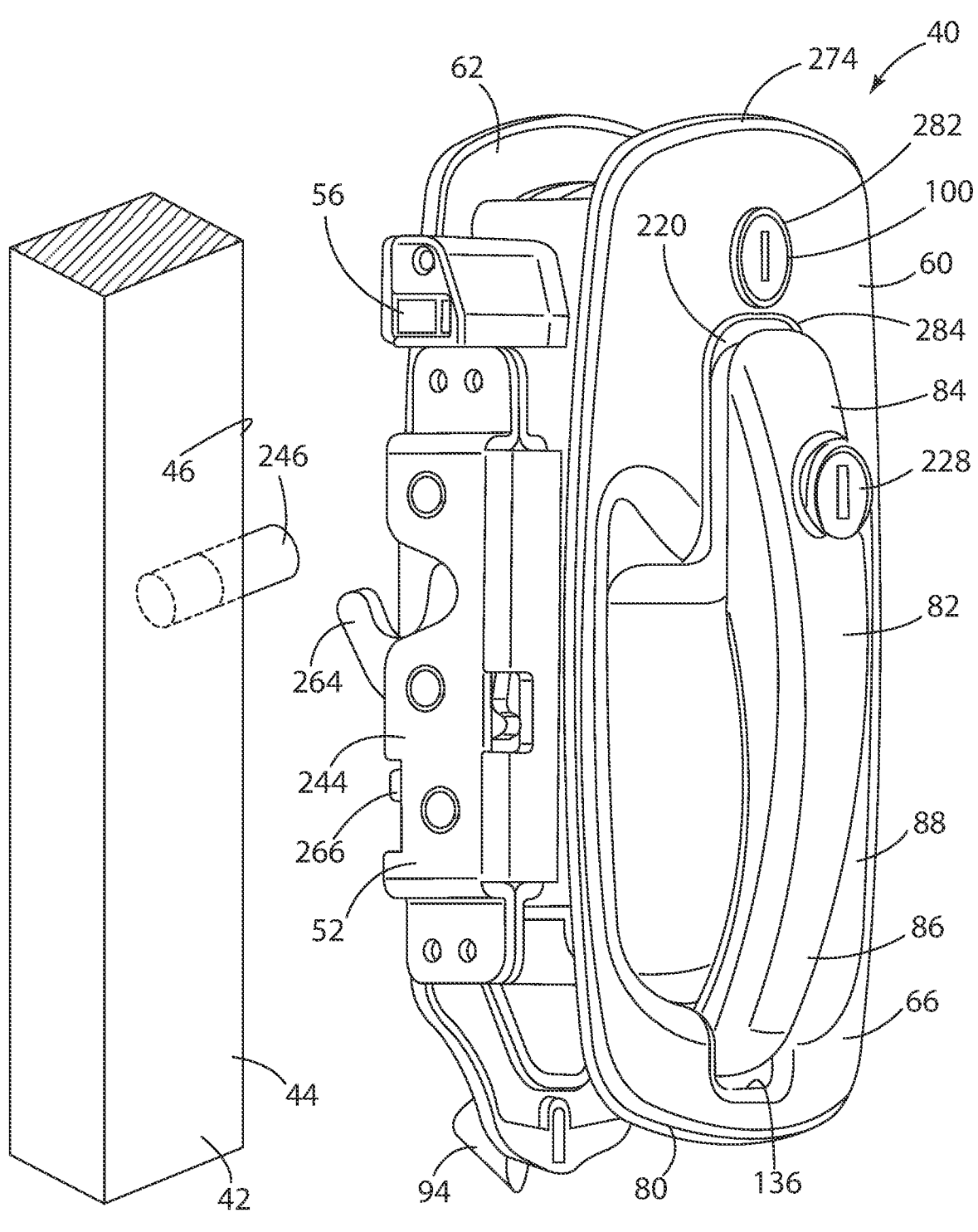
FIG. 23 is a perspective exterior view of a third embodiment of the latch assembly of the present disclosure, shown with the door latch and deadbolt in the unlatched position.
Figure 24:
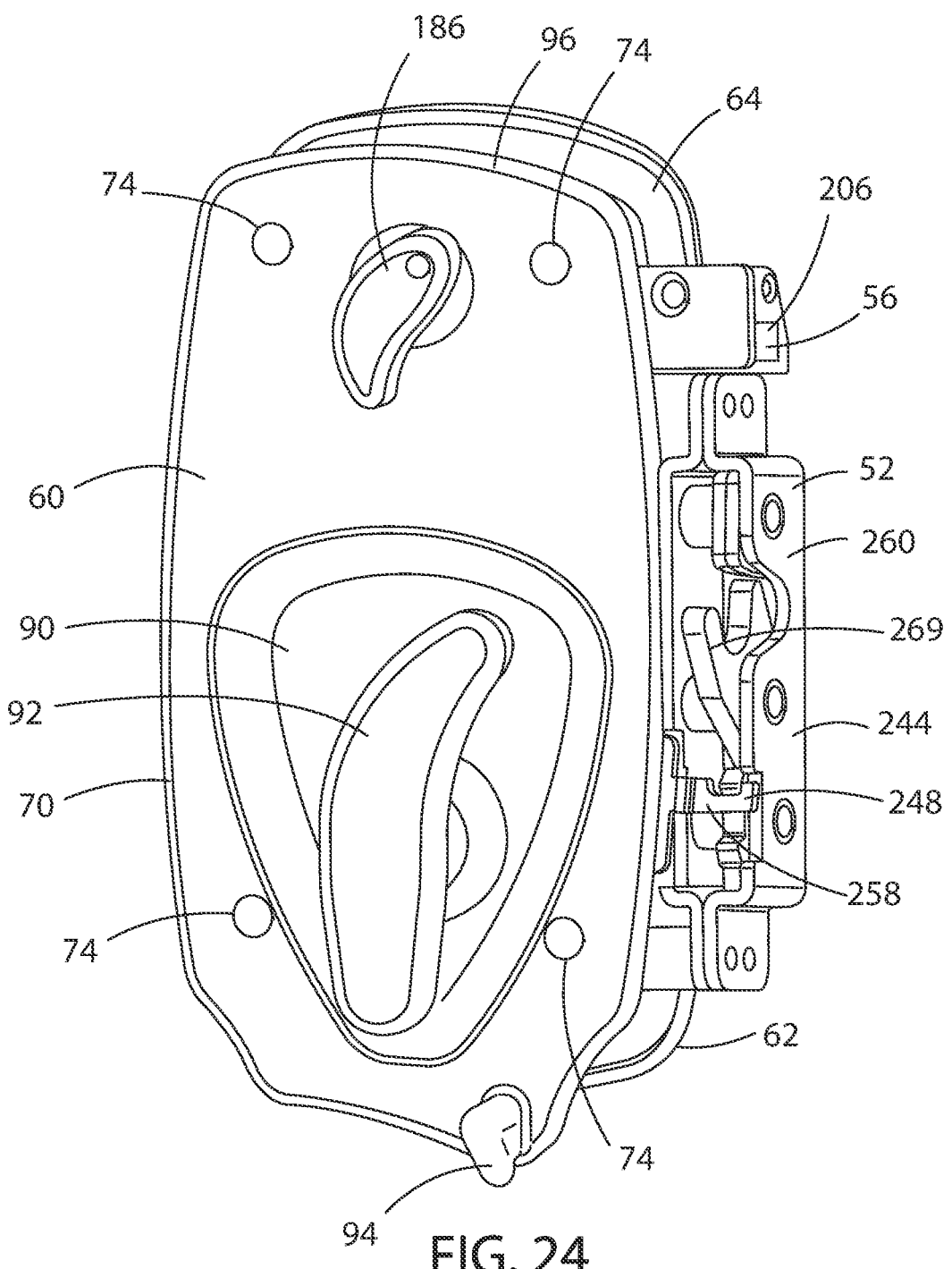
FIG. 24 is a perspective interior view of the third embodiment of the latch assembly of the present disclosure, shown with the door latch and deadbolt in the unlatched position.
Figure 25:
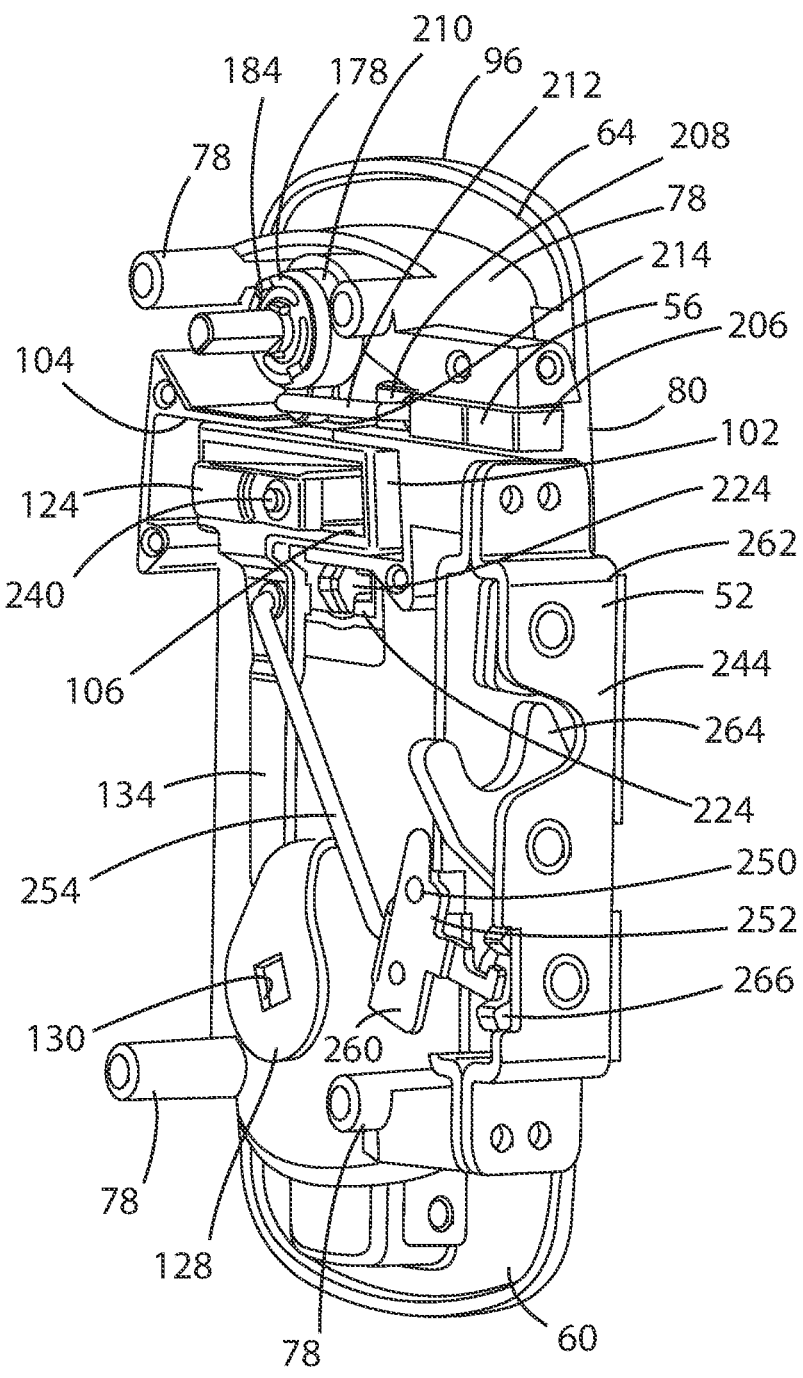
FIG. 25 is a perspective interior view of the of the inner face of the exterior housing of the third embodiment of the latch assembly of the present disclosure, shown with the door latch and deadbolt in the unlatched position.

Rotation of the external lock cylinder 100 from the unlocked condition to the locked condition also rotates the cam gear 170. Since the cam gear 170 is in engagement with the lock bolt rack 168, rotary motion is converted to linear motion, and the lock bolt rack 168 is shifted to a locked position within the rack slot 172. When in the locked position within the rack slot 172, the lock bolt rack 168 engages a notch 176 in the plunger 102 to prevent shifting of the plunger 102 from the latched position to the unlatched position, as shown in FIGS. 5 and 12. Conversely, rotation of the external lock cylinder 100 from the locked condition to the unlocked condition rotates the cam gear 170 in the opposite direction and slides the lock bolt rack 168 to an unlocked position, whereby the lock bolt rack 168 is disengaged from the notch 176 in the plunger 102 to allow shifting of the plunger 102 from the latched position to the unlatched position, as shown in FIG. 11.

A deadbolt clutch spring 178 may be disposed between the inside plate 110 mounted to the inner face 64 of the exterior housing 60 and the cam gear 170. The inside plate 110 is provided with an opening 180 through which the cam gear 170 extends and a plurality of symmetrically arranged radial slots 182 that engage opposed radial detents 184 disposed on the deadbolt clutch spring 178, in order to maintain the selected position of the lock bolt rack 168, as described above.

In addition, deadbolt knob 186 may be mounted proximate to the outer face 70 of the interior housing 62. The deadbolt knob 186 has a locked position and an unlocked position and may be operably and rotatably coupled with the external lock cylinder 100, wherein operation of deadbolt knob 186 from the unlocked position to the locked position slides the lock bolt rack 168 to the locked position within the rack slot 172, whereby the lock bolt rack 168 engages the notch 176 in the plunger 102 to prevent shifting of the plunger 102 from the latched position to the unlatched position. Conversely, rotation of the deadbolt knob 186 from the locked condition to the unlocked condition slides the lock bolt rack 168 to an unlocked position, whereby the lock bolt rack 168 is disengaged from the notch 176 in the plunger 102 to allow shifting of the plunger 102 from the latched position to the unlatched position. The deadbolt knob 186 further includes a stop 188 that is received within a recess 190 of a deadbolt clutch 174 to allow independent rotation of the deadbolt knob 186 relative the external lock cylinder 100.

As a further feature of the first embodiment of the latch assembly disclosed herein, the plunger 102 may be provided with an inwardly extending tab 194 disposed on the plunger 102 proximate the inner face 68 of the interior housing 62. An arcuate slot 196 extends through the interior housing 62, where the arcuate slot 196 has a first end 198 aligned with the plunger recess 104 and plunger 102 and a second end 200 that is not aligned with the plunger recess 104 and plunger 102. A night lock knob 202 extends through and is shiftingly restrained in the arcuate slot 196. The night lock knob 202 has a locked position and an unlocked position, whereby shifting the night lock knob 202 to the locked position engages the night lock knob 202 with the inwardly extending tab 194 disposed on the plunger 102, thus preventing the plunger 102 from shifting from the latched position to the unlatched position. Conversely, shifting the night lock knob 202 to the unlocked position disengages the night lock knob 202 from the inwardly extending tab 194 disposed on the plunger 102 to allow shifting of the plunger 102 from the latched position to the unlatched position. The night lock knob 202 may be slidably restrained in the arcuate slot by lock washer 204.

Thus, the first embodiment of the latch assembly 40 disclosed herein may be locked by an external lock cylinder 100, an inside deadbolt knob 186, or a night lock knob 202. The external lock cylinder 100 and deadbolt knob 186 each separately controls a cam gear 170 that extends or retracts a lock bolt rack 168. This lock bolt rack 168, in turn, engages the plunger 102 in the latched position and prevents the plunger 102 and door latch 52 (here, spring bolt 54) from moving. The night lock knob 202 may be advantageous for users concerned about the external lock cylinder 100 being picked and can be shifted into a locked position to prevent motion of the plunger 102 independent of the external lock cylinder 100 or inside deadbolt knob 186. By engaging the tab 194 on the plunger 102 to prevent motion, the night lock knob 202 prevents the entry door 20 from being opened externally.

According to a second embodiment of the latch assembly 40 disclosed herein, shown in FIGS. 14-22, a deadbolt 56 separate from the plunger 102 and door latch 52 (here, spring bolt 54) is provided. Additionally, the external lock cylinder 100 may be disposed proximate the first end 84 of the external lever handle 82 in order to operate the deadbolt 56, and may be master keyed for dealership use. The inwardly extending tab 194 and the night lock knob 202 is omitted in favor of the separate deadbolt 56.

According to the second embodiment of the latch assembly 40 of the present disclosure, the latch assembly 40 similarly includes the lock aperture 98 through the exterior housing 60 through which the external lock cylinder 100 extends from the outer face 66. A deadbolt 56 having an outer end 206 and an inner end 208, a lock deadbolt cam 210, and a first link 212 are added, whereby rotation of external lock cylinder 100 rotates the deadbolt lock cam 210 mounted to the inner face 64 of the exterior housing 60, above the first end 84 of the external lever handle 82. The deadbolt 56 may have a cross-sectional lateral thickness that is narrower than a cross-sectional lateral thickness of the spring bolt 54. In addition, the outer end 206 of the deadbolt 56 is may be tapered.

Rotation of the deadbolt lock cam 210, by either the external lock cylinder 100 or the deadbolt knob 186, contemporaneously shifts a crank arm 214 of the deadbolt lock cam 210, to which is pivotally attached a first end 216 of the first link 212. A second end 218 of the first link 212 is in turn pivotally connected with the inner end 208 of the deadbolt 56, whereby the second end 218 of the first link 212 longitudinally shifts the deadbolt 56 from the unlocked position to the locked position. In the unlocked position, the outer end 206 of the deadbolt 56 is fully withdrawn into the interior of the latch assembly 40, as perhaps best shown in FIG. 20. In the locked position, the outer end 206 of the deadbolt 56 engages door strike recess 50 in the door strike 48, and positively prevents opening of the entry door 20. The deadbolt 56 is unlocked by rotating external lock cylinder 100 or deadbolt knob 186 in the opposite direction. Thus, the deadbolt 56 may be movably shifted between a locked position, wherein the entry door 20 is positively retained in the closed position, and an unlocked position, wherein the entry door 20 is free to be shifted between the open and closed positions.

Also, according to the second embodiment of the latch assembly 40 disclosed herein, the outer face 66 of the exterior housing 60 may be provided with an upper recess 220 within which the first end 84 of the external lever handle 82 is received. This upper recess 220 may similarly be continuous with the bowl-shaped external lever recess 88. The upper recess 220 further includes an elongated slot 222, while the first end 84 of the external lever handle 82 includes a lever lock bolt 224 having a locked position and an unlocked position, the lever lock bolt 224 being received within the elongated slot 222 when in the unlocked position and being retained within the elongated slot 222 when in the locked position, as shown in FIGS. 17, 19, 20, and 22. The locked position of the lever lock bolt 224 may be rotationally 90° relative the unlocked position of the lever lock bolt 224.

The first end 84 of the external lever handle 82 further may include an aperture 226 through the first end 84 of the external lever handle 82 through which a handle lock cylinder 228 extends, the handle lock cylinder 228 having a locked condition and an unlocked condition. A clutch 230 may be disposed on an exterior end 232 of the lever lock bolt 224 that may be operably and rotatably coupled with the handle lock cylinder 228, through which the handle lock cylinder 228 is operably coupled with the lever lock bolt 224. A clutch holder 234 may be provided by which the lever lock bolt 224 is mounted to the first end 84 of the external lever handle 82. The handle lock cylinder 228 may also be master keyed for dealership convenience.

Further, according to the second embodiment of the latch assembly 40 disclosed herein, the external lever handle 82 is coupled to the handle cam 124 via an alternative structure. That is, the handle cam 124 is still provided with a distal end 156 proximate the cam surface 126. However, the first end 84 of the external lever handle 82 is operably coupled to the handle cam 124 by a handle shaft 236 fixedly mounted in the first end 84 of the external lever handle 82 and extending through and fixed within an orifice 160 in the handle cam 124. The handle shaft 236 further may comprise a notch 238 disposed at a distal end 240 thereof and is fixed within the orifice 160 in the handle cam 124 by a C-clamp 242 resiliently received and secured in the notch 238. As further described below, the external lever handle 82 may be injection molded and the handle shaft 236 may be fixedly mounted in the first end 84 of the external lever handle 82 during the molding process.

In accordance with a third embodiment of the latch assembly of the present disclosure, a rotary latch assembly 244 is employed as the door latch 52, as shown in FIGS. 22-28. In this embodiment, the rotary latch assembly 244 has a locked position and an unlocked position. A door striker 246 may be disposed on the jamb section 44 of the door opening 46 for engagement with the rotary latch assembly 244.

A rotary latch cam 248 may be pivotably mounted at a pivot 250 at a first end 252 to the inner face 64 of the exterior housing 60 proximate the rotary latch assembly 244. A second link 254 having a first end 256 thereof may be pivotally operably coupled with the plunger 102 and a second end 258 thereof may be pivotally connected with a second end 260 of the rotary latch cam 248. The first end 256 of the second link 254 may be operably coupled with the interior plunger arm 134.

The rotary latch assembly 244 may comprise a frame 262 attached to the margin 80 of the exterior housing 60, a lock pawl 264 rotatably mounted to the frame 262 and having a locked position in engagement with the door striker 246 and an unlocked position, and a trigger 266 rotatably mounted to the frame 262 and operably coupled with the rotary latch cam 248 and a detent 268 on the lock pawl to 264. The trigger 266 has a locked position and an unlocked position. The rotary latch cam 248 rotates the trigger 266 from the locked position to the unlocked position as the plunger 102 shifts from the latched position to the unlatched position, thus bringing the trigger 266 out of engagement with a detent 268 and releasing the lock pawl 264 to the unlocked position. Thus, shifting the plunger 102 to the unlatched position rotates the rotary latch cam 248 to shift the rotary latch assembly 244 between the locked and unlocked positions.

Figure 26:
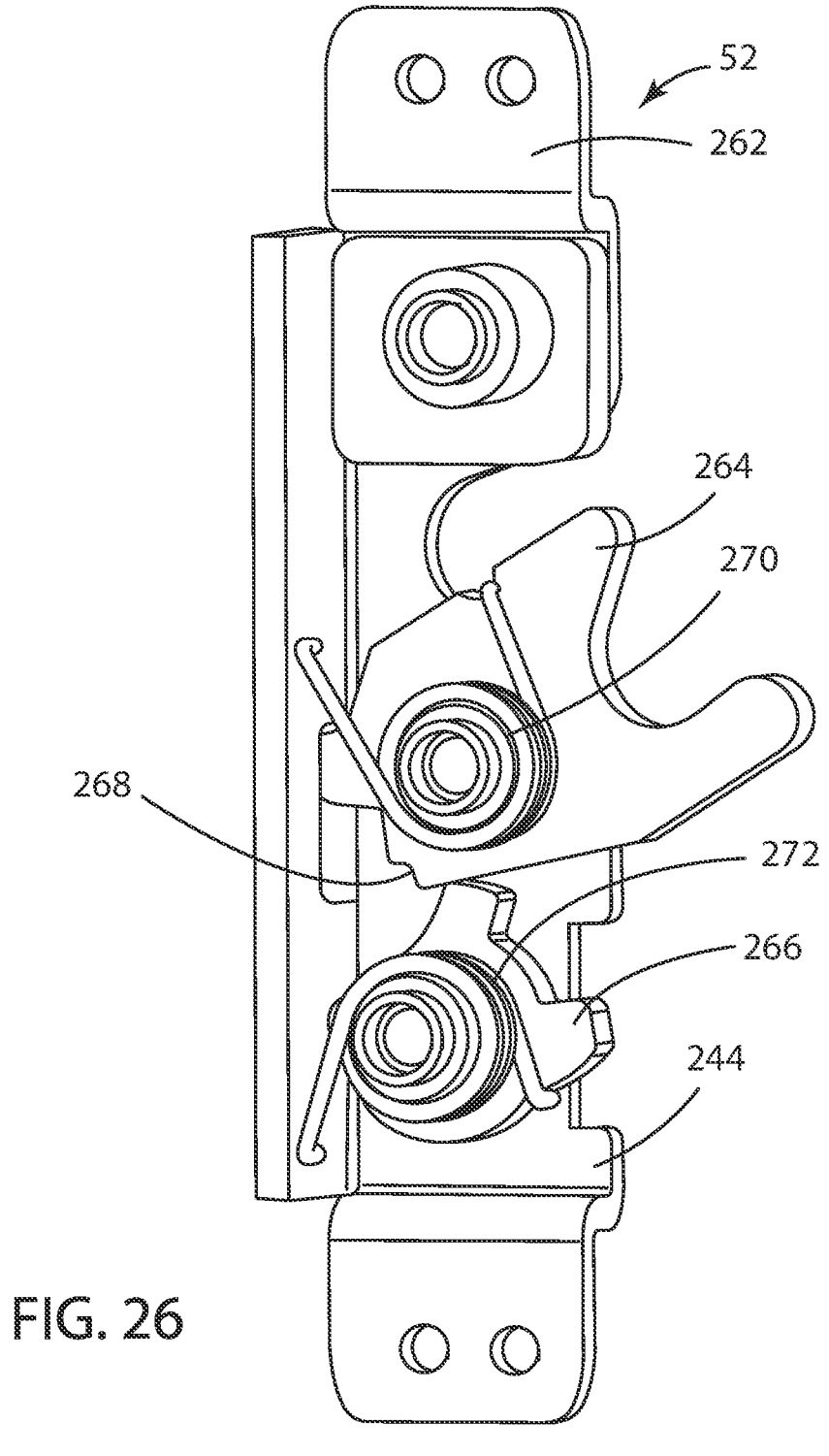
FIG. 26 is a perspective view of the lock pawl and trigger in the unlatched position.
Figure 27:
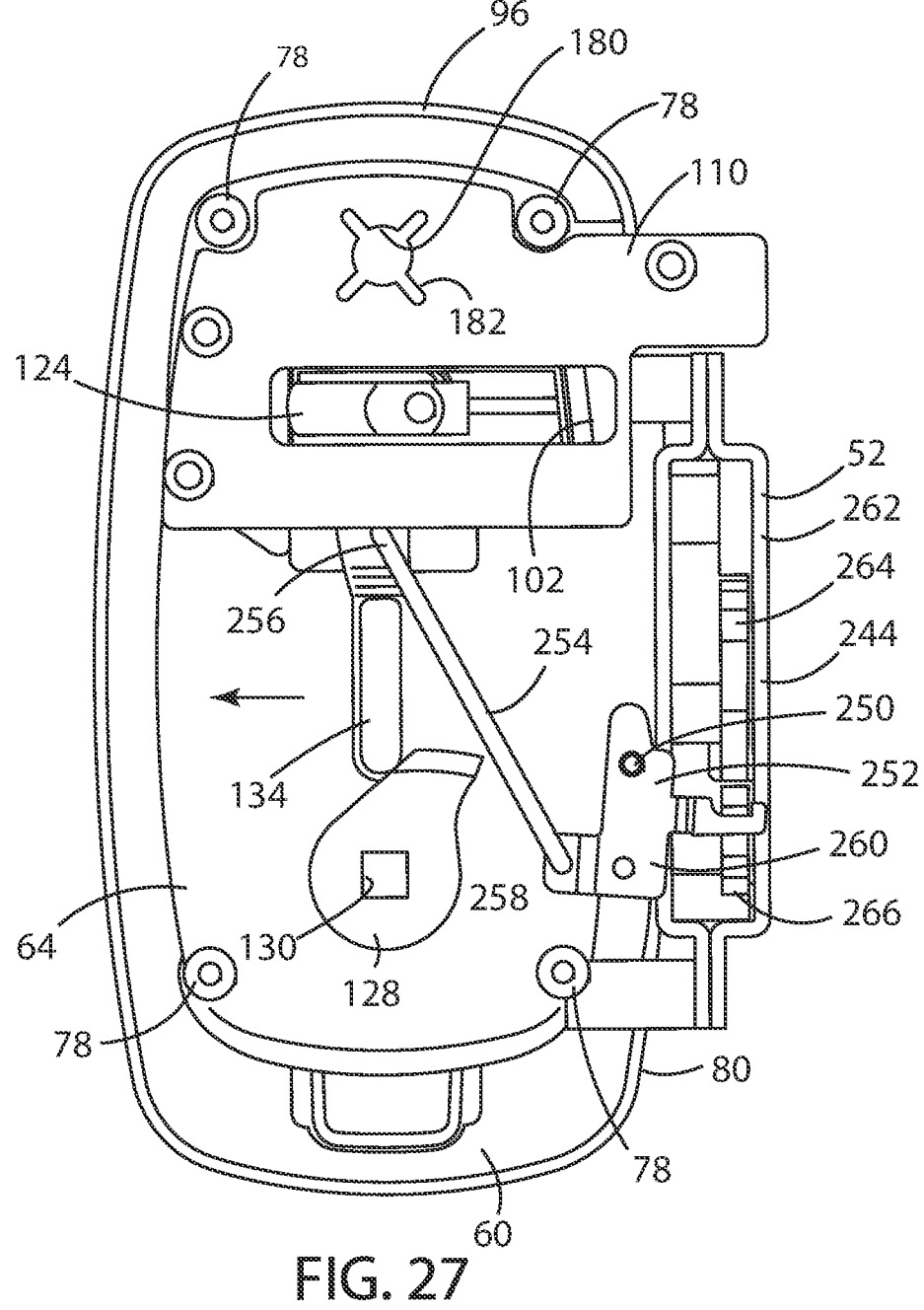
FIG. 27 is an interior elevation view of the inner face of the exterior housing of the third embodiment of the latch assembly of the present disclosure, shown with the door latch in the latched position and the deadbolt in the unlatched position.
Figure 28:
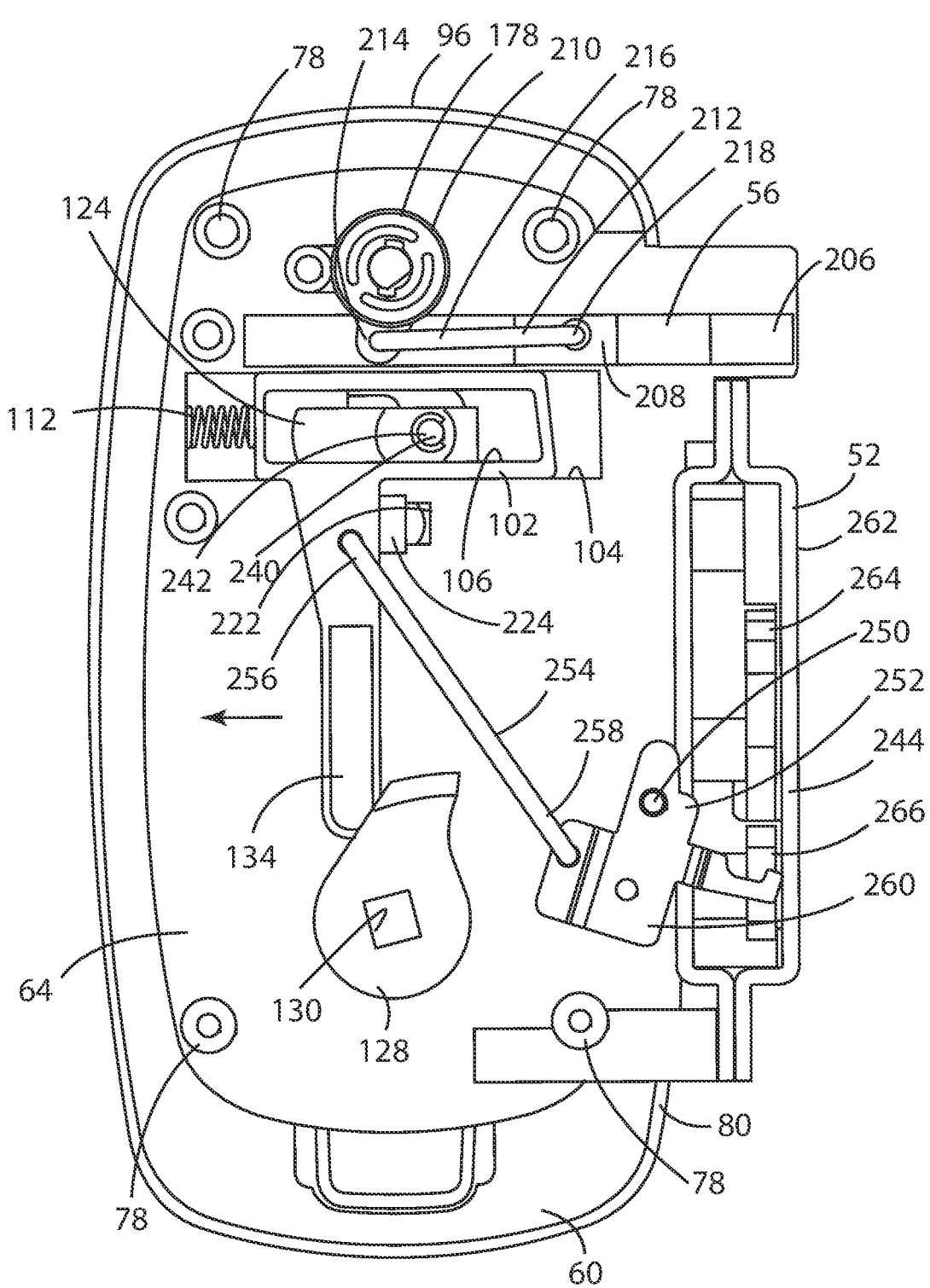
FIG. 28 is an interior elevation view of the inner face of the exterior housing of the third embodiment of the latch assembly of the present disclosure, shown with the door latch and the deadbolt in the unlatched position.
Figure 29:
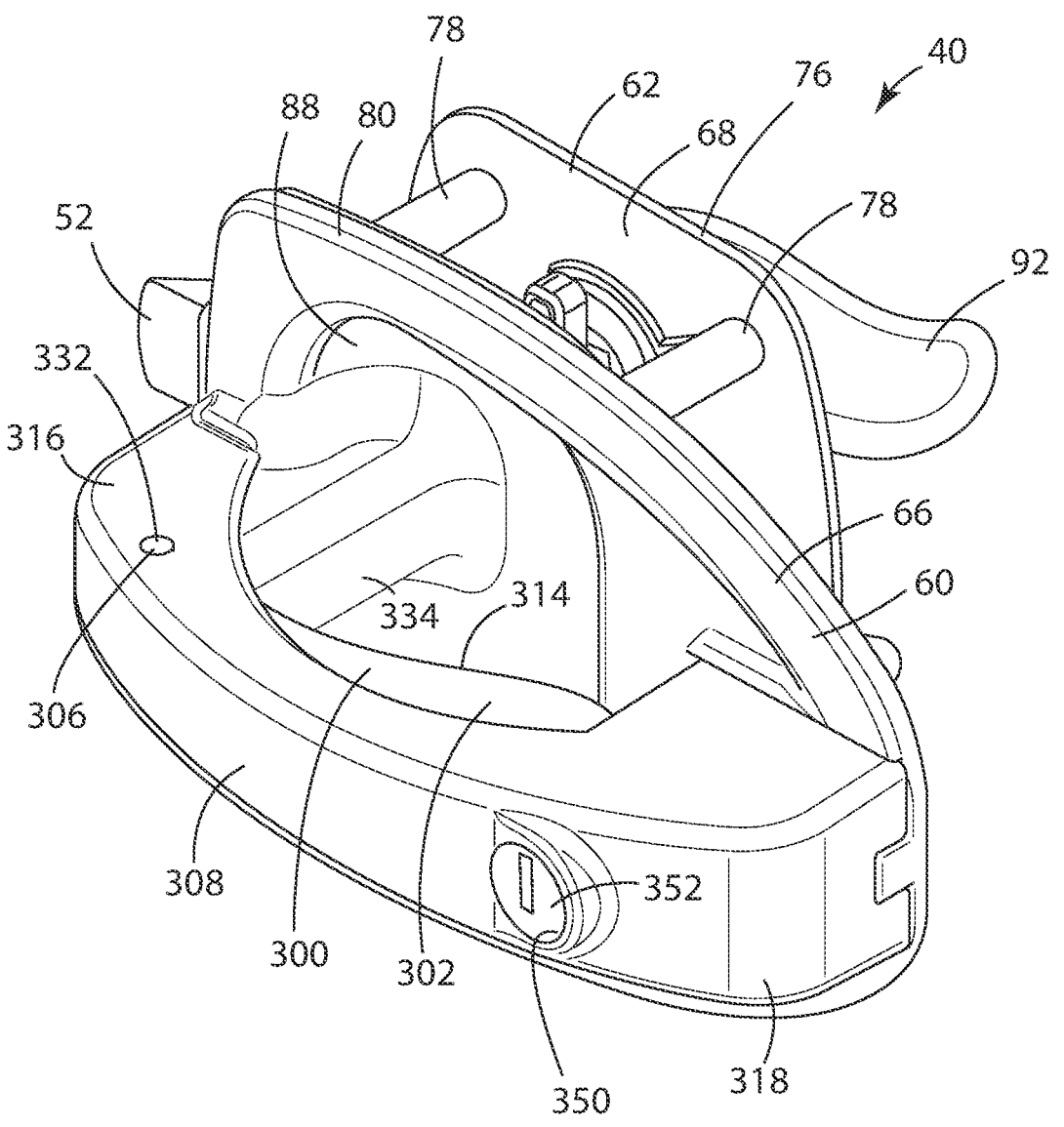
FIG. 29 is a perspective exterior view of a fourth embodiment of the latch assembly of the present disclosure, shown with the door latch in the latched position and the deadbolt in the unlocked position.
Figures 30, 31, 32:
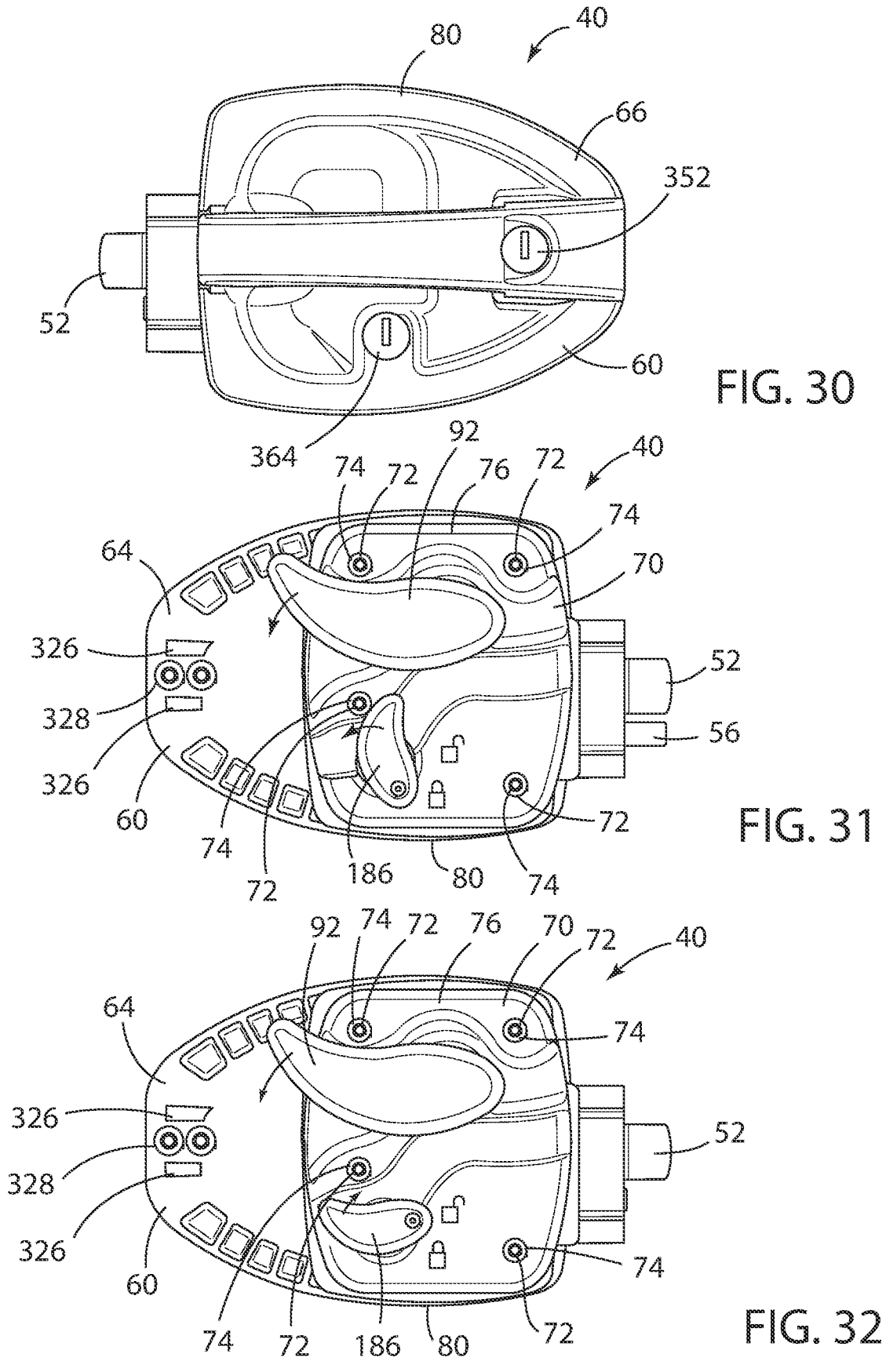
FIG. 30 is an exterior plan view of the fourth embodiment of the latch assembly of the present disclosure, shown with the door latch in the latched position and the deadbolt in the unlocked position.
FIG. 31 is an interior plan view of the fourth embodiment of the latch assembly of the present disclosure, shown with the door latch in the latched position and the deadbolt in the locked position.
FIG. 32 is an interior plan view of the fourth embodiment of the latch assembly of the present disclosure, shown with the door latch in the latched position and the deadbolt in the unlocked position.

The rotary latch assembly 244 may also include a first torsion spring 270 that urges the lock pawl 264 to the unlocked position and a second torsion spring 272 that urges the trigger 266 to the locked position, as shown in FIG. 26. Shifting the entry door 20 from the open position to the closed position causes the lock pawl 264 to engage the door striker 246, which rotates the lock pawl 264 to the locked position against the urging of the first torsion spring 270 and allows the trigger 266 to reengage the detent 268 on the lock pawl 264 under the urging of the second torsion spring 272, thereby maintaining the lock pawl in the locked position.

In accordance with the third embodiment of the latch assembly 40 of the present disclosure, the use of a rotary latch assembly 244 has been found to be advantageous in that replacement of the spring bolt 54 utilized with the first and second embodiments described above with a rotary latch assembly 244 allows use of many common components to lower tooling and production costs. This interchangeability also provides the option to the door manufacturer and subsequent OEM to offer two different latching systems (a spring bolt 54 or a rotary latch assembly 244) that otherwise look identical from the exterior or interior of the entry door 20. Once the plunger 102 is actuated either by shifting of the external lever handle 82 from the retracted to the extended position or by rotation of the interior door release control 92, the rotary latch cam 248 rotates and moves the trigger 266 to release the lock pawl 264.

Furthermore, a latch assembly 40 having a door latch 52 configured as spring bolt 54 may be desired for lower cost applications, while the rotary latch assembly 244 may be desired for motorized applications. That is, a feature of the use of the rotary latch assembly 244 is the second link 254 from the interior plunger arm 134 to the rotary latch cam 248. While the rotary latch assembly 244 of the third embodiment of the present disclosure is illustrated as attached to the latch assembly 40 by installing a different link, the rotary latch assembly 244 may be remotely activated for doors in which the latch assembly 40 is installed further inboard of the door edge.

As applied to any of the foregoing embodiments, it has been determined that water control is important to the continued function and durability of the latch assembly 40. More particularly, it has been found desirable to provide features to provide such water control to minimize infiltration of water into the interior of the latch assembly 40.

Water control may be obtained by the use of water diversion provided on the outer face 66 of the exterior housing 60. An upper portion of the outer face 66 of the exterior housing 60 may comprise a raised portion 274 to divert water around the exterior housing 60. The water diversion also includes the inner edges 276 of the external lever handle 82 having parallel grooves 278 disposed therein and the outer face 66 of the exterior housing 60 proximate the first end 84 of the external lever handle 82 having a pair of outwardly facing walls 280 that engage the grooves 278 disposed on the external lever handle 82 when the external lever handle 82 is in the retracted position. Further, the lock aperture 98 through the exterior housing 60 through which the external lock cylinder 100 extends may be disposed above the external lever handle 82 and may include a raised portion 282 to divert water around the exterior housing 60 and away from the external lever handle 82. Finally, ribs 284 may be disposed about the upper recess 220 within which the first end 84 of the external lever handle 82 is received to divert water from the latch assembly 40.

In accordance with a fourth embodiment of the latch assembly 40 of the present disclosure, shown in FIGS. 29-41, the latch assembly 40 similarly comprises an exterior housing 60 having an inner face 64 and an outer face 66 and a separate interior housing 62 having in inner face 68 and an outer face 70. The interior housing 62 may be attached to the exterior housing 60 by fasteners 72 extending through a plurality of openings 74 that in turn extend through and are disposed about the margin 76 of the interior housing 62 via a plurality of assembly bosses 78 disposed about the margin 80 of the exterior housing 60. Thus, the latch assembly 40, as installed, may be deposed on either side of the entry door 20 and received within a through-cavity (as again depicted in FIG. 2) in the entry door 20, where the latch assembly 40 may be accessed from both the exterior and interior of the recreational vehicle 8, as further described below. A particularly advantageous feature of this arrangement is that the latch assembly 40 may be designed to fit within a standard through-cavity for the closure 20 for most recreational vehicles 8 and, thus, may be provided as a retrofit replacement for OEM latch assemblies that do not share the features of presently disclosed latch assembly 40.

Figures 37, 38:
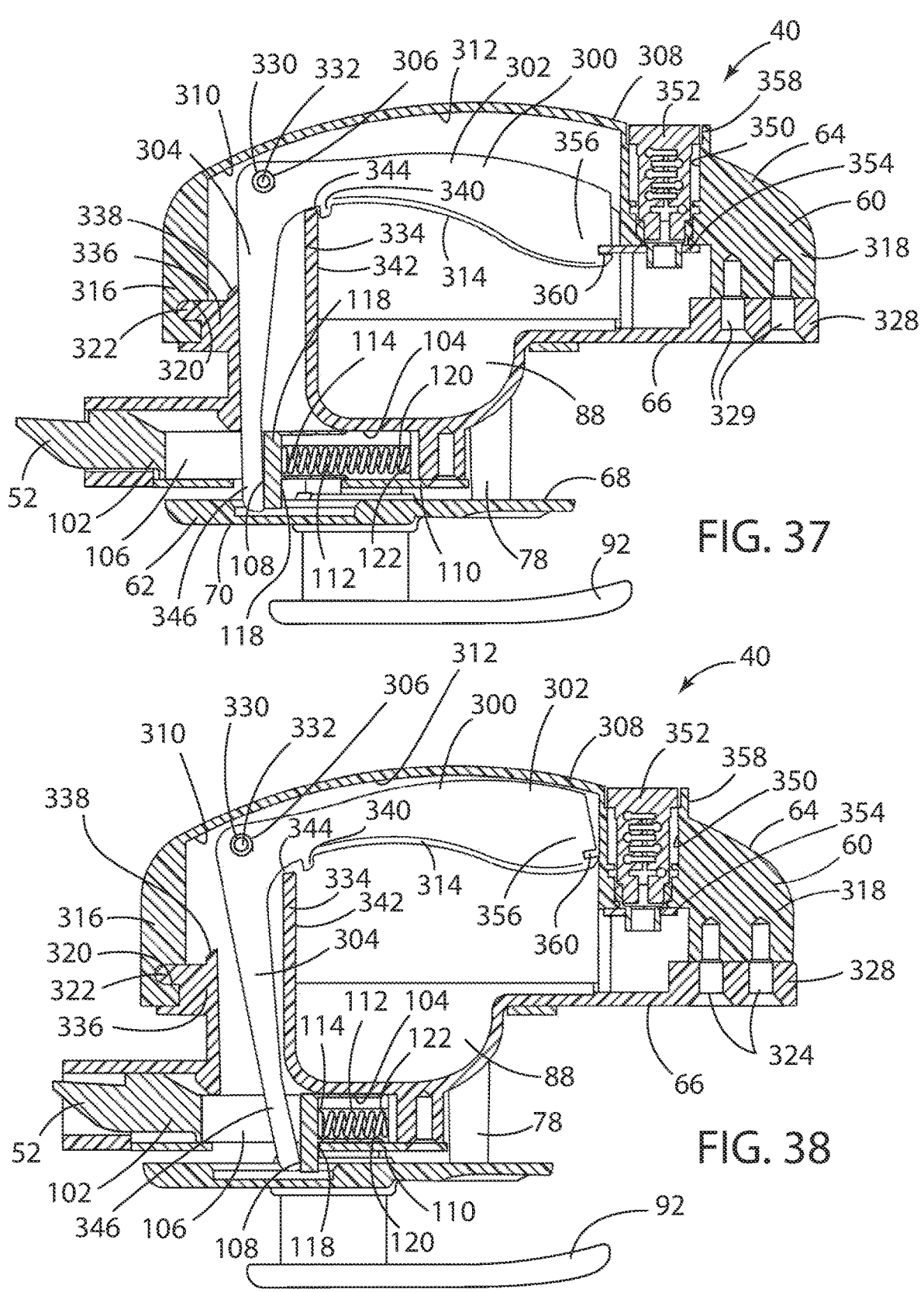
FIG. 37 is a sectional view of the fourth embodiment of the latch assembly of the present disclosure, shown with the door latch and external lever in the latched position.
FIG. 38 is a sectional view of the fourth embodiment of the latch assembly of the present disclosure, shown with the door latch and external lever in the unlatched.

A door latch 52, similar to that described above, is similarly operably coupled with a plunger 102 slidingly received within a plunger recess 104 disposed proximate the inner face 64 of the exterior housing 60 and operably connected with the latch assembly 40. The plunger recess 104 may be integrally formed on the inner face 64 of the exterior housing 60 and the plunger 102 may be adapted to slide and thereby shift between a latched position and an unlatched position within the plunger recess 104. As shown in FIGS. 37-38, the plunger 102 is maintained in the latched position, when an external lever 300 is in the latched position, by the resilient member 112, as discussed below, whereby the closure 20 cannot be unintentionally shifted from the closed position. As in the first embodiment, an inside plate 110 may be mounted to the inner face 64 of the exterior housing 60, wherein the plunger 102 is disposed between the exterior housing 60 and the inside plate 110 and is restrained within the plunger recess 104.

A resilient member 112 is operably coupled with the plunger 102 and urges the plunger 102 to the latched position. The resilient member 112 may be comprised of a compression spring received within the plunger recess 104 and having a first end 114 abutting a first end 118 of the plunger 102 and a second end 120 abutting a terminal wall 122 of the plunger recess 104 opposite the first end 118 of the plunger 102. The resilient member 112 is operably coupled with the plunger 102 and urges the plunger 102 to the latched position, as shown in FIG. 37.

As perhaps best shown in FIGS. 37 and 38, the external lever 300 is pivotally mounted on the outer face 66 of the exterior housing 60 for rotation between a latched position and an unlatched position. The external lever 300 comprises a first leg 302, a second leg 304 disposed at an angle relative to the first leg 302, and a pivot mount 306 disposed between the first leg 302 and the second leg 304. As shown, the second leg 304 of the external lever 300 is operably coupled with the plunger 102 and the first leg 302 and the second leg 304 of the external lever 300 may be fixedly disposed substantially orthogonally one to the other.

The exterior housing 60 may further comprise a fixed external handle 308, such that the first leg of the external lever is disposed proximate the fixed external handle 308, thereby providing an ergonomically improved operation that may be used to reduce pressure on the latch 52 and the closure 20 seals (not shown) during operation. The fixed external handle 308, which may be generously sized, further may include a recess 310 within an interior surface 312 thereof and the first leg 302 of the external lever 300 may be pivotably received within the recess 310 of the fixed external handle 308 as the external lever 300 is rotated from the latched position to the unlatched position. An interior surface 314 of the first leg 302 of the external lever 300 may comprise a substantially continuous surface, again to improve ergonomics, that remains outside of the recess 310 of the fixed external handle 308 as the external lever 300 is rotated from the latched position to the unlatched position to provide a more comfortable tactile experience as the latch assembly 40 is operated. In essence, the latch assembly 40 is actuated by merely squeezing the external lever 300 and fixed external handle 308 together, providing a highly ergonomic device. The exterior housing 60 shown in FIGS. 29-40 may also include a centrally disposed, bowl-shaped external lever recess 88 located proximate the external lever 300, which provides finger access to facilitate actuation of the external lever 300 between the latched and unlatched position.

Figure 40:
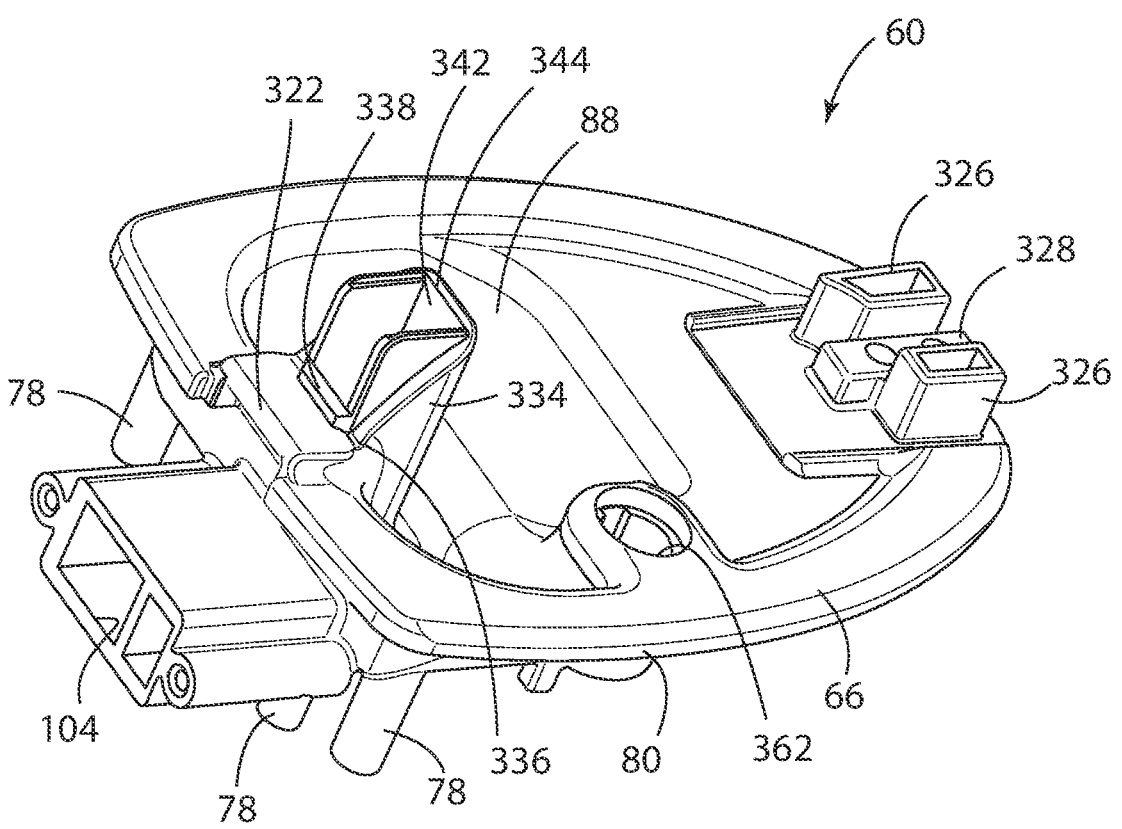
FIG. 40 is perspective view of the outer face of the exterior housing of the fourth embodiment of the latch assembly of the present disclosure, shown with the external lever and the fixed external handle omitted.

The exterior housing 60 and the fixed external handle 308 may be injection molded as separate components and the fixed external handle 308 may be fixedly mounted to the exterior housing 60. To effect this construction, the fixed external handle 308 has a first end 316 and a second end 318 and is attached as a separate component to the outer face 66 of the exterior housing 60. As shown in FIGS. 37, 38, and 40, the first end 316 of the fixed external handle 308 may be provided with a slot 320 adapted to receive and engage a protuberance 322 formed on the outer face 66 of the exterior housing 60 proximate the first end 316 of the fixed external handle 308 to secure the first end 316 of the fixed external handle 308 to the exterior housing 60.

Further, the second end 318 of the fixed external handle 308 comprises a pair of opposed cavities 324 that fittingly receive an integrally formed pair of opposed bosses 326 formed on the outer face 66 of the exterior housing 60 proximate the second end 318 of the fixed external handle 308 and between which a fastener boss 328 and a pair of fasteners 329 extend through the exterior housing 60. The fasteners 329 thus extend into the second end 318 of the fixed external handle 308 to secure the second end 318 of the fixed external handle 308 to the exterior housing 60.

The fixed external handle 308 may also include a pair of opposed pivot bosses 330, such that the pivot mount 306 is disposed within the recess 310 of the fixed external handle 308 in alignment with and between the pair of opposed pivot bosses 330. A pivot pin 332 extends through the pair of opposed pivot bosses 330 to define the pivot mount 306 and thereby pivotally mount the external lever 300 on the outer face 66 of the exterior housing 60 for rotation of the external lever 300 between the latched position and the unlatched position.

An integrally formed sleeve 334 may be formed on the outer face 66 of the exterior housing 60 proximate the first end 316 of the fixed external handle 308 through which the second leg 304 of the external lever 300 extends and over which the recess 310 of the fixed external handle 308 is disposed. The integrally formed sleeve 334 formed on outer face 66 of the exterior housing 60 is intended to limit leakage of water into the latch assembly 40. A lower portion 336 of the integrally formed sleeve 334 may include an outwardly extending tab 338 that is juxtaposed against the second leg 304 of the external lever 300 when the external lever 300 is in the latched position, as shown in FIG. 37, to limit leakage of water into the latch assembly 40.

In addition, the first leg 302 of the external lever 300 may include a trigger tab 340 disposed proximate the pivot mount 306 and an upper portion 342 of the integrally formed sleeve 334 may include an upper edge 344. As shown in FIG. 37, the trigger tab 340 of the first leg 302 of the external lever 300 is juxtaposed against the upper edge 344 of the integrally formed sleeve 334 when the external lever 300 is in the latched position to further limit leakage of water into the latch assembly 40.

The plunger 102 may further comprise a longitudinal slot 106 within which a plunger cam surface 108 is disposed at a distal end thereof, the plunger cam surface 108 being operably coupled with a distal end 346 of the second leg 304 of the external lever 300, as best shown in FIGS. 33-36 and 37-38. The longitudinal slot 106 may be wider than the distal end 346 of the second leg 304 of the external lever 300. The plunger 102 may be is displaced from the latched position to the unlatched position by the distal end 346 of the second leg 304 of the external lever 300 bearing against the plunger cam surface 108 when the external lever 300 is rotated from the latched position to the unlatched position, as perhaps best seen in FIG. 37.

Figure 33:
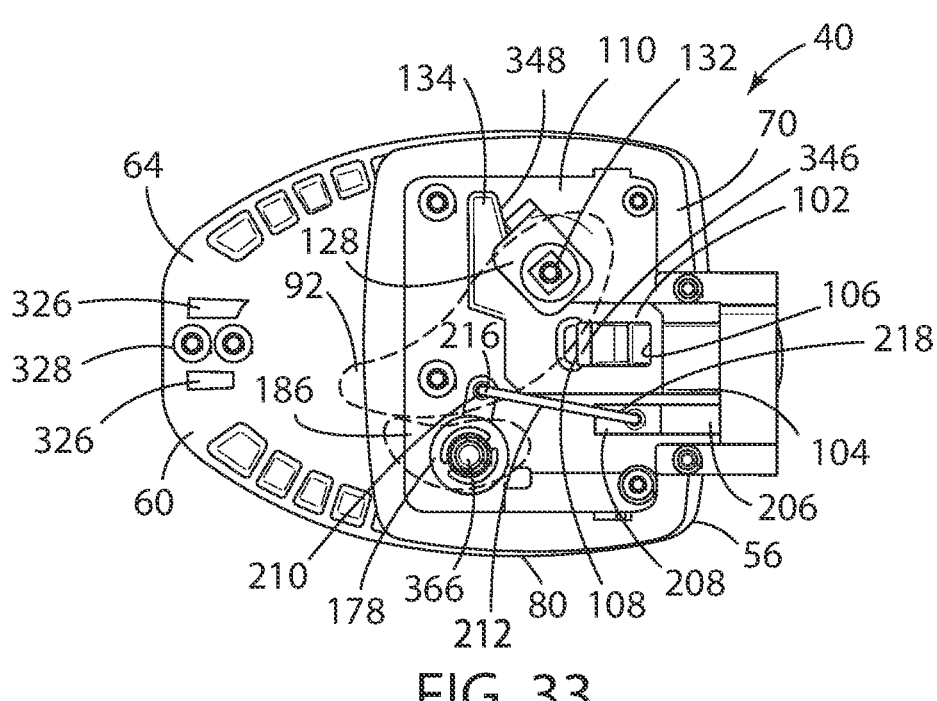
FIG. 33 is a plan view of the inner face of the exterior housing of the fourth embodiment of the latch assembly of the present disclosure, shown with the door latch and the deadbolt in the unlocked position and further showing the interior door release control and the inside lever cam in the unlatched position and the deadbolt control in the unlocked position.
Figure 34:
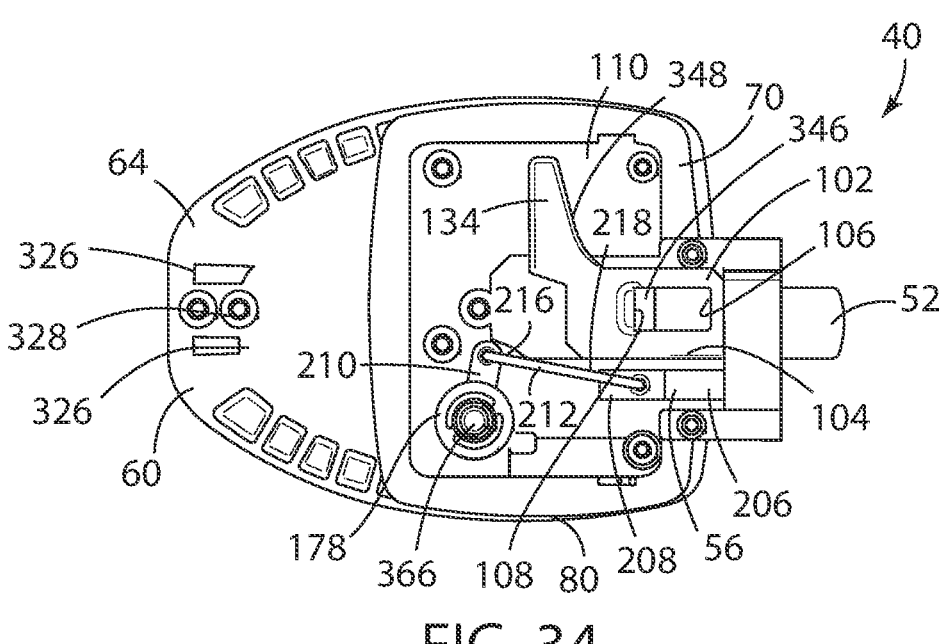
FIG. 34 is a plan view of the inner face of the exterior housing of the fourth embodiment of the latch assembly of the present disclosure, shown with the door latch in the latched position and the deadbolt in the unlocked position.

The plunger 102 may also be provided with an interior plunger arm 134 extending therefrom in a substantially perpendicular direction, as shown in FIGS. 33-36. The interior plunger arm 134 may include an angled cam surface 348 operable coupled with an inside lever cam 128 fixedly coupled with an interior door release control 92, where a square opening 130 (perhaps best shown in the embodiment depicted in FIG. 5, as well as in FIGS. 35 and 36) in the inside lever cam 128 may be operably coupled with a rotating square shaft 132 of the interior door release control 92. The interior door release control 92 also has a latched position and an unlatched position and is mounted proximate the outer face 70 of the interior housing 62, such that the inside lever cam 128 is operably coupled with the angled cam surface 348 of the interior plunger arm 134. The plunger 102 may also be displaced from the latched position to the unlatched position by the inside lever cam 128 bearing against the angled cam surface 348 of the interior plunger arm 134 when the interior door release control 92 is operated from the latched position to the unlatched position, as shown in FIGS. 33 and 34. The interior door release control 92 may be a rotatable lever.

Thus, the plunger 102 may be displaced from the latched position to the unlatched position from the exterior of the recreational vehicle 8 when the external lever 300 is rotated from the latched position to the unlatched position by a distal end 346 the second leg 304 of the external lever 300 bearing against the plunger cam surface 108 of the plunger 102. Alternatively, the plunger 102 may be displaced from the latched position to the unlatched position from the interior of the recreational vehicle 8 when the interior door release control 92 is operated from the latched position to the unlatched position and the inside lever cam 128 is brought to bear against the angled cam surface 348 of the interior plunger arm 134, whereby in both instances the closure 20 is free to be shifted from the closed position to the open position.

Alternatively, the latch assembly 40 may be configured such that the plunger 102 is displaced from the latched position to the unlatched position by the distal end 346 of the second leg 304 of the external lever 300 bearing against the angled cam surface 348 of the interior plunger arm 134, instead of against the plunger cam surface 108 of the plunger 102, when the external lever 300 is rotated from the latched position to the unlatched position. In such case, the longitudinal slot 106 and plunger cam surface 108 may be omitted.

Figure 41:
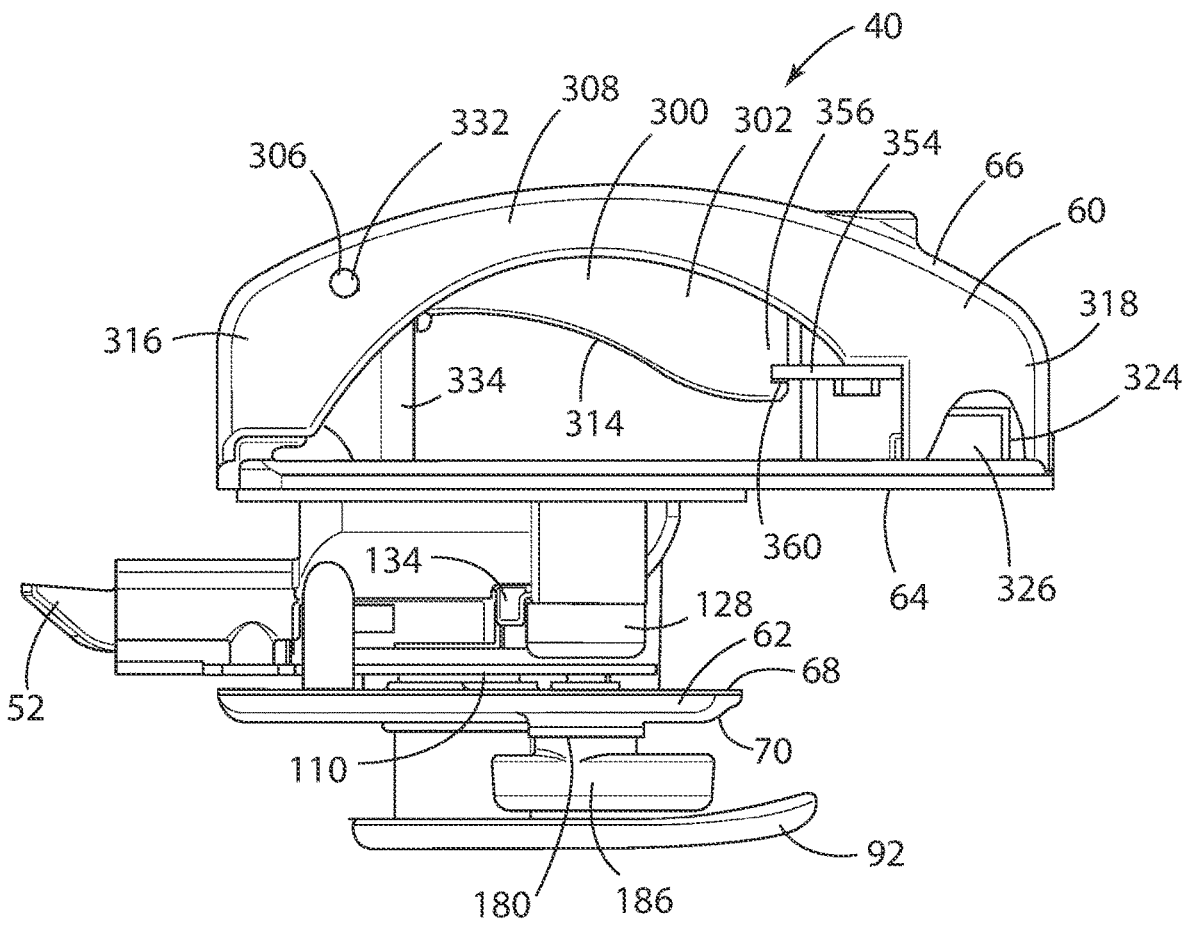
FIG. 41 is an side elevation view of the fourth embodiment of the latch assembly of the present disclosure, shown with the lock cam rotated into engagement with the notch in the distal end of the first leg of the external lever.
Figure 42:
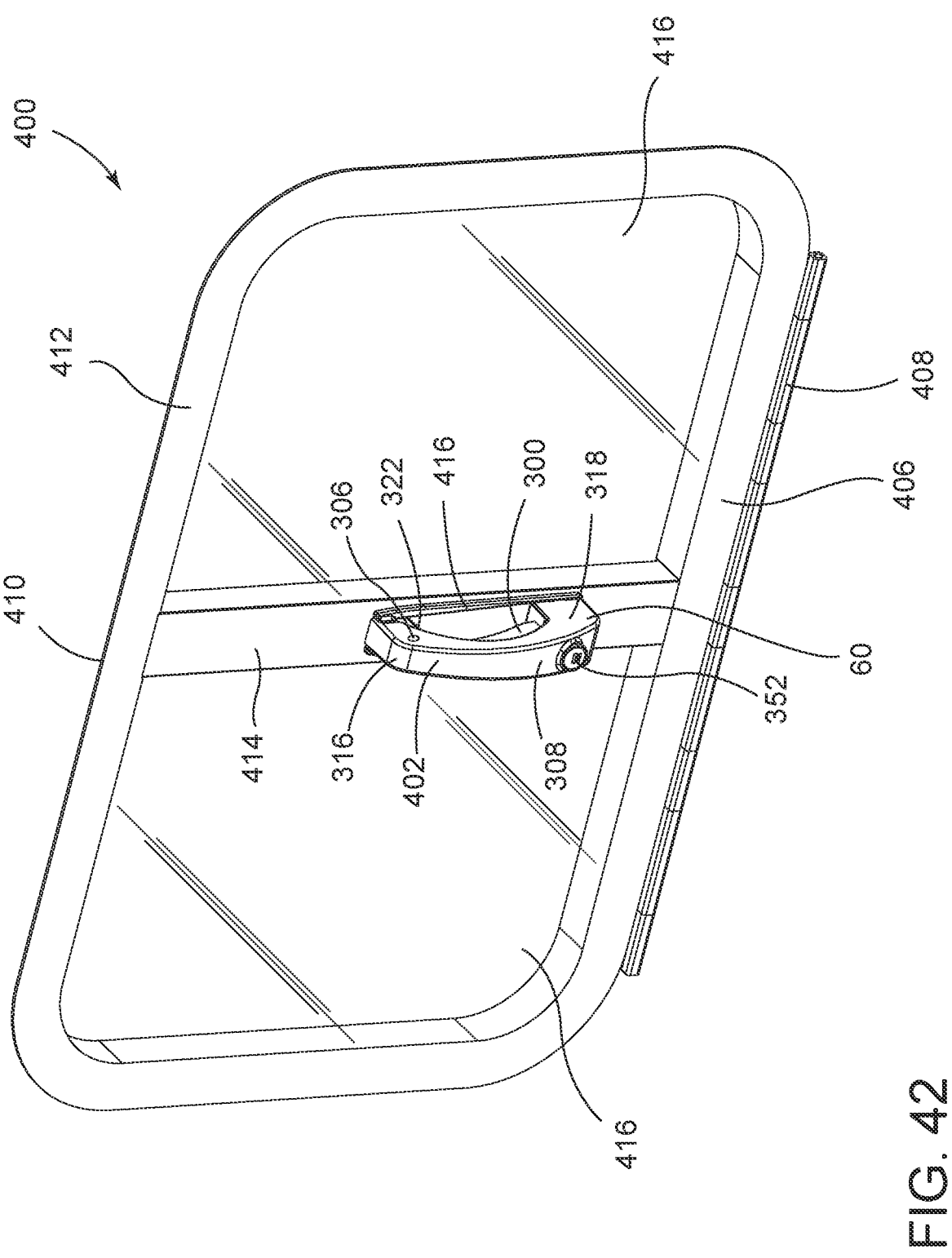
FIG. 42 is an exterior perspective view the dropdown door assembly installed in the vehicle shown in FIG. 1.

As shown in FIGS. 37 and 38, an aperture 350 extends through the second end 318 of the fixed external handle 308 through which a lock cylinder 352, the lock cylinder 352 having a locked condition and an unlocked condition. A lock cam 354 may be operably and rotatably coupled with the lock cylinder 352 and adapted to selectively engage a distal end 356 the first leg 302 of the external lever 300, wherein rotation of the lock cylinder 352 from the unlocked condition to the locked condition selectively rotates the lock cam 354 into engagement with the distal end 356 of the first leg 302 of the external lever 300 to prevent rotation of the external lever 300 from the latched position to the unlatched position, as shown in FIG. 41. Conversely, rotation of the lock cylinder 352 from the locked condition to the unlocked condition rotates the lock cam 354 out of engagement with the distal end 356 of the first leg 302 of the external lever 300 to allow rotation of the external lever 300 from the latched position to the unlatched position. The aperture 350 through the exterior housing 60 through which the lock cylinder 352 extends disposed above the fixed external handle 308 may include a raised portion 358 to divert water around the aperture 350 and away from the fixed external handle 308. The lock cylinder 352 may be master keyed for dealer convenience.

Figure 39:
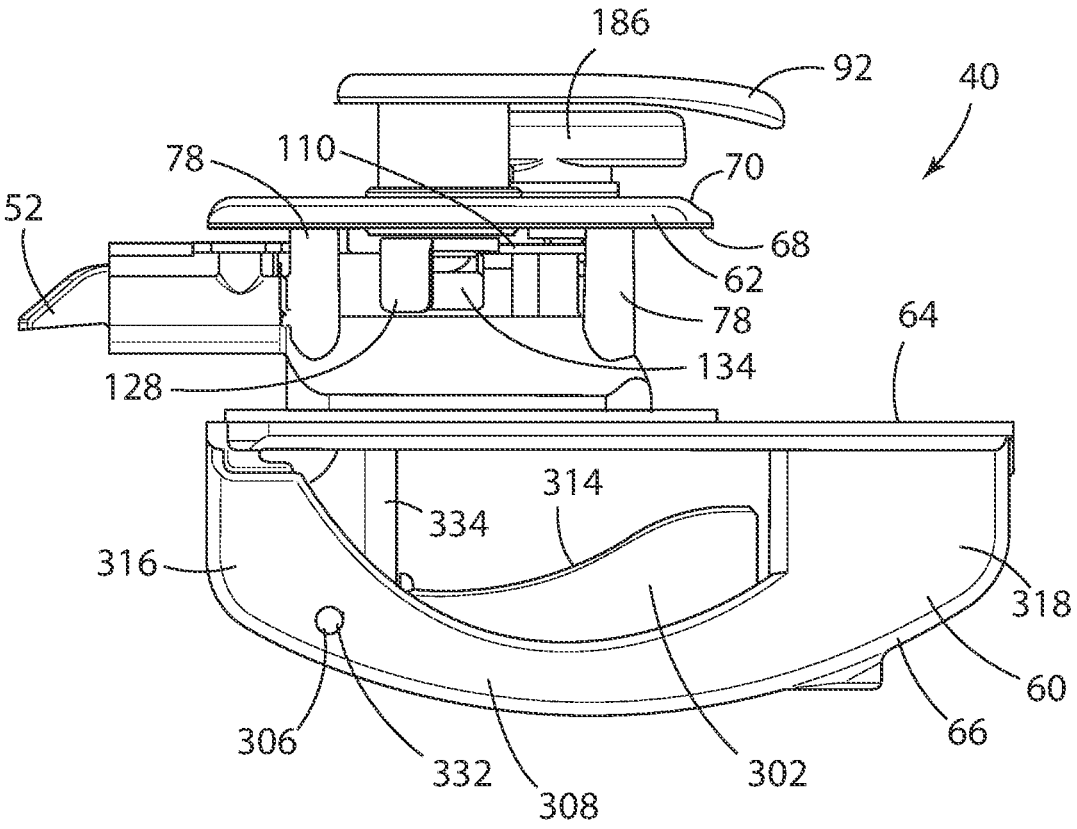
FIG. 39 is a side elevation view of the fourth embodiment of the latch assembly of the present disclosure, shown with the door latch and external lever in the latched position.

The distal end 356 of the first leg 302 of the external lever 300 may also include a notch 360, as shown in FIGS. 38-39 and 41. Rotation of the lock cylinder 352 from the unlocked condition to the locked condition rotates the lock cam 354 into engagement with the notch 360 in the distal end 356 of the first leg 302 of the external lever 300 to prevent rotation of the external lever 300 from the latched position to the unlatched position. Conversely, rotation of the lock cylinder 352 from the locked condition to the unlocked condition rotates the lock cam 354 out of engagement with the notch 360 in the distal end 356 of the first leg 302 of the external lever 300 to allow rotation of the external lever 300 from the latched position to the unlatched position.

As a further feature of the fourth embodiment of the latch assembly 40 disclosed herein, a deadbolt 56 separate from the plunger 102 and door latch 52 may also be movably mounted to the exterior housing 60 for shifting between a locked position, wherein the closure 20 is positively retained in the closed position, and an unlocked position, wherein the closure 20 is free to be shifted between the open and closed positions. The deadbolt 56 may be slidably mounted to the exterior housing 60 with an outer end 206 thereof that extends exterior of the exterior housing 60 for engagement with an associated strike adjacent the closure 20 and an inner end 208 thereof which extends interior of the exterior housing 60.

According to the fourth embodiment of the latch assembly 40 of the present disclosure, the latch assembly 40 similarly includes a deadbolt lock aperture 362 through the exterior housing 60 through which an external deadbolt lock cylinder 364 extends from the outer face 66. As in the second embodiment, the deadbolt 56 may have an outer end 206 and an inner end 208, and a deadbolt lock cam 210 to which is pivotally attached a first end 216 of a first link 212. A second end 218 of the first link 212 is in turn pivotally connected with the inner end 208 of the deadbolt 56, whereby the second end 218 of the first link 212 longitudinally shifts the deadbolt 56 from the unlocked position to the locked position. The deadbolt 56 may have a cross-sectional lateral thickness that is narrower than a cross-sectional lateral thickness of the plunger 102. In addition, the outer end 206 of the deadbolt 56 may be tapered. The deadbolt lock cam 210 may be operably and rotatably coupled with the external deadbolt lock cylinder 364, such that actuation of the external deadbolt lock cylinder 364 between the locked and unlocked positions longitudinally shifts the deadbolt 56 between the locked and unlocked positions.

Figure 35:
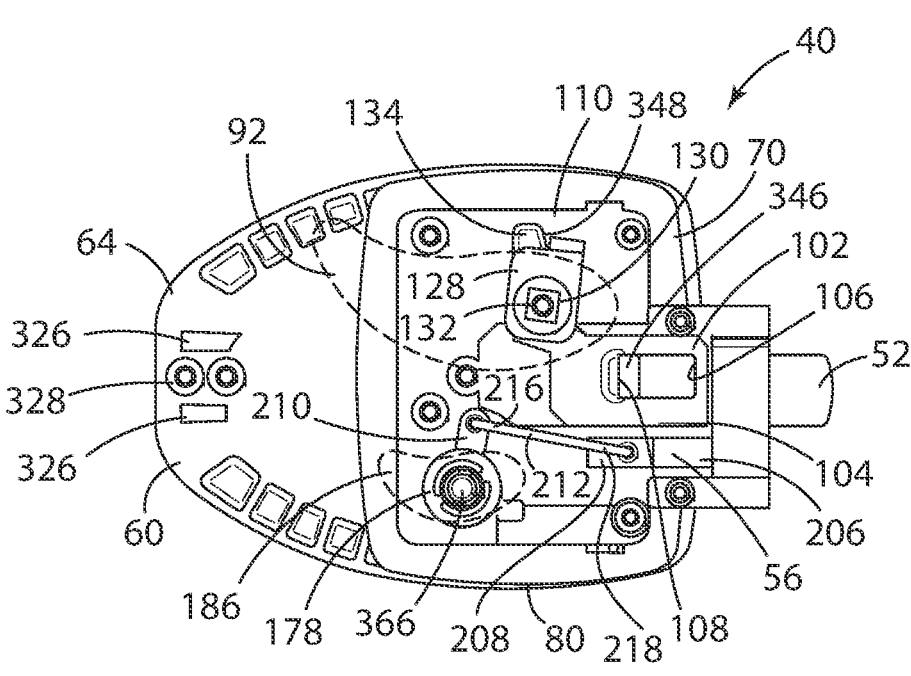
FIG. 35 is a plan view of the inner face of the exterior housing of the fourth embodiment of the latch assembly of the present disclosure, shown with the door latch in the latched position and the deadbolt in the unlocked position and further showing the interior door release control and inside lever cam in the unlatched position and the deadbolt control in the unlocked position.
Figure 36:
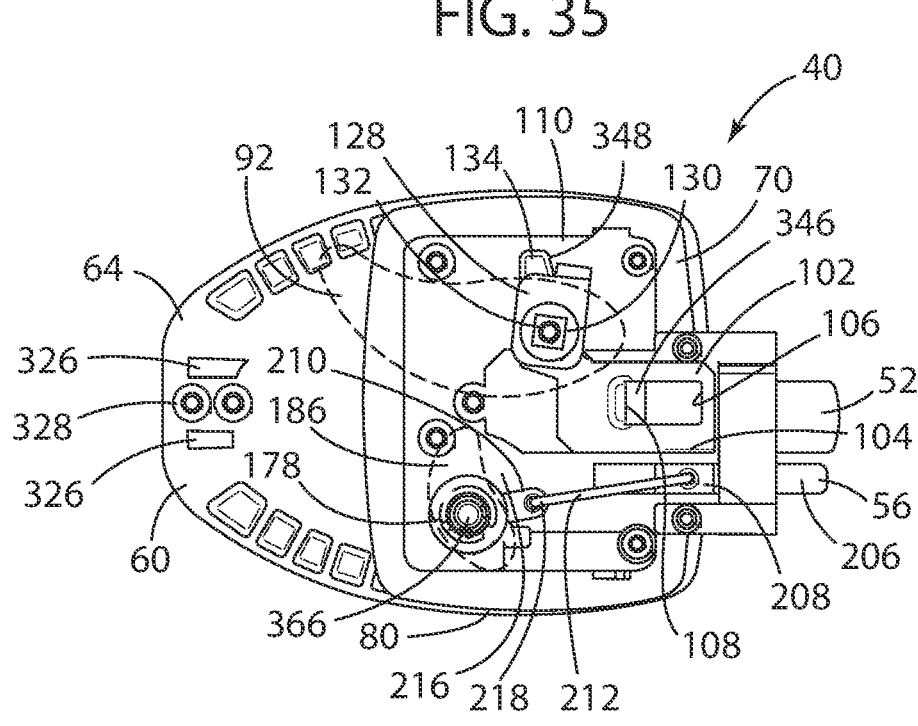
FIG. 36 is a plan view of the inner face of the exterior housing of the fourth embodiment of the latch assembly of the present disclosure, shown with the door latch in the latched position and the deadbolt in the locked position and further showing the interior door release control and inside lever cam in the latched position and the deadbolt control in the locked position.

An interior deadbolt control 186 having a locked position and an unlocked position may be mounted proximate the outer face 70 of the interior housing 62. A deadbolt shaft 366 may be fixedly coupled with the interior deadbolt control 186 and operably coupled with the deadbolt lock cam 210. The deadbolt 56 may be similarly displaced between the locked and unlocked positions by actuation of the interior deadbolt control 186 between the locked and unlocked positions of the interior deadbolt control 186. As shown in FIGS. 35 and 36, the interior deadbolt control 186 is actuated by rotation between the locked and unlocked positions of the interior deadbolt control 186.

Figure 10:
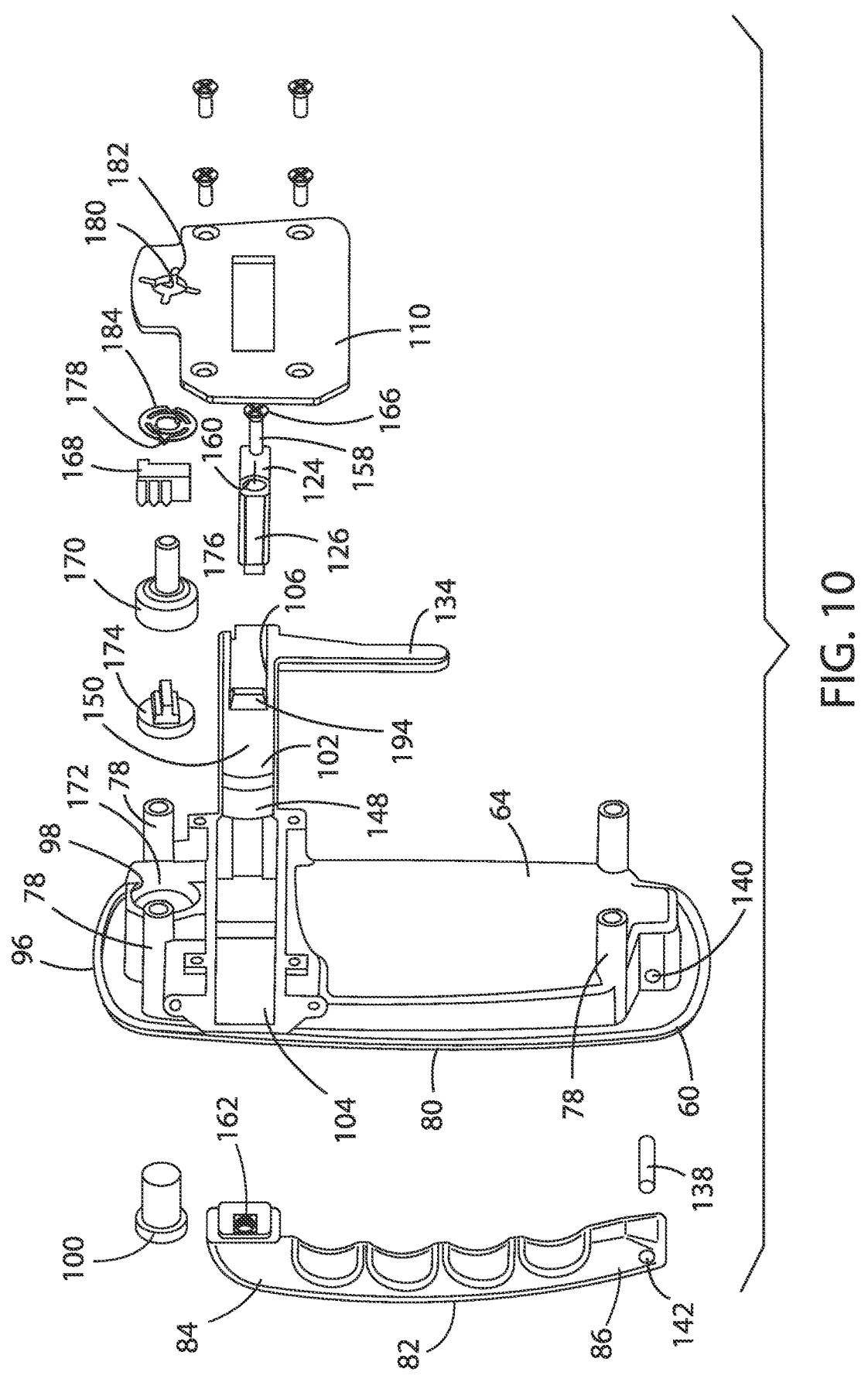
FIG. 10 is an exploded perspective interior view of a first embodiment of the latch assembly of the present disclosure shown in FIG. 2.

A deadbolt clutch spring 178 may disposed between and inside the inside plate 110 mounted to the inner face 64 of the exterior housing 60, the inside plate 110 further comprising an opening 180 through which the deadbolt shaft 366 extends and a plurality of symmetrically arranged radial slots 182 that engage opposed radial detents 184 disposed on the deadbolt clutch spring 178 to retain the deadbolt 56 in the locked position, as discussed above in relation to the second embodiment and shown in FIG. 10. The deadbolt clutch spring 178 thereby allows independent rotation of the interior deadbolt control 186 relative the deadbolt lock cylinder 364.

Thus, rotation of the deadbolt lock cam 210, by either the external lock cylinder 100 or the interior deadbolt control 186, contemporaneously shifts the crank arm 214 of the deadbolt lock cam 210, pivotally attached to the first end 216 of the first link 212. The second end 218 of the first link 212 is in turn pivotally connected with the inner end 208 of the deadbolt 56, whereby the second end 218 of the first link 212 longitudinally shifts the deadbolt 56 from the unlocked position to the locked position. In the unlocked position, the outer end 206 of the deadbolt 56 is fully withdrawn into the interior of the latch assembly 40, as perhaps best shown in FIG. 35. In the locked position, the outer end 206 of the deadbolt 56 engages door strike recess 50 in the door strike 48, and positively prevents opening of the entry door 20. The deadbolt 56 is unlocked by rotating either the external lock cylinder 100 or the interior deadbolt control 186 in the opposite direction. Thus, the deadbolt 56 may be movably shifted between a locked position, wherein the entry door 20 is positively retained in the closed position, and an unlocked position, wherein the entry door 20 is free to be shifted between the open and closed positions.

In accordance with a fifth embodiment of the latch assembly 40 of the present disclosure, shown in FIGS. 42-48, the latch assembly 40 is applied to an external feed dropdown door assembly 400 or window for an animal transport vehicle, such as a trailer and the like, equipped for transporting horses and other large animals. Such animal transport vehicles frequently have dropdown door assemblies 400 or closures of the type disclosed in co-assigned U.S. Pat. No. 8,419,089, which is hereby incorporated in its entirety by reference.

The dropdown door assembly 400 may be rotated along a generally horizontal axis between a raised closed position and a lowered open position. A reciprocating and retractable plunger 102 may be operably connected with the dropdown door assembly 400 and releasably retains dropdown door assembly 400 in the raised closed position, as shown in FIGS. 45-48. A handle actuator assembly 402 is operably coupled with the plunger 102, as further described below. The dropdown door assembly 400 may be rotated along a generally horizontal axis between a raised closed position and a lowered open position, as is known.

The dropdown door assembly 400 may be located in the upper portion of the exterior sidewalls 404 of the recreational vehicle 8 and may be operated from the outside or exterior of recreational vehicle 8. The dropdown door assembly 400 is mounted to the trailer sidewall 404 along a lower portion 406 thereof by hinges 408. It is to be understood that the term "door" as used herein is intended to include a wide variety of different types of closures which selectively close off an associated window or access opening in recreational vehicle 8, such as an opaque access door, a see-through window, a feed door with or without windows, and the like. In the illustrated example, the dropdown door assembly 400 has a plunger 102 mounted at an upper portion 410 thereof, which protrudes outwardly from a marginal frame portion 412 of the dropdown door assembly 400 and engages the adjacent trailer sidewall 404 to selectively retain the dropdown door assembly 400 in the raised closed position. The illustrated plunger 102 may selectively extend outwardly from the marginal frame portion 412 of the dropdown door assembly 400. The dropdown door assembly 400 also includes a center mullion 414 which extends generally vertically along a medial portion of marginal frame 412. It should be further understood that the handle actuator assembly 402 disclosed herein, in addition to operation of the plunger 102, could be adapted to operate a rotary latch or a rod that might be captured by a spring loaded slam catch.

The illustrated dropdown door assembly 400 includes two panels 416 of glass, transparent plastic or the like mounted in marginal frame 412 on the opposite sides of mullion 414. Marginal frame 412 and mullion 414 are interconnected to form a rigid door frame and may be constructed from extruded aluminum or similar weather resistant materials. While the illustrated dropdown door assembly 400 pivots about horizontal hinges 406, it is to be understood that the present disclosure also contemplates mounting doors 400 on vertical hinges for use as access doors for recreational vehicle 8 or the like.

As shown in FIG. 1, the handle actuator assembly 402 may be mounted on the lower portions of the dropdown door assembly 400 but is still at a height which is normally overhead, or nearly so, at least for an average height user when the dropdown door assembly 400 are in the raised closed position, due largely to the inherent design features of recreational vehicle 8. It is this elevated position that has made prior dropdown door assemblies 400 difficult and uncomfortable to operate, particularly for users of less strength, height and/or dexterity.

Figures 46, 47:
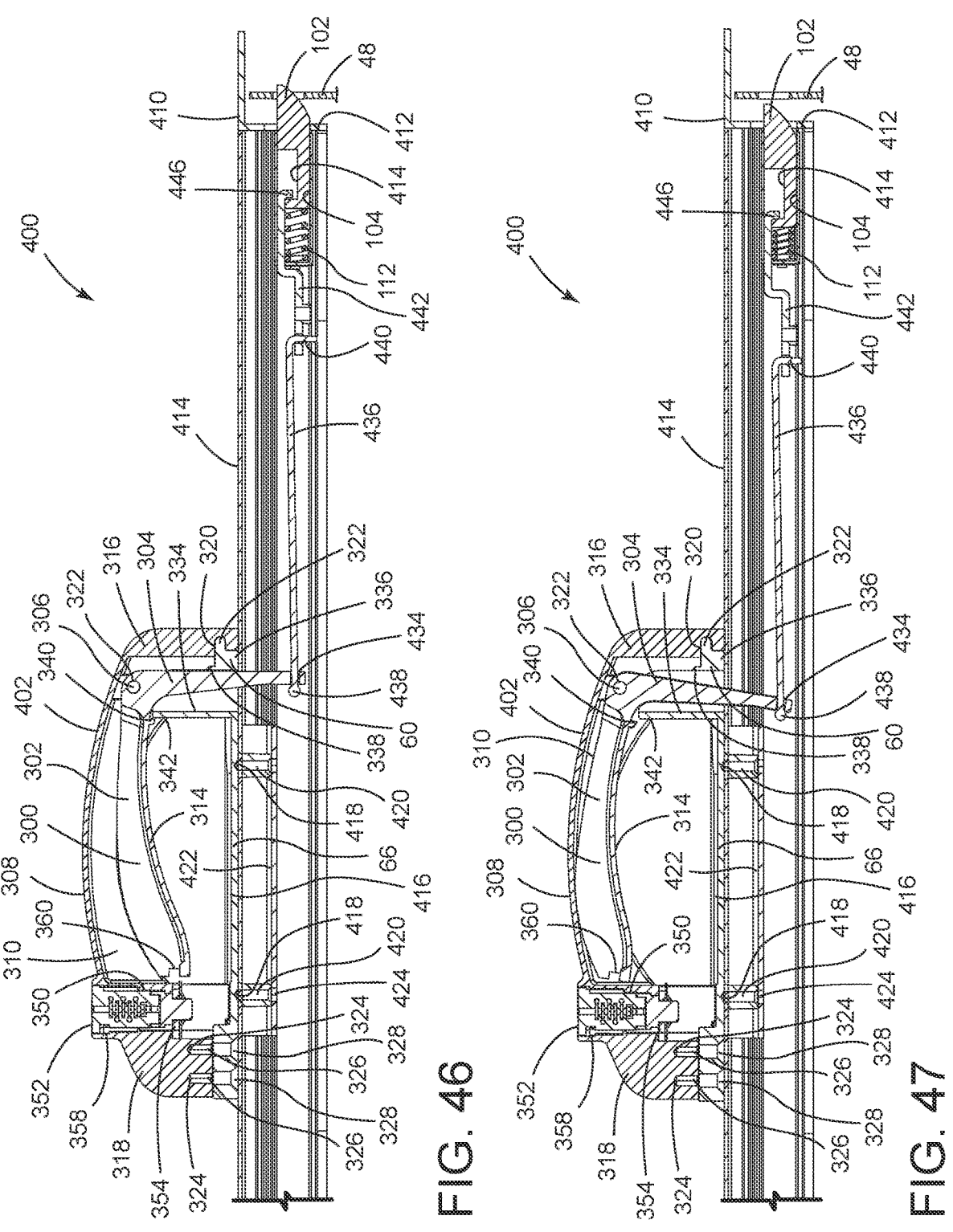
FIG. 46 is a cross-sectional view of the latch assembly as applied to the dropdown door assembly shown in FIG. 42 in the latched position.
FIG. 47 is a cross-sectional view of the latch assembly as applied to the dropdown door assembly shown in FIG. 42 in the unlatched position.
Figure 48:
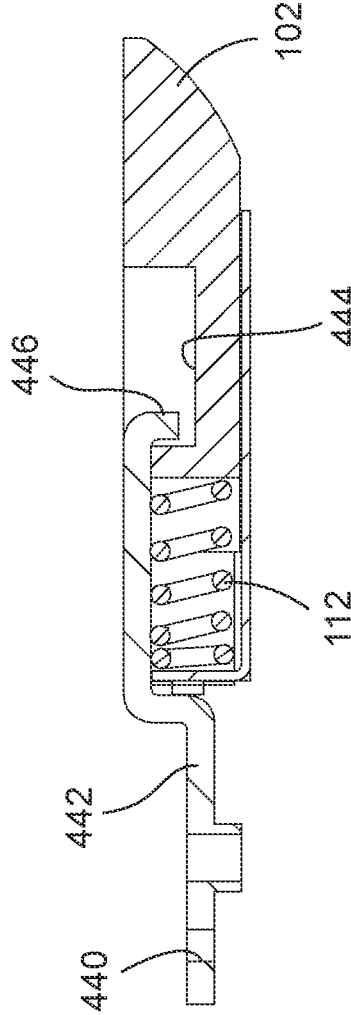
FIG. 48 is a cross-sectional view of the plunger of the latch assembly as applied to the dropdown door assembly shown in FIG. 42.

As perhaps best shown in FIGS. 47 and 48, the handle actuator assembly 402 includes an external lever 300 pivotally mounted on an exterior housing 60 for rotation between a latched position and an unlatched position. The external lever 300 comprises a first leg 302, a second leg 304 disposed at an angle relative to the first leg 302, and a pivot mount 306 disposed between the first leg 302 and the second leg 304. A pivot pin 332 extends through the external lever 300 to define the pivot mount 306 and thereby pivotally mount the external lever 300 on the exterior housing 60 for rotation of the external lever 300 between the latched position and the unlatched position. As shown, the second leg 304 of the external lever 300 is operably coupled with the plunger 102 and the first leg 302 and the second leg 304 of the external lever 300 may be fixedly disposed substantially orthogonally one to the other.

The exterior housing 60 of the handle actuator assembly may further comprise a fixed external handle 308, such that the first leg of the external lever is disposed proximate the fixed external handle 308, thereby providing an ergonomically improved operation. The fixed external handle 308, which may be generously sized, further may include a recess 310 within an interior surface 312 thereof and the first leg 302 of the external lever 300 may be pivotably received within the recess 310 of the fixed external handle 308 as the external lever 300 is rotated from the latched position to the unlatched position. An interior surface 314 of the first leg 302 of the external lever 300 may comprise a substantially continuous surface, again to improve ergonomics, that remains outside of the recess 310 of the fixed external handle 308 as the external lever 300 is rotated from the latched position to the unlatched position to provide a more comfortable tactile experience as the latch assembly 40 is operated, as best shown in FIG. 47. Again, the handle actuator assembly 402 is actuated by merely squeezing the external lever 300 and fixed external handle 308 together, providing a highly ergonomic device.

The exterior housing 60 and the fixed external handle 308 may be injection molded as separate components and the fixed external handle 308 may be fixedly mounted to the exterior housing 60. To affect this construction, the fixed external handle 308 has a first end 316 and a second end 318 and is attached as a separate component to the mullion 414 of the dropdown door assembly. As shown in FIGS. 46-47, the first end 316 of the fixed external handle 308 may be provided with a slot 320 adapted to receive and engage a protuberance 322 formed on the outer face 66 of the exterior housing 60 proximate the first end 316 of the fixed external handle 308 to secure the first end 316 of the fixed external handle 308 to the exterior housing 60.

Further, the second end 318 of the fixed external handle 308 comprises a pair of opposed cavities 324 that fittingly receive an integrally formed pair of opposed bosses 326 formed on the outer face 66 of the exterior housing 60 proximate the second end 318 of the fixed external handle 308 and between which a pair of fasteners 328 extend through the exterior housing 60. The fasteners 328 thus extend into the second end 318 of the fixed external handle 308 to secure the second end 318 of the fixed external handle 308 to the exterior housing 60.

An integrally formed sleeve 334 may be formed on the outer face 66 of the exterior housing 60 proximate the first end 316 of the fixed external handle 308 through which the second leg 304 of the external lever 300 extends and over which the recess 310 of the fixed external handle 308 is disposed. The integrally formed sleeve 334 formed on an outer face 66 of the exterior housing 60 is intended to limit leakage of water into the handle actuator assembly 402. A lower portion 336 of the integrally formed sleeve 334 may include an outwardly extending tab 338 that is juxtaposed against the second leg 304 of the external lever 300 when the external lever 300 is in the latched position, as shown in FIG. 46, to limit leakage of water into the handle actuator assembly 402.

In addition, the first leg 302 of the external lever 300 may include a trigger tab 340 disposed proximate the pivot mount 306 and an upper portion 342 of the integrally formed sleeve 334 may include an upper edge 344. As shown in FIG. 46, the trigger tab 340 of the first leg 302 of the external lever 300 is juxtaposed against the upper portion 342 of the integrally formed sleeve 334 when the external lever 300 is in the latched position to further limit leakage of water into the handle actuator assembly 402.

The illustrated external housing includes a generally flat mounting plate 416, which has an interior surface that abuts and is connected with the outer surface of mullion 414. The lower portion of the illustrated mullion 414 has two circular apertures 418 therethrough which serve to mount the handle actuator assembly 402 on the external surface of mullion 414. More specifically, a pair of interior bosses 420 on an interior surface of the exterior housing 60 extends through mullion apertures 418. A bracket 422, having a pair of openings 424 aligned with the bosses 420 may then be positioned against an interior surface of the mullion 414 opposite the handle actuator assembly 402, through which fasteners 426 may be inserted and secured to each of the bosses 420. The bracket 422 may be formed with a central portion 428 and two opposed side walls 430 that raise the bracket 422 relative to the interior surface of the mullion 414 and bring the central portion 428 of the bracket 422 in juxtaposed abutment with the bosses 420, thereby providing a stable and secure attachment of the handle actuator assembly 402 to the mullion 414.

Figure 43:
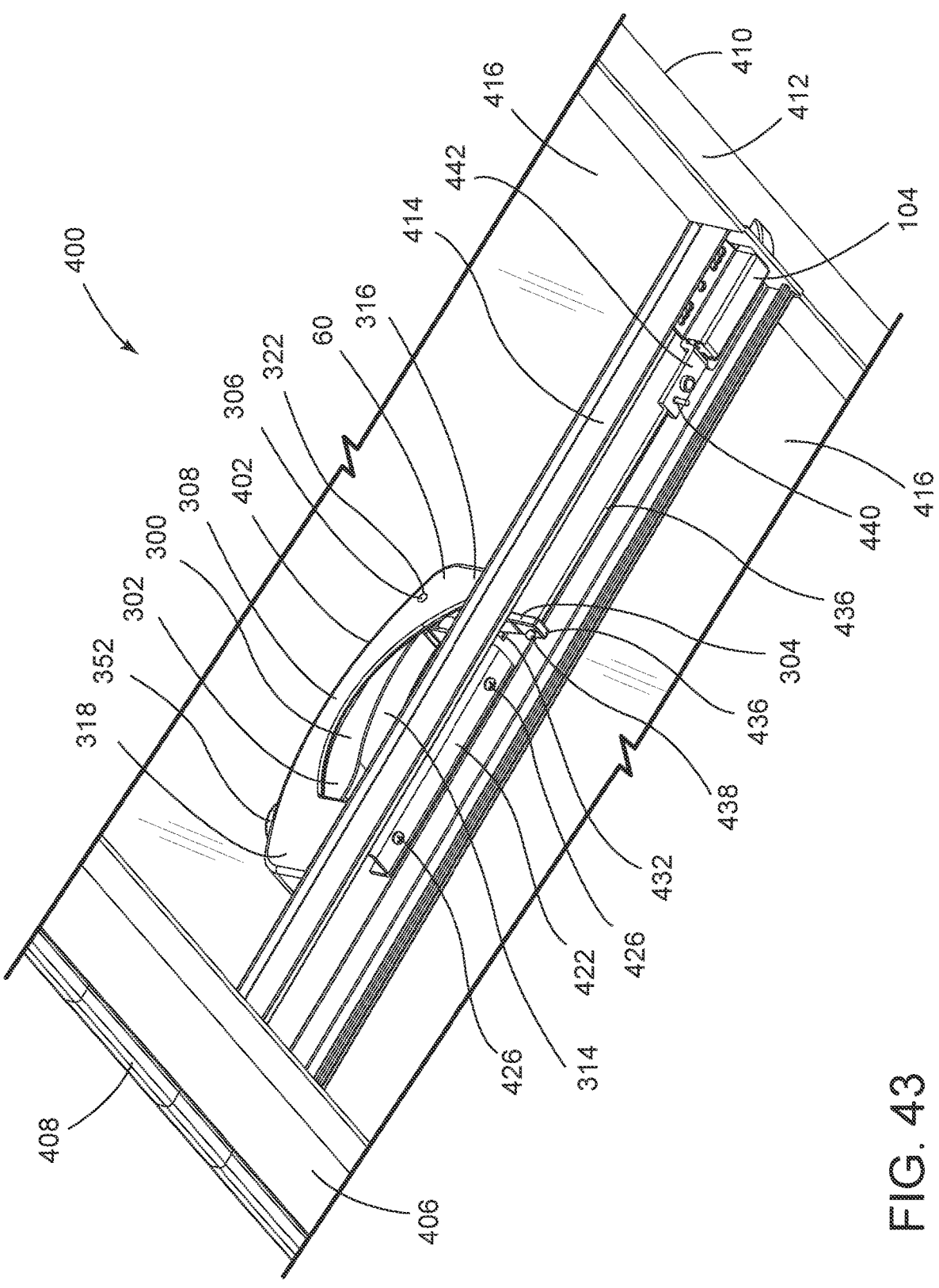
FIG. 43 is an interior perspective view of the latch assembly as applied to the dropdown door assembly shown in FIG. 42.
Figure 44:
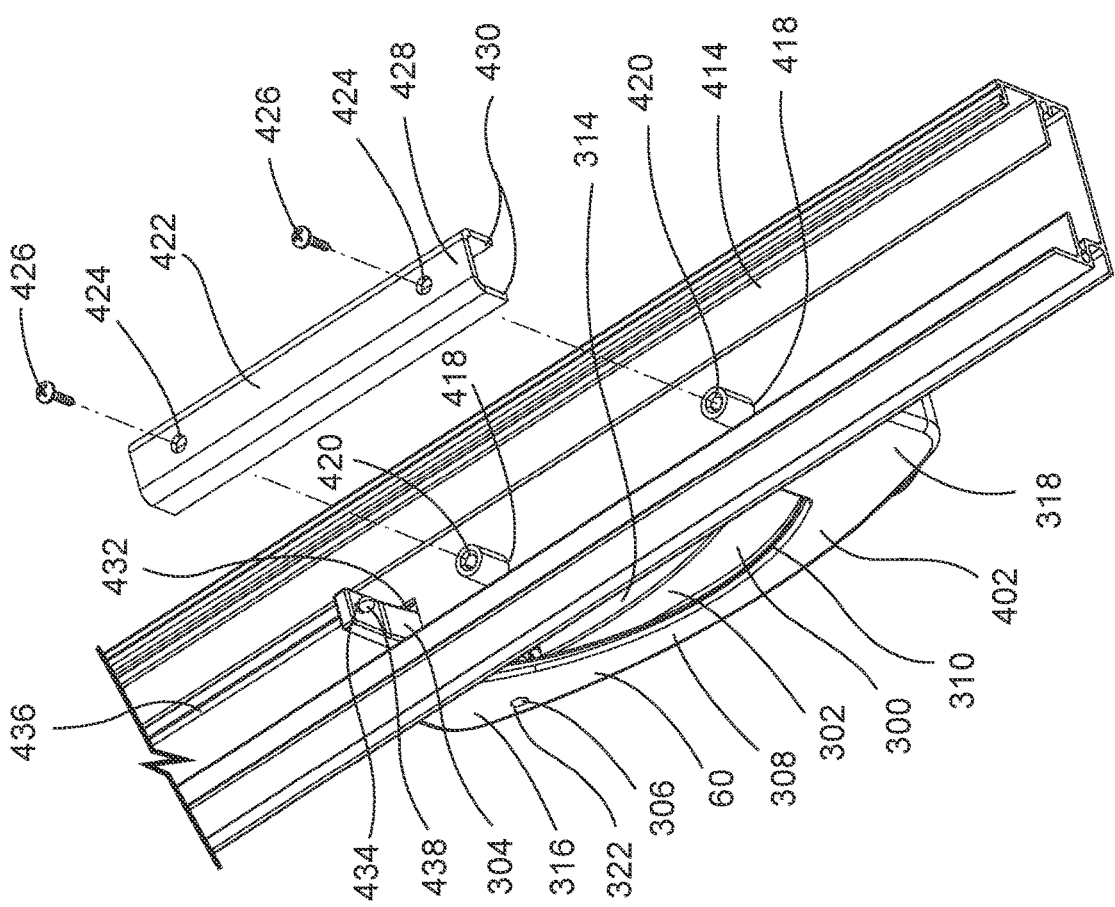
FIG. 44 is an interior perspective and partially exploded view of the latch assembly as applied to the dropdown door assembly shown in FIG. 42.
Figure 45:
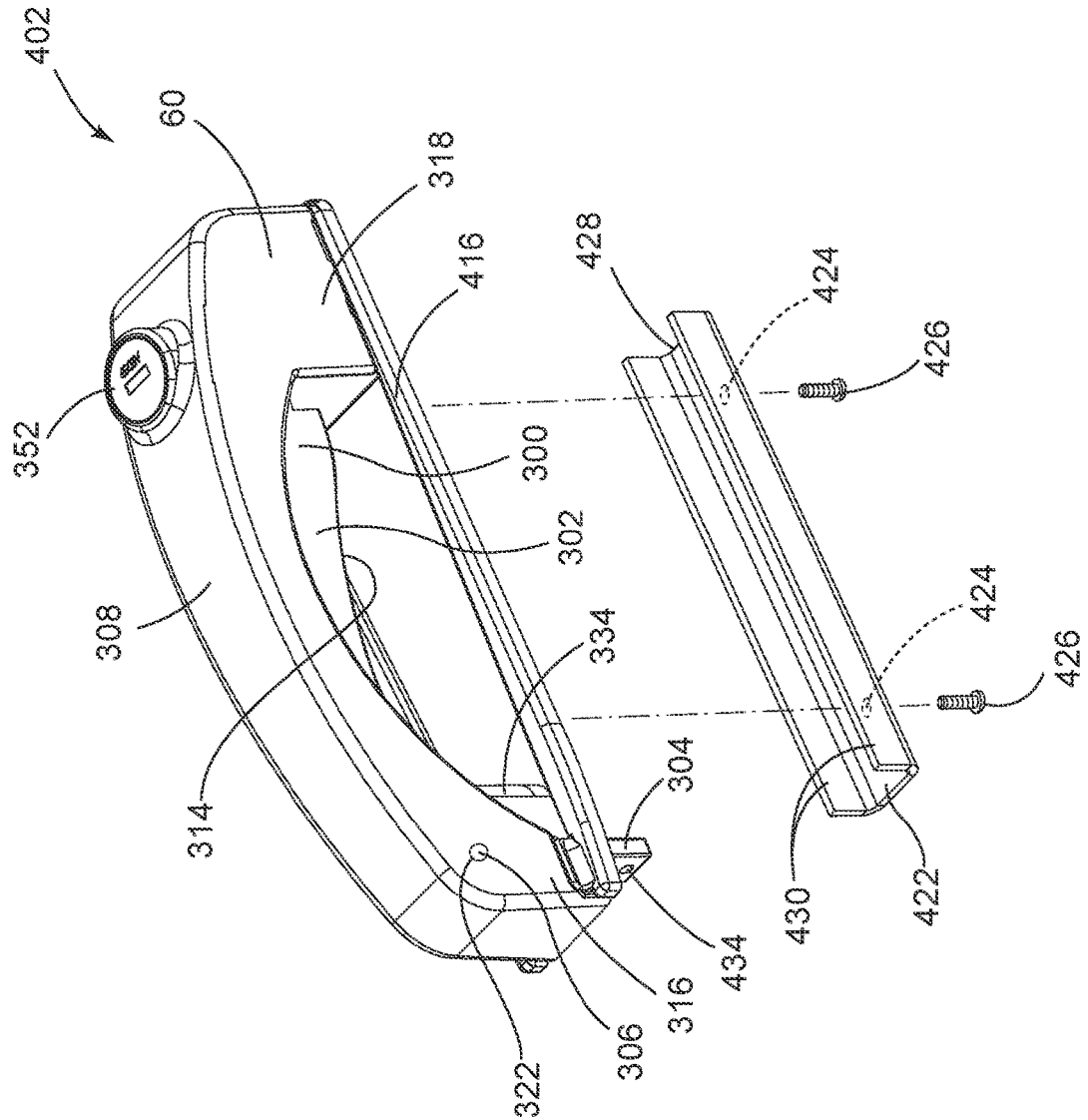
FIG. 45 is a perspective view of the exterior handle for the latch assembly as applied to the dropdown door assembly shown in FIG. 42.

In the illustrated example, once the handle actuator assembly 402 is attached to the mullion 414, the second leg 304 extends through a rectangular opening 432 in the mullion and is provided with an opening 434 proximate a distal end thereof. The opening 434 serves to connect the second leg 304 with an actuator 436, which may be passed through the opening 434 to rest against and be captured by an integral ball 438 at a proximal end of the actuator 436. The opposite or distal end of the actuator 436, which has been bent at a least a right angle to the length of the actuator 436, is operably coupled with an opening 440 disposed on a connector 442, as shown in FIGS. 43 and 48.

The plunger 102 is slidingly received within a plunger recess 104 disposed proximate to an outer edge of the dropdown door assembly 400 at the upper portion 410 thereof. The plunger 102 protrudes outwardly from the marginal frame portion 412 of the dropdown door assembly 400 and engages the adjacent trailer sidewall 404 to selectively retain the dropdown door assembly 400 in the raised closed position. The plunger recess 104 may be fixedly mounted to the interior surface of the mullion 414 and the plunger 102 may be adapted to slide and thereby shift between a latched position and an unlatched position within the plunger recess 104. As shown in FIGS. 46-48, the plunger 102 is maintained in the latched position, when the external lever 300 is in the latched position, by the resilient member 112, as discussed below, whereby the dropdown door assembly 400 cannot be unintentionally shifted from the closed position.

The resilient member 112 is operably coupled with the plunger 102 and urges the plunger 102 to the latched position. The resilient member 112 may be comprised of a compression spring received within the plunger recess 104 and having a first end 114 abutting a first end 118 of the plunger 102 and a second end 120 abutting a terminal wall 122 of the plunger recess 104 opposite the first end 118 of the plunger 102. The resilient member 112 is operably coupled with the plunger 102 and urges the plunger 102 to the latched position, as shown in FIG. 46.

The plunger 102 may further comprise a longitudinal slot 444 within which a tab 446 of the connector 442 may be disposed at a distal end thereof, whereby the connector 442 may be operably coupled with a proximal end of the plunger 102, as best shown in FIG. 48. The longitudinal slot 444 may be longer than the full travel of the plunger 102 during retraction. Accordingly, the plunger 102 may be is displaced from the latched position to the unlatched position by the inclined distal end of the plunger 102 bearing against the outer sill of the opening for the dropdown door assembly 400 when the dropdown door assembly is slammed shut and until the plunger 102 engages a door strike 48 mounted on the sill, without operation of the handle actuator assembly 402.

Thus, the plunger 102 may be displaced from the latched position to the unlatched position from the exterior of the recreational vehicle 8 when the external lever 300 is rotated from the latched position to the unlatched position by a distal end of the second leg 304 of the external lever 300 pulling on the actuator rod 436 and pulling the connector 442 and plunger 102 out of engagement with the door strike 48, whereby the dropdown door assembly 400 is free to be shifted from the closed position to the open position. Consequently, when the user squeezes the external lever 300 relative to the fixed external handle 308, the external lever 300 pivots about pivot pin 322 and shifts the second leg 304 away from the plunger 102, which in pulls on the actuator 436 and shifts the plunger 102 to its unlatched position. It should be noted that while the actuator 436 is shown as an actuator rod 436, the actuator 436 may comprise a Bowden or similar cable, as well as other known linkage mechanisms.

As best illustrated in FIGS. 42-48, the dropdown door assembly 400 is shifted from the raised closed position to the lowered open position in the following manner. The user is positioned on the outside of recreational vehicle 8 adjacent mullion 414 and reaches upwardly grasping the external lever 300 of the fixed external handle 308 of handle actuator assembly 402 in the manner illustrated in FIGS. 46 and 47. The user then squeezes the external lever handle 308, such that the first leg 302 is pivoted into the recess 310 and the second leg 304 pivots about pivot pin 20 in a clockwise direction, as shown, and actuator 436 reciprocates downwardly. The downward reciprocation of actuator 436 in turn pulls on the connector 442, which in turn shifts plunger 102 to the unlatched position.

The user maintains his or her grasp on the external lever 300 and fixed external handle 308 and continues to pull the same outwardly, which causes dropdown door assembly 400 to pivot smoothly about bottom hinge 408 toward the user in a controlled fashion. The unidirectional nature of the squeezing force applied by user to the handle actuator assembly 402 permits the user to easily unlatch dropdown door assembly 400 and accurately control the speed at which dropdown door assembly 400 is rotated from the raised closed position to the lowered open position using a single continuous motion, and thereby avoid discomfort and/or impact between dropdown door assembly 400 and the trailer sidewall 404 or adjacent objects. The squeezing force on the handle actuator assembly 402 by the user simultaneously unlatches plunger 102 and shifts dropdown door assembly 400 toward its lowered open position in a single, unidirectional and comfortable motion, while maintaining substantially the same grip on the handle actuator assembly 402, which greatly reduces user strain and/or discomfort.

In a similar manner, dropdown door assembly 400 may be shifted from the lowered open position to the raised closed position by grasping the fixed external handle, and pulling the same outwardly to rotate dropdown door assembly 400 about hinge 408 to the raised closed position. Once the plunger 102 is aligned with the door strike 48, the user's grasp may be released from the handle actuator assembly 402 and spring 112 automatically shifts the plunger 102 into engagement with the door strike 48, thereby shifting plunger 102 into the fully latched position to securely retain dropdown door assembly 400 in the raised closed position.

As shown in FIGS. 46 and 48, an aperture 350 extends through the second end 318 of the fixed external handle 308 into which a lock cylinder 352 may be disposed, the lock cylinder 352 having a locked condition and an unlocked condition. A lock cam 354 may be operably and rotatably coupled with the lock cylinder 352 and adapted to selectively engage a distal end 356 the first leg 302 of the external lever 300, whereupon rotation of the lock cylinder 352 from the unlocked condition to the locked condition selectively rotates the lock cam 354 into engagement with the distal end 356 of the first leg 302 of the external lever 300 to prevent rotation of the external lever 300 from the latched position to the unlatched position, as shown in FIG. 41. Conversely, rotation of the lock cylinder 352 from the locked condition to the unlocked condition rotates the lock cam 354 out of engagement with the distal end 356 of the first leg 302 of the external lever 300 to allow rotation of the external lever 300 from the latched position to the unlatched position. The aperture 350 through the exterior housing 60 through which the lock cylinder 352 extends disposed above the fixed external handle 308 may include a raised portion 358 to divert water around the aperture 350 and away from the fixed external handle 308. The lock cylinder 352 may be master keyed for dealer convenience.

The distal end 356 of the first leg 302 of the external lever 300 may also include a notch 360, as shown in FIGS. 38-39, 41, and 46-47. Rotation of the lock cylinder 352 from the unlocked condition to the locked condition rotates the lock cam 354 into engagement with the notch 360 in the distal end 356 of the first leg 302 of the external lever 300 to prevent rotation of the external lever 300 from the latched position to the unlatched position. Conversely, rotation of the lock cylinder 352 from the locked condition to the unlocked condition rotates the lock cam 354 out of engagement with the notch 360 in the distal end 356 of the first leg 302 of the external lever 300 to allow rotation of the external lever 300 from the latched position to the unlatched position.

A further feature of the latch assembly 40 disclosed as the fifth embodiment may also include water drainage provided proximate the second end 318 of the fixed external handle 308. That is, as perhaps best shown in FIG. 42, the handle actuator assembly 402 is mounted vertically, with the lowest end 448 of the recess 310 located at the second end 318 of the fixed external handle of the fixed external handle 308. In the event of rain or upon washing the recreational vehicle 8, it is possible that water may accumulate within the lowest end 448 of the recess 310 of the fixed external handle 308. The accumulation of water is undesirable in view of possible corrosion and degradation of the components of the handle actuator assembly 402.

Figure 49:
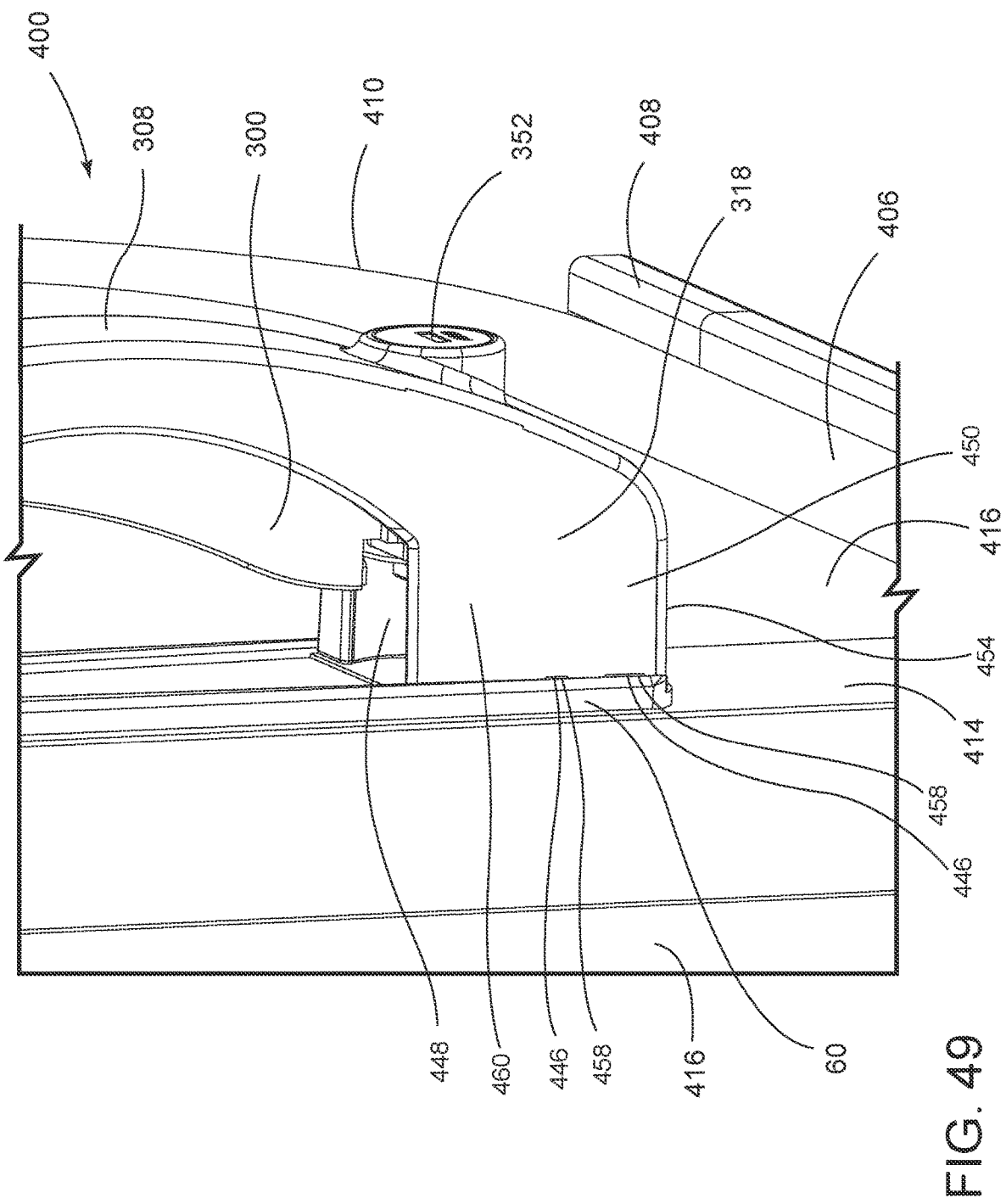
FIG. 49 is a side perspective view of the second end of the fixed external handle and lower end of the flat mounting plate and water drainage channels therein.
Figure 50:
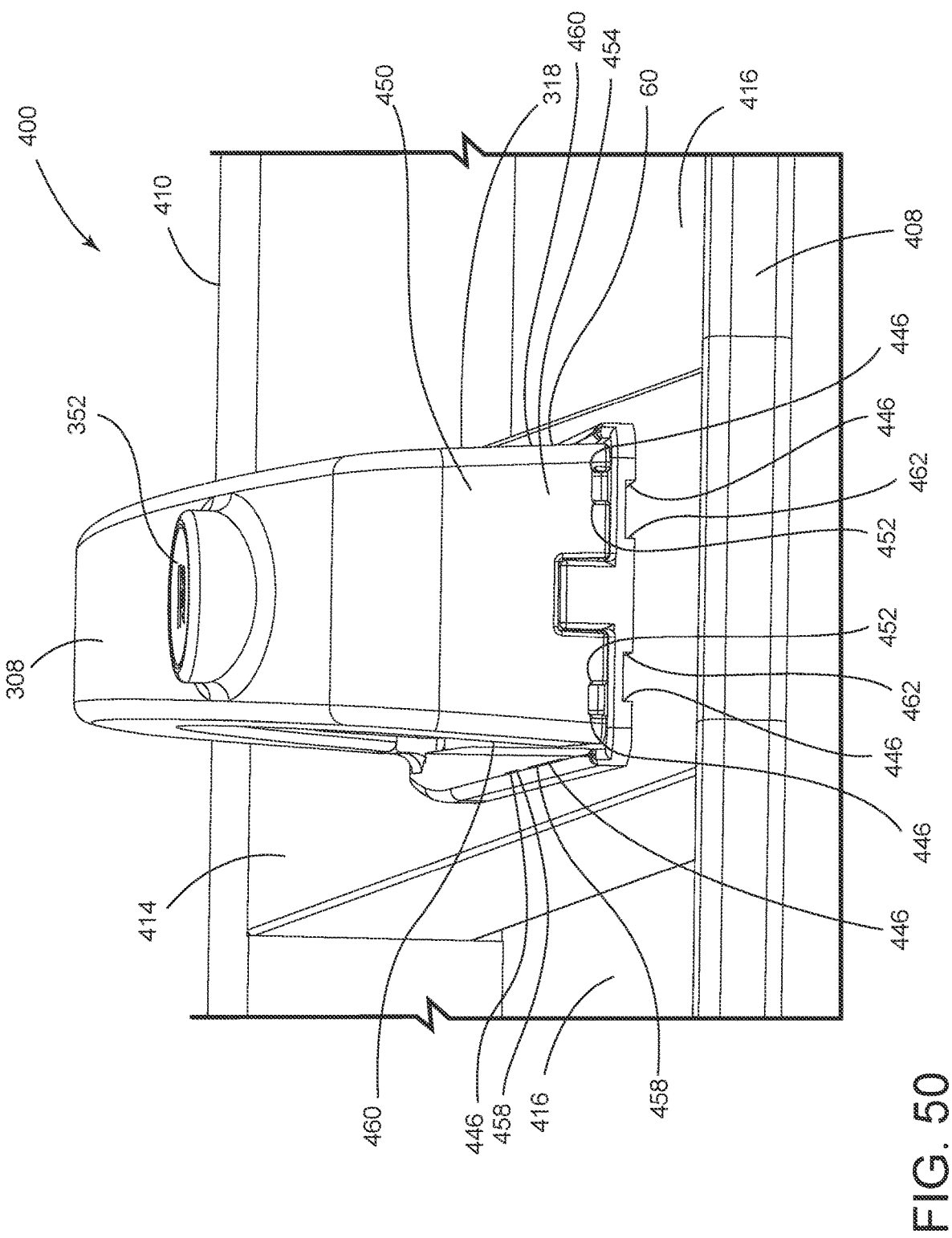
FIG. 50 is bottom perspective view of the second end of the fixed external handle and lower end of the flat mounting plate and water drainage channels therein.
Figure 51:
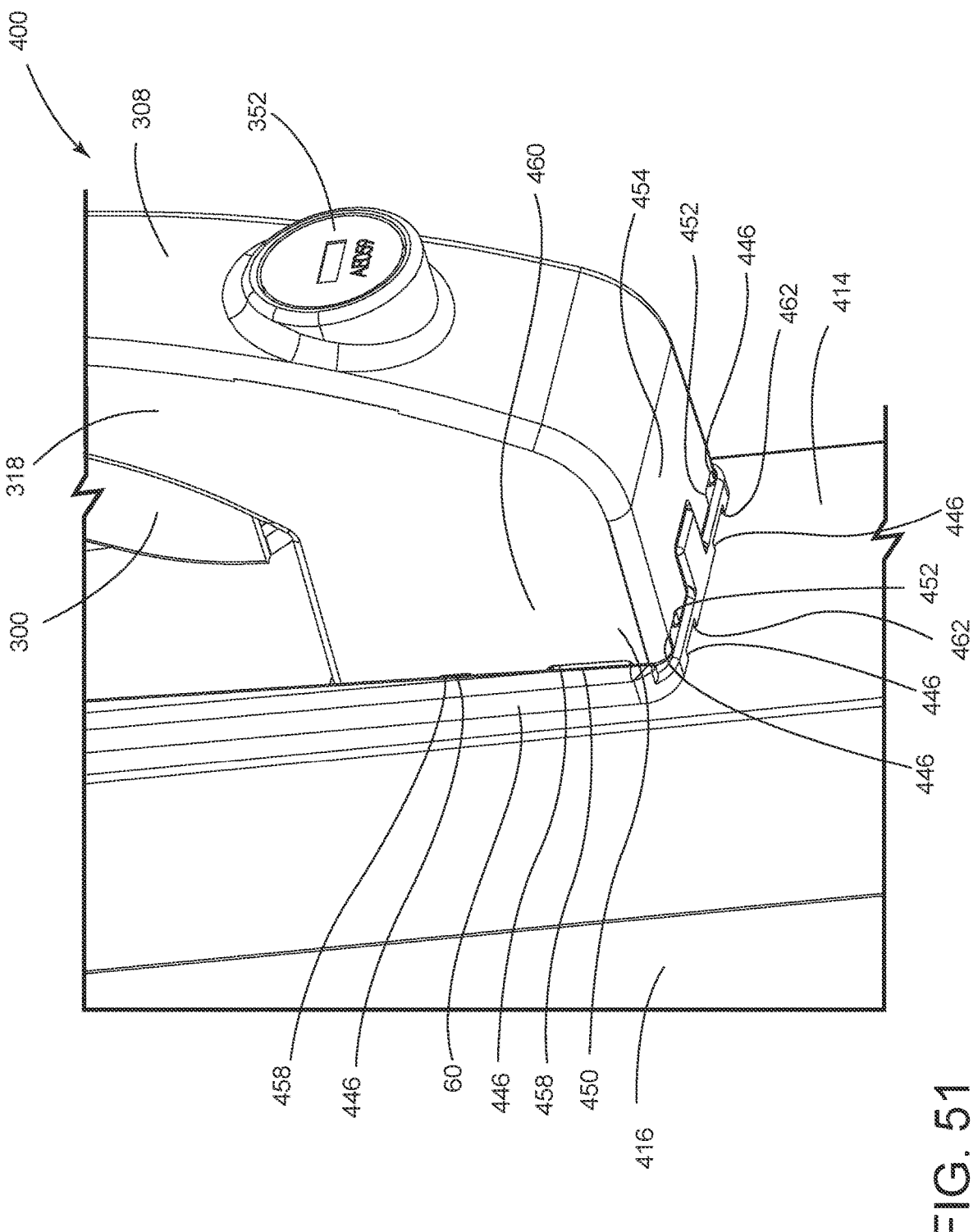
FIG. 51 is another side perspective view of the second end of the fixed external handle and lower end of the flat mounting plate and water drainage channels therein.

To overcome this possibility, as shown in FIGS. 49-50, one or more drainage channels 446 may be located proximate the lowest portion 450 of the second end 318 of the fixed external handle 308. Advantageously, this may include a pair of lateral drainage channels 452 located on the bottom face 454 of the second end 318 of the fixed external handle 308, which are in fluid communication with the lowest end 448 of the recess 310 in the fixed external handle 308 and thereby allow any water therein to freely flow out of the handle actuator assembly 402. In addition, one or more side drainage channels 458 may be located on each of the opposed side faces 460 of the second end 318 of the fixed external handle 308, which are also in fluid communication with the lowest end 448 of the recess 310 in the fixed external handle 308 and thereby allows any water therein to freely flow out of the handle actuator assembly 402. As shown in FIGS. 49-50, a pair of such side drainage channels 458 may be provided, with the lower side drainage channel 458 being slightly larger to further facilitate drainage.

Finally, the flat mounting plate 416 may be provided with one or more end channels 462 that extend from the lowest end 448 of the recess 310 in the fixed external handle 308 to the lowest end of the flat mounting plate 416, which also allows any water therein to freely flow out of the handle actuator assembly 402.

Finally, the squeeze trigger latch as described in any of the foregoing embodiments may be constructed of injection molded components. In particular, the components thereof may be advantageously constructed of injection molding resins. Such resins can include polymers, such as glass filled nylon.

In accordance with the foregoing description, it will be readily appreciated by those skilled in the art that modifications may be made to the invention without departing from the concepts disclosed herein. Such modifications are to be considered as included in the following claims, unless these claims by their language expressly state otherwise.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the terms "coupled" (in all of its forms, couple, coupling, coupled, etc.) and "connected" (in all of its forms, connect, connecting, connected, etc.) generally mean the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

For purposes of this disclosure, the term "operably connected" generally means that one component functions with respect to another component, even if there are other components located between the first and second component, and the term "operable" defines a functional relationship between components.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the inner faces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structure without departing from the concepts of the present invention, and further it is to be understood that such concepts are intended to be covered by the following claims unless these claims by their language expressly state otherwise.

The invention claimed is as follows:

1. A dropdown door assembly for animal transport vehicles, comprising:

a door shaped for selectively closing an associated access opening and including a portion thereof with a hinge about which the door is rotated between a closed position and an open position;

a latch operably connected with the door and releasably retaining the door in the closed position, the latch comprising a plunger operably connected with the door and slidingly received within a plunger recess, wherein the plunger has a plunger latched position and a plunger unlatched position within the plunger recess and a resilient member operably coupled with the plunger and urging the plunger to the plunger latched position; and a handle actuator assembly, comprising:

an exterior housing having an inner face and an outer face, the outer face further comprising a recess; and an external lever pivotally mounted in the recess of the outer face of the exterior housing for rotation between a an external lever latched position and an external lever unlatched position, the external lever comprising a first leg, a second leg disposed at an angle relative to the first leg, and a pivot mount disposed between the first leg and the second leg, the second leg of the external lever being operably coupled with the plunger;

wherein the plunger is maintained in the plunger latched position by the resilient member when the external lever is in the external lever latched position, whereby the closure cannot be unintentionally shifted from the closed position, and wherein the plunger is displaced from the plunger latched position to the plunger unlatched position by the second leg of the external lever when the external lever is rotated from the external lever latched position to the external lever unlatched position, whereby the closure is free to be shifted from the closed position to the open position;

wherein the exterior housing further comprises one or more drainage channels extending from a lower end of the recess to a lower end of the exterior housing;

wherein the exterior housing further comprises a fixed external handle and the first leg of the external lever is disposed proximate the fixed external handle;

wherein the exterior housing and the fixed external handle are injection molded and the fixed external handle is fixedly mounted to the exterior housing; and wherein the fixed external handle comprises a first end and a second end attached as a separate component to the outer face of the exterior housing, and wherein the first end comprises a slot adapted to engage a protuberance formed on the outer face of the exterior housing proximate the first end of the fixed external handle to secure the first end of the fixed external handle to the exterior housing.

2. The dropdown door assembly as set forth in claim 1, wherein the first leg of the external lever and the second leg of the external lever are fixedly disposed substantially orthogonally one to the other.

3. The dropdown door assembly as set forth in claim 1, wherein the fixed external handle further comprises the recess within an interior surface thereof and the first leg of the external lever is pivotably received within the recess of the fixed external handle as the external lever is rotated from the external lever latched position to the external lever unlatched position.

4. The dropdown door assembly as set forth in claim 3, wherein the fixed external handle comprises a pair of opposed pivot bosses and the pivot mount is disposed within the recess of the fixed external handle in alignment with and between the pair of opposed pivot bosses, and wherein a pivot pin extends through the pair of opposed pivot bosses and the pivot mount to pivotally mount the external lever on the outer face of the exterior housing for rotation of the external lever between the external lever latched position and the external lever unlatched position.

5. The dropdown door assembly as set forth in claim 1, wherein:

the second end of the fixed external handle comprises a pair of opposed cavities that fittingly receive an integrally formed pair of opposed bosses formed on the outer face of the exterior housing proximate the second end of the fixed external handle and between which a fastener extends through the exterior housing and into the second end of the fixed external handle to secure the second end of the fixed external handle to the exterior housing; and the fixed external handle further comprises one or more additional drainage channels extending from a lower end of the recess to a lower end of the fixed external handle.

6. The dropdown door assembly as set forth in claim 1, further comprising one or more interior bosses on an interior surface of the exterior housing that extend through one or more apertures in an exterior surface of a center mullion extending along a medial portion of a marginal frame of the access opening.

7. The dropdown door assembly as set forth in claim 6, wherein a bracket having one or more openings aligned with the one or more interior bosses is positioned against an interior surface of the center mullion opposite the handle actuator assembly, through which one or more fasteners may be inserted and secured to each of the one or more interior bosses.

8. The dropdown door assembly as set forth in claim 7, wherein the bracket is formed with a central portion and two opposed side walls that raise the bracket relative to the interior surface of the center mullion and bring the central portion of the bracket in juxtaposed abutment with the bosses, thereby providing a stable and secure attachment of the handle actuator assembly to the center mullion.

9. The dropdown door assembly as set forth in claim 1, wherein the second leg extends through a rectangular opening in the center mullion and is provided with an opening proximate a distal end thereof, whereby an actuator operably couples the second leg of the external lever with the plunger and comprises a coupling at a proximal end of the actuator placed within the opening at the distal end of the second leg such that the coupling is engaged by distal end of the second leg.

10. The dropdown door assembly as set forth in claim 9, wherein the coupling comprising an enlarged ball and the actuator comprises an actuator rod having a distal end bent relative to a length of the actuator rod and operably coupled with an opening disposed on a connector operably connected with the plunger.

11. The dropdown door assembly as set forth in claim 9, wherein the plunger recess is fixedly mounted to an interior surface of the center mullion and the plunger is adapted to slide and thereby shift between the plunger latched position and the plunger unlatched position within the plunger recess.

12. The dropdown door assembly as set forth in claim 9, wherein the resilient member is comprised of a compression spring received within the plunger recess and having a first end abutting a first end of the plunger and a second end abutting a terminal wall of the plunger recess opposite the first end of the plunger.

13. The dropdown door assembly as set forth in claim 10, wherein the plunger further comprises a longitudinal slot within which a tab of the connector may be disposed at a distal end thereof, whereby the connector is operably coupled with a proximal end of the plunger.

14. The dropdown door assembly as set forth in claim 13, wherein the longitudinal slot is longer than a full travel of the plunger during retraction, whereby the plunger is adapted to be displaced from the plunger latched position to the plunger unlatched position by the inclined distal end of the plunger bearing against an outer sill of the opening for the dropdown door assembly when the dropdown door assembly is slammed shut and until the plunger engages a door strike mounted on the outer sill, without operation of the handle actuator assembly.

15. The dropdown door assembly as set forth in claim 14, wherein the plunger is adapted to be displaced from the plunger latched position to the plunger unlatched position from the exterior of the recreational vehicle when the external lever is rotated from the external lever latched position to the external lever unlatched position by a distal end of the second leg of the external lever pulling on the actuator rod and pulling the connector and plunger out of engagement with the door strike, whereby the dropdown door assembly is free to be shifted from the closed position to the open position.

16. A latch assembly adapted for mounting on an associated closure of the type that can be shifted between an open position and a closed position, the latch assembly comprising:

a latch operably connected with the door, wherein the latch has a latched position and an unlatched position and a resilient member operably coupled with the latch and urging the latch to the latched position;

a handle actuator assembly comprising an exterior housing having an inner face and an outer face, the handle actuator assembly being mounted to an exterior surface of a center mullion extending along a medial portion of a marginal frame of closure; and an external lever pivotally mounted within a recess on the outer face of the exterior housing for rotation between an external lever latched position and an external lever unlatched position, the external lever comprising a first leg, a second leg disposed at an angle relative to the first leg, and a pivot mount disposed between the first leg and the second leg, the second leg of the external lever being operably coupled with the latch via an actuator;

wherein the latch is maintained in the latched position by the resilient member when the external lever is in the external lever latched position, whereby the closure cannot be unintentionally shifted from the closed position, and wherein the latch is displaced from the latched position to the unlatched position by the second leg of the external lever when the external lever is rotated from the external lever latched position to the external lever unlatched position, whereby the closure is free to be shifted from the closed position to the open position;

wherein the exterior housing further comprises one or more drainage channels extending from a lower end of the recess to a lower end of the outer face;

wherein the exterior housing further comprises a fixed external handle and the first leg of the external lever is disposed proximate the fixed external handle;

wherein the fixed external handle is fixedly mounted to the exterior housing; and wherein the fixed external handle comprises a first end and a second end attached as a separate component to the outer face of the exterior housing, and wherein the first end comprises a slot adapted to engage a protuberance formed on the outer face of the exterior housing proximate the first end of the fixed external handle to secure the first end of the fixed external handle to the exterior housing.

17. A latch assembly adapted for mounting on a dropdown door assembly of the type that can be shifted between an open position and a closed position, the latch assembly comprising:

an exterior housing having an inner face and an outer face, the latch assembly being mounted to an exterior surface of a center mullion extending along a medial portion of a marginal frame of a door opening;

a plunger slidingly received within a plunger recess disposed on the inner face of the closure, wherein the plunger has a plunger latched position and a plunger unlatched position within the plunger recess;

a resilient member operably coupled with the plunger and urging the plunger to the plunger latched position; and an external lever pivotally mounted within a recess on the outer face of the exterior housing for rotation between an external lever latched position and an external lever unlatched position, the external lever comprising a first leg, a second leg disposed substantially orthogonally relative to the first leg, and a pivot mount disposed between the first leg and the second leg, the second leg of the external lever being operably coupled with the plunger via an actuator rod and a connector disposed between the plunger and the actuator rod;

wherein the plunger is maintained in the plunger latched position when the external lever is in the external lever latched position by the resilient member, whereby the closure cannot be unintentionally shifted from the closed position, and the plunger is displaced from the plunger latched position to the plunger unlatched position when the external lever is displaced from the external lever latched position to the external lever unlatched position by the second leg of the external lever bearing against the plunger, whereby the closure is free to be shifted from the closed position to the open position;

wherein the exterior housing further comprises one or more drainage channels extending from a lower end of the recess to a lower end of the outer face;

wherein the exterior housing further comprises a fixed external handle and the first leg of the external lever is disposed proximate the fixed external handle;

wherein the fixed external handle is fixedly mounted to the exterior housing; and wherein the fixed external handle comprises a first end and a second end attached as a separate component to the outer face of the exterior housing, and wherein the first end comprises a slot adapted to engage a protu-
berance formed on the outer face of the exterior hous-
ing proximate the first end of the fixed external handle
to secure the first end of the fixed external handle to the
exterior housing.

* * * * *